(12) United States Patent
Pfeiffer

(10) Patent No.: US 9,175,486 B2
(45) Date of Patent: Nov. 3, 2015

(54) INSULATING CONCRETE FORM (ICF) SYSTEM WITH MODULAR TIE MEMBERS AND ASSOCIATED ICF TOOLING

(71) Applicant: Henry E. Pfeiffer, Omaha, NE (US)

(72) Inventor: Henry E. Pfeiffer, Omaha, NE (US)

(73) Assignee: ICF MFORM LLC, Omaha, NE (US)

( * ) Notice: Subject to any disclaimer, the term of this patent is extended or adjusted under 35 U.S.C. 154(b) by 226 days.

(21) Appl. No.: 13/796,330

(22) Filed: Mar. 12, 2013

(65) Prior Publication Data
US 2014/0259990 A1    Sep. 18, 2014

(51) Int. Cl.
*E04G 21/16* (2006.01)
*B28B 7/02* (2006.01)
(Continued)

(52) U.S. Cl.
CPC . *E04G 21/16* (2013.01); *B28B 7/02* (2013.01); *B28B 7/04* (2013.01); *E04C 2/288* (2013.01)

(58) Field of Classification Search
CPC ........... E04G 11/06; E04C 2/288; E04B 2/86; B28B 7/02; B28B 7/04; B29C 43/32; B29C 43/30; B29C 43/20
USPC ......... 249/148, 160–168, 191, 193, 213, 214, 249/216, 1, 5, 13, 18, 19, 26, 33, 36, 38, 249/98; 52/309.11, 309.12, 319, 378–379, 52/424–428, 562, 564, 565, 570, 578; 425/577, 588, DIG. 243, DIG. 247; 264/516, 513, 523, 554
See application file for complete search history.

(56) References Cited

U.S. PATENT DOCUMENTS

| 1,096,267 | A | 5/1914 | Sammis |
| 1,345,156 | A | 5/1920 | Flynn |
| 1,578,511 | A | 3/1926 | Gladwin |

(Continued)

FOREIGN PATENT DOCUMENTS

| CA | 1233042 A1 | 2/1988 |
| CA | 2294823 A1 | 1/1999 |

(Continued)

OTHER PUBLICATIONS

Formtech Insulated Concrete Forms (ICFs) picture gallery, accessed Aug. 10, 2007; <http://www.formtechsys.com/photogallery>.

(Continued)

*Primary Examiner* — James Sanders
*Assistant Examiner* — Leith S Shafi
(74) *Attorney, Agent, or Firm* — Husch Blackwell LLP; Samuel Digirolamo

(57) ABSTRACT

ICF tooling facilitating the manufacturing of ICF blocks having different widths and different heights, the tie member including a variable width web portion positionable within a plurality of internal openings associated with a specially designed male tool, each internal opening being configured to receive folded web portions of varying length so that ICF blocks of different widths can be produced using the same male tool; each internal opening likewise includes a tie engaging feature for holding the respective tie members in their folded position within the male tool during the molding process; the internal openings enable foldable tie members of different widths to be used in the same male and female tools for producing ICF blocks in different widths in each individual separate male tool. ICF blocks of varying heights can be produced using the same female tool and a plurality of slightly modified height male tools.

83 Claims, 26 Drawing Sheets

(51) Int. Cl.
*B28B 7/04* (2006.01)
*E04C 2/288* (2006.01)

(56) References Cited

U.S. PATENT DOCUMENTS

| | | | |
|---|---|---|---|
| 1,732,056 A | 10/1929 | Lesher |
| 2,316,819 A | 10/1940 | Tedrow |
| 2,594,378 A | 7/1947 | Baldanza |
| 2,864,150 A | 12/1958 | Henderson |
| 3,321,884 A | 5/1967 | Klaue |
| 3,611,664 A | 10/1971 | Barbera |
| 3,625,470 A | 12/1971 | Shoemaker |
| 3,782,049 A | 1/1974 | Sachs |
| 3,848,843 A | 11/1974 | Levy |
| 3,964,226 A | 6/1976 | Hala et al. |
| 4,055,321 A | 10/1977 | Schimmel |
| 4,229,920 A | 10/1980 | Lount |
| 4,241,555 A | 12/1980 | Dickens et al. |
| 4,332,119 A | 6/1982 | Toews |
| 4,418,884 A | 12/1983 | Schimmel |
| 4,463,925 A | 8/1984 | Schimmel |
| 4,465,257 A | 8/1984 | Schimmel |
| 4,519,568 A | 5/1985 | Day et al. |
| 4,604,843 A | 8/1986 | Ott et al. |
| 4,698,947 A | 10/1987 | McKay |
| 4,706,429 A | 11/1987 | Young |
| 4,730,422 A | 3/1988 | Young |
| 4,731,968 A | 3/1988 | Obino |
| 4,765,109 A | 8/1988 | Boeshart |
| 4,866,891 A | 9/1989 | Young |
| 4,884,382 A | 12/1989 | Horobin |
| 4,885,888 A | 12/1989 | Young |
| 4,888,931 A | 12/1989 | Meilleur |
| 4,889,310 A | 12/1989 | Boeshart |
| 4,901,494 A | 2/1990 | Miller et al. |
| 4,969,626 A | 11/1990 | Strauch |
| 5,065,561 A | 11/1991 | Mason |
| 5,123,222 A | 6/1992 | Guarriello et al. |
| 5,323,578 A | 6/1994 | Chagnon et al. |
| 5,390,459 A | 2/1995 | Mensen |
| 5,428,933 A | 7/1995 | Philippe |
| 5,459,971 A | 10/1995 | Sparkman |
| 5,568,710 A | 10/1996 | Smith et al. |
| 5,570,552 A | 11/1996 | Nehring |
| 5,625,989 A | 5/1997 | Brubaker et al. |
| 5,679,279 A | 10/1997 | Schmidgall |
| 5,701,710 A | 12/1997 | Tremelling |
| 5,704,180 A | 1/1998 | Boeck |
| 5,735,093 A | 4/1998 | Grutsch |
| 5,809,728 A | 9/1998 | Tremelling |
| 5,845,449 A | 12/1998 | Vaughan et al. |
| 5,890,337 A | 4/1999 | Boeshart |
| 5,896,714 A | 4/1999 | Cymbala et al. |
| 6,230,462 B1 | 5/2001 | Beliveau |
| 6,401,419 B1 | 6/2002 | Beliveau |
| 6,668,503 B2 | 12/2003 | Beliveau |
| 6,739,102 B2 | 5/2004 | Roy, Sr. |
| 6,820,384 B1 | 11/2004 | Pfeiffer |
| 6,915,613 B2 | 7/2005 | Wostal et al. |
| 7,082,731 B2 | 8/2006 | Patz et al. |
| 7,082,732 B2 | 8/2006 | Titishov |
| 7,409,801 B2 | 8/2008 | Pfeiffer |
| 6,401,419 C1 | 3/2010 | Beliveau |
| 7,827,752 B2 | 11/2010 | Scherrer |
| 8,037,652 B2 | 10/2011 | Marshal et al. |
| 2002/0162294 A1 | 11/2002 | Beliveau |
| 2003/0000169 A1 | 1/2003 | Davidsaver |
| 2003/0213198 A1 | 11/2003 | Bentley |
| 2005/0028467 A1 | 2/2005 | Bentley |
| 2005/0053429 A1 | 3/2005 | Davidsaver et al. |
| 2005/0108963 A1 | 5/2005 | Wostal et al. |
| 2005/0284088 A1 | 12/2005 | Heath |
| 2007/0245659 A1 | 10/2007 | West |
| 2007/0294970 A1 | 12/2007 | Marshall et al. |
| 2008/0028709 A1 | 2/2008 | Pontarolo |
| 2009/0249725 A1 | 10/2009 | McDonagh |
| 2011/0131911 A1 | 6/2011 | McDonagh |
| 2012/0096797 A1 | 4/2012 | Garrett |

FOREIGN PATENT DOCUMENTS

| | | |
|---|---|---|
| CH | 83257 | 4/1920 |
| DE | 1905341 A1 | 8/1970 |
| EP | 0275938 B1 | 7/1988 |
| FR | 1165293 | 10/1958 |
| GB | 0013218 | 0/1906 |
| GB | 0157638 | 1/1921 |
| GB | 1188066 | 4/1970 |
| GB | 2189825 | 11/1987 |
| NL | 91586 | 7/1959 |
| NL | 8600566 | 10/1987 |
| WO | 2009127937 A2 | 10/2009 |

OTHER PUBLICATIONS

International Search Report and Written Opinion for PCT/US14/11151.

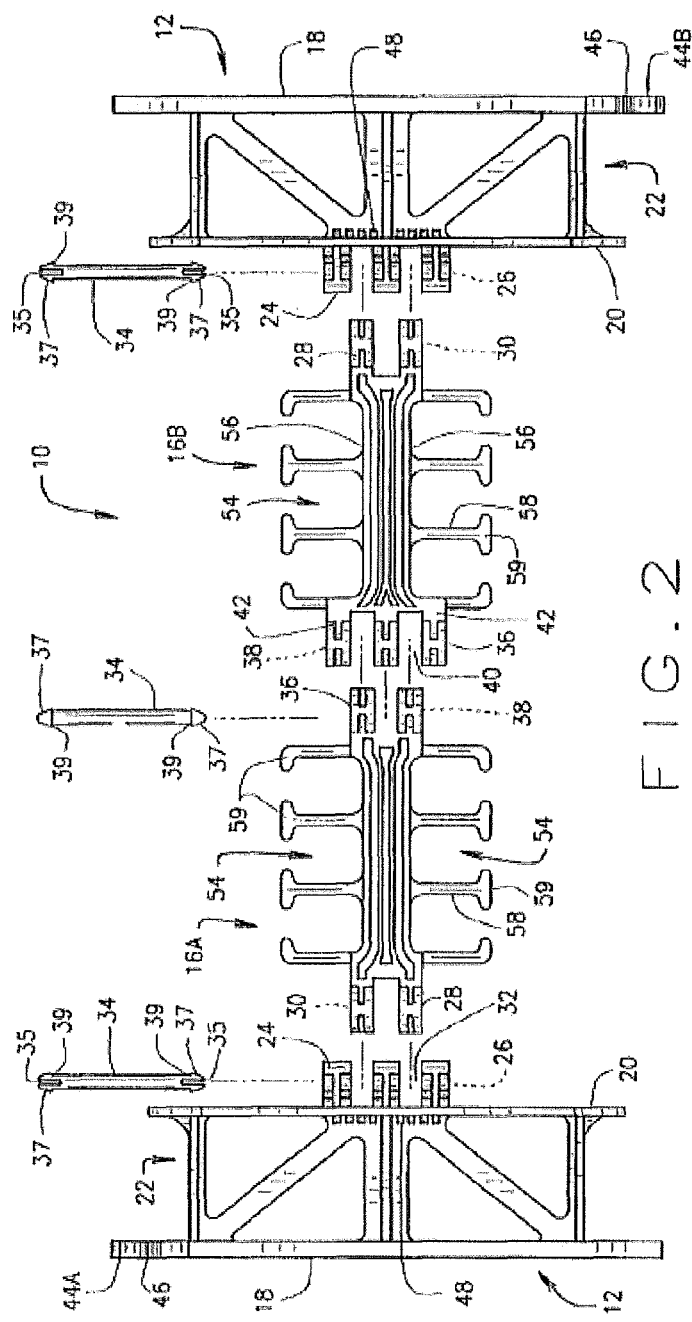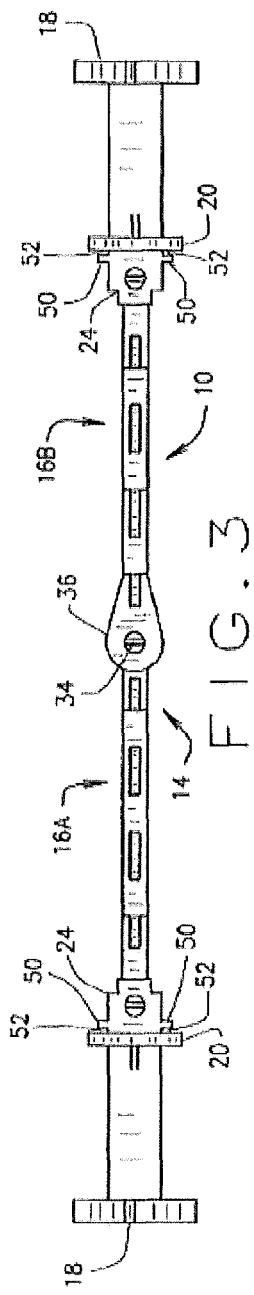

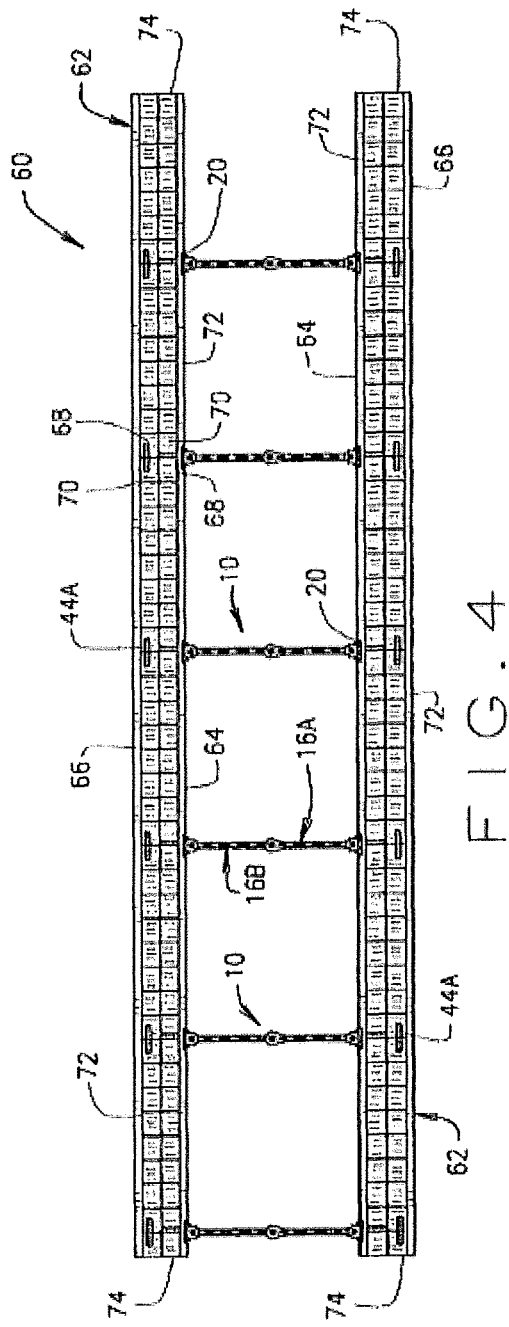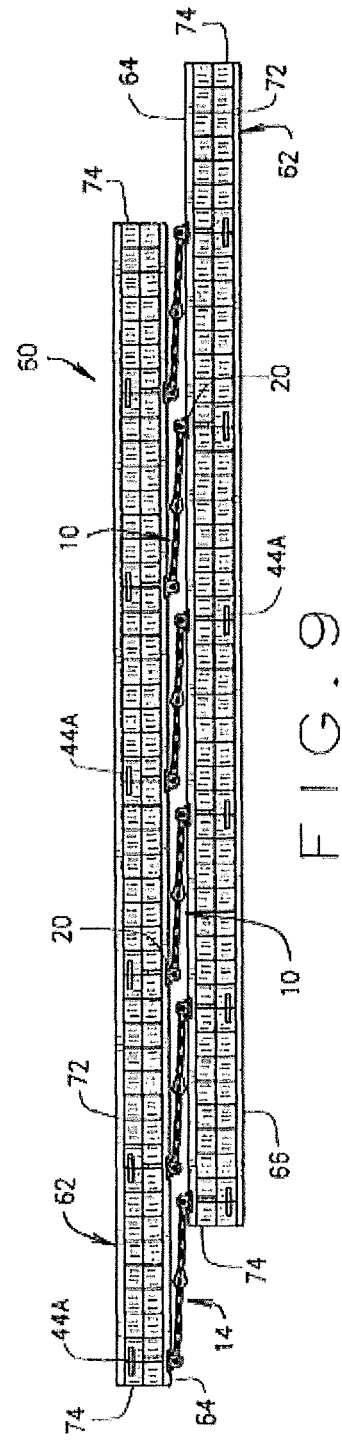

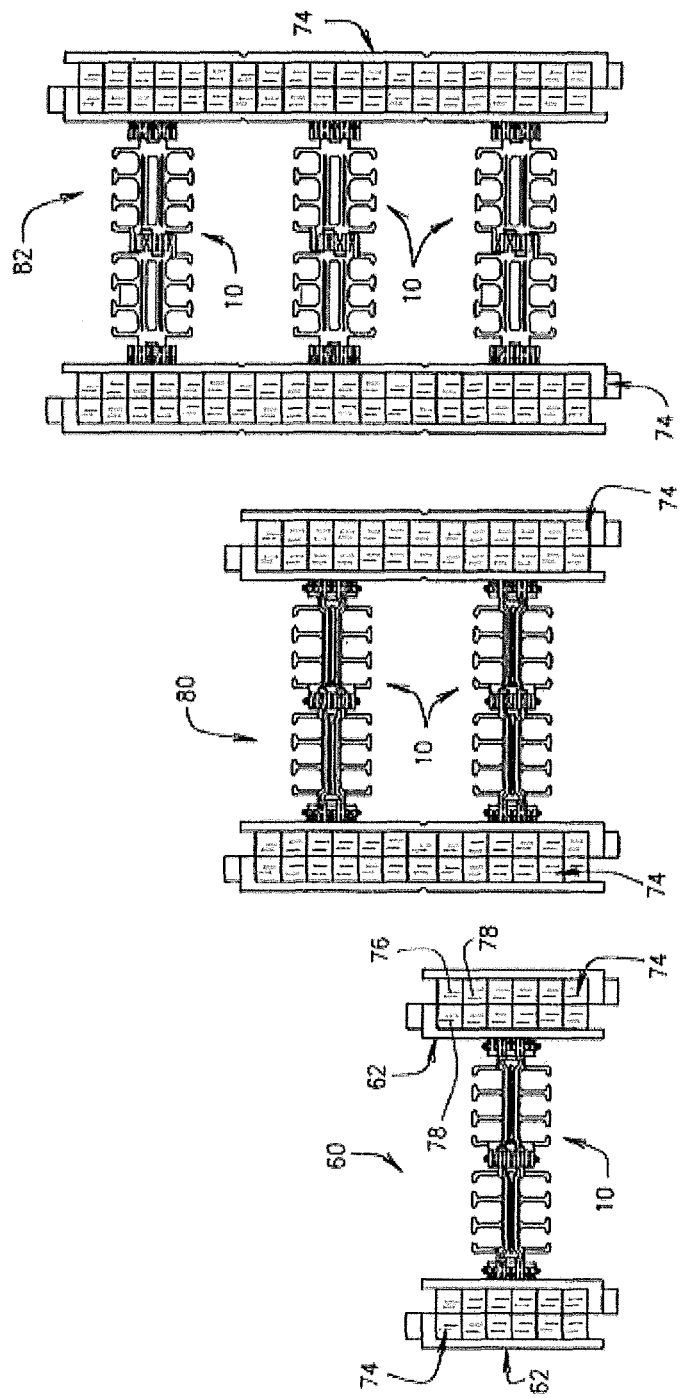

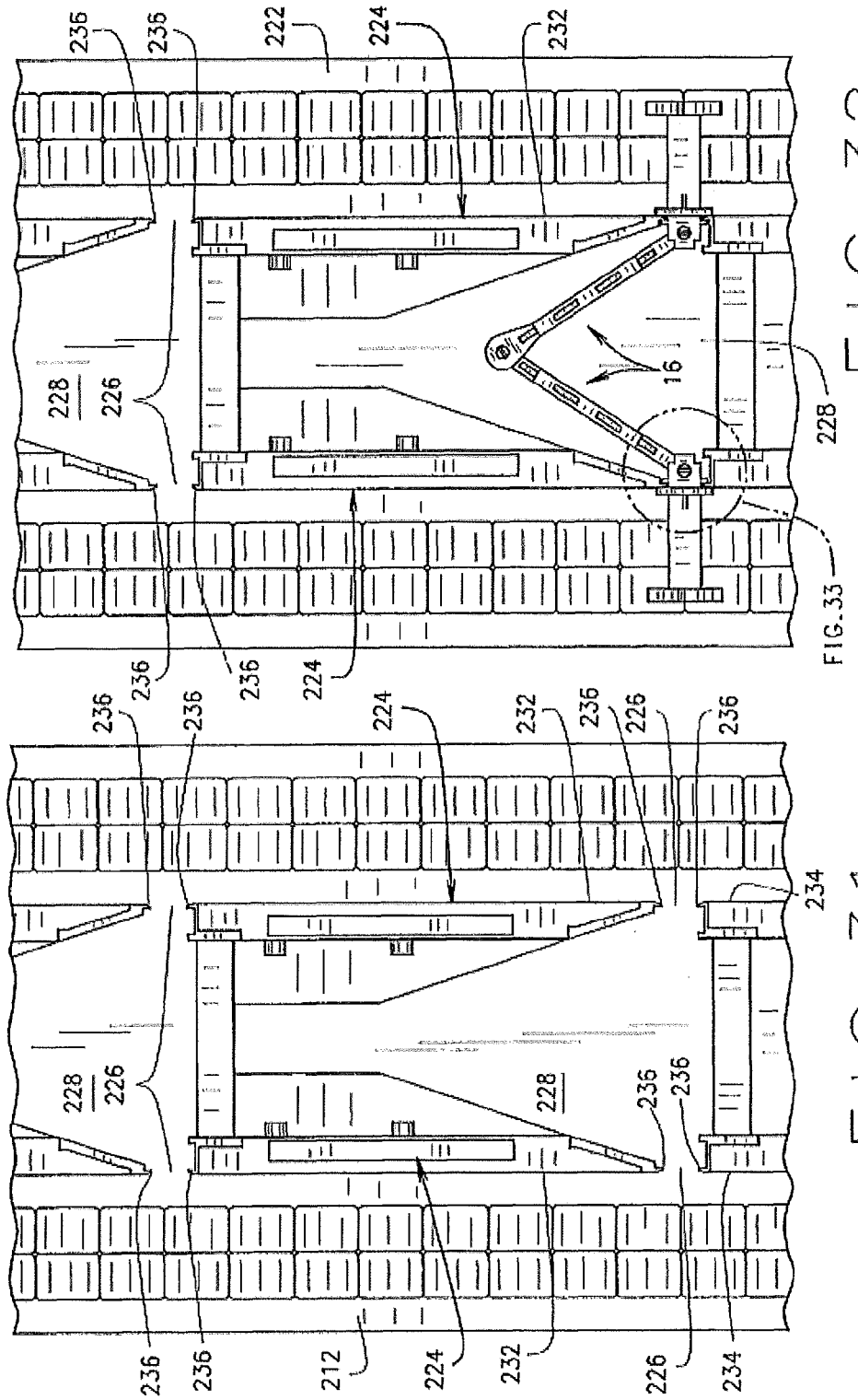

INSULATING CONCRETE FORM (ICF) SYSTEM WITH MODULAR TIE MEMBERS AND ASSOCIATED ICF TOOLING

BACKGROUND OF INVENTION

The present invention relates to Insulating Concrete Form (ICF) Systems utilizing foam block forms or other forms made of other comparable materials and, more particularly, to improvements to the ICF panels, the interlocking connection means associated therewith, and to the tooling to produce the same thereby achieving product modularity with respect to ICF block forms having different heights and widths.

Insulating Concrete Form (ICF) Systems are well known in the industry and serve to both contain fluid concrete while it solidifies and provide insulation for the finished structure. Such systems utilize a plurality of individual units, panels or blocks aligned horizontally and vertically in an interlocking arrangement to create forms for concrete walls. Each block comprises a pair of panels which are retained in a spaced relationship parallel to each other through the use of a plurality of spacing or connecting tie members. As the ICF blocks are stacked, steel rebar rods are inserted at proper longitudinal and vertical integrals as in the conventional forming of a concrete wall.

There are a wide variety of different ICF systems presently available on the market, all of which are used to construct concrete walls. Some ICF systems utilize prefabricated block forms in which opposing flanges of each tie member are molded into the respective opposing walls or panels forming the block. In some prior art designs, the web portion extending between the opposed flanges of the tie are fixed relative thereto, and in some embodiments, the web portion of each respective tie member is hinged so as to allow the ICF block to be folded into a collapsed condition for transportation and storage. In still other embodiments, the ICF system is designed for field installation and the intermediate web portion associated with each respective tie member is slidably engageable with the opposed flanges of each respective tie member which are molded into the opposing walls or panels of each respective block. Once a particular wall or structure is formed using a particular ICF system, the wall or structure is braced and poured full with fluid concrete. The result is a highly energy efficient, steel reinforced, easy to construct concrete wall having a layer of foam or other comparable material on each side of the concrete which serves as further insulation for the completed wall. The tie members which hold the ICF blocks together during the forming and pouring process also serve as furring strips for the attachment of interior (drywall) and exterior finishes.

Because the construction of each building structure is different and unique unto itself, and because of the specific needs of the building and construction industry, it is necessary to provide ICF blocks in a wide variety of different heights, widths and types including such types as straight forms, 90° and 45° corner forms, tapered top forms, ledge forms, T-wall forms, and many more. Although many different types of ICF systems are offered in the marketplace, the preassembled flat wall ICF system dominates the marketplace. In this regard, most of the major ICF companies offer five different widths and one height of ICF blocks to accommodate various construction needs. As a result, as the width of the respective ICF blocks change, so does the size and shape of the respective connecting tie members. If you wanted to also change the height of the respective blocks, not only does the size and shape of the connecting tie members change, but the size of the block panels likewise changes. All of these changes in block height and width also require tooling changes to produce the many different variations in ICF block heights and widths.

Due to the high capital costs required to make the molding tools for both the tie members and the ICF blocks in multiple widths, ICF companies have not been able to offer a more modular system that offers a standard line of ICF blocks in multiple heights as well as multiple widths. Currently, besides being costly, the ICF tools which are used to form the connecting tie members and the opposed block panels are extremely inflexible in their design, use and implementation. As a result, each different height of ICF block requires a different ICF tool for both forming the opposed foam panels of each respective block and for forming the connecting tie members associated therewith. The same is likewise true with respect to each different width of ICF block. In this regard, a separate plastic injection tie tool must also be purchased for each plastic tie used in a particular ICF block depending upon the width and height involved. If five different widths of tie members are used in one height of a particular ICF block, five different plastic injection tie tools must be used in order to make five different widths in one height. As a result, once a particular ICF tool is hung for use, it can only make one type of block, for example, a straight block in only one width. If a user needs an 11-inch straight block, an ICF company must hang its 11-inch wide straight tool of one particular height and it will then make 11-inch wide straight blocks of one particular height. When 13-inch wide straight blocks are needed, the 11-inch wide straight tool must be taken down and the 13-inch wide tool is hung. This process occurs every time a different type of block of a specific width needs to be produced.

As the height of each ICF block changes, so does its tooling requirements. The height of each ICF block requires a different size tool cavity for each different height. Having to switch out tools in this matter is time consuming and costly for two reasons. First, it currently takes most ICF manufacturers an average of several hours to unload one ICF block tool and hang another tool. This reduces the number of ICF blocks that can be produced in a particular day on a particular machine and therefore increases the respective costs of those blocks actually made. Secondly, each ICF block tool that is hung can only make a certain number of ICF blocks in each forming cycle. Tools made only a couple of years ago were made to run on smaller machines and therefore have fewer cavities. Most existing ICF block tools have only two cavities. Increasing the number of cavities in each respective tool likewise increases productivity and reduces cost as more blocks can be made within the same forming cycle. As a result, because of the costs involved in purchasing all of the various tooling for providing a full line of ICF products having different widths and heights, most ICF manufacturers only provide the most common and highest volume ICF block widths and heights.

It is therefore desirable to provide an improved fully integrated ICF system which would reduce the number of tools required to form a plurality of different ICF blocks having both different widths and different heights, which would promote modularity between the different types, widths and heights of ICF blocks such that the same connecting tie members can be used for all variations thereof, and which improves the efficiency and flexibility in the ICF manufacturing process. It is also desirable to provide improved connecting tie members which are both modular and foldable such that the same basic tie member can be used in a single tool to make ICF blocks of varying heights and widths and such that all of the various ICF block embodiments can fold flat for packaging, storage, shipping, sight storage and sight staging. Other additional improvements to the overall ICF block and tie design are likewise desirable to improve the stacking and engaging features of the respective ICF blocks as they are stacked vertically and horizontally to construct different types of concrete walls. Still further, it is also desirable to provide ICF tools capable of producing ICF blocks having varying widths and heights.

Accordingly, the present invention is directed to overcoming one or more of the problems as set forth above, and will enable an ICF manufacturer to go from making 18 to 20 standard ICF blocks to offering an integrated ICF product line of more than 160 different preassembled folding and field assembled ICF block configurations.

SUMMARY OF INVENTION

In accordance with the teachings of the present invention, several embodiments of an improved ICF tie member, improved opposed ICF panel members, and associated ICF tooling for using the present tie members are disclosed wherein all such improvements promote efficiency, flexibility and modularity in manufacturing ICF blocks of varying widths and heights. The present improvements therefore overcome the weaknesses and disadvantages associated with prior art ICF block, panel and tie designs and teach a more versatile and flexible modular tie, panel and block design. In one aspect of the present invention, the present ICF blocks are pre-constructed units including a plurality of foldable tie members spaced apart from, and parallel to, one another. In another aspect of the present invention, the present ICF blocks are field assembled and the plurality of tie members used in association therewith are non-foldable and slidably engageable with opposed side wall brackets embedded in the respective ICF panel members. Although the present ICF blocks and panels disclosed herein will be discussed in conjunction with a substantially planar or straight block configuration, it is recognized and anticipated that the ICF blocks and panels of the present invention can be constructed in any of a variety of different configurations including, but not limited to, a 90° corner block, a 45° corner block, a taper top block, a ledge form block, a T-wall shaped block and other configurations. All of the present ICF blocks are designed to yield a solid, continuous concrete wall construction when connected horizontally and vertically to blocks of similar construction.

Each of the present block configurations includes an opposing pair of ICF panels made of foam or some other comparable material. Identical arrays of alternating teeth and sockets are formed along opposing horizontal longitudinal edges of each panel forming the present ICF block so as to enable it to be removably engaged with either opposing horizontal longitudinal edge of a similarly constructed ICF block when such blocks are vertically stacked one on top of another. The array of alternating teeth and sockets are placed in the center of each of the opposed horizontal longitudinal edges of each of the present ICF panels away from the opposed side edge portions thereof. This median location of the array of alternating teeth and sockets facilitates a cleaner outside exterior wall surface and reduces the amount of wall preparation work that will be needed with certain exterior finish applications. In one embodiment, the opposing vertical end edges of respective panels may also include any number of alternating teeth and sockets which will mate with a substantially identical array of alternating teeth and sockets formed along either vertical end edge of a similarly constructed block for creating an interlocking bond therebetween when such horizontally adjacent panels are mated with each other.

As a result, all of the present ICF blocks constructed in accordance with the teachings of the present invention can vertically and horizontally engageably receive adjacent whole or partially whole blocks of the present invention regardless of the vertical orientation with regard to its horizontal longitudinal axis and regardless of the horizontal orientation with regard to its vertical axis. This is true whether the present ICF blocks are preassembled as a single unit or field assembled at the construction site. The same is likewise true with respect to any other block configuration such as a 90° corner block or other configuration. In addition, the medial location of the array of alternating teeth and sockets likewise enables each tooth to engage a corresponding socket on all four sides of each respective tooth thereby improving the overall strength of the interlocking engagement.

In another aspect of the present invention, one embodiment of a connecting tie member includes a stackable folding tie member having a pair of opposed side wall brackets, a pair of connector link members, and a plurality of pin members for pivotally attaching the connecting link members to each other and to the respective side wall brackets for enabling the opposed ICF panels to fold flat relative to each other for packaging, storage, shipping, site storage and site staging. This folding capability also allows the same basic tie member construction to be used in a single ICF block tool for producing ICF blocks of different widths. The respective side wall brackets are each respectively encapsulated within one of the pair of ICF panels forming the particular ICF block. Each side wall bracket includes a fastening plate having an overlapping extension portion associated with each opposite end portion thereof, a shut-off plate positioned in parallel relationship thereto, and a plurality of bridging members for connecting the fastening plate to the shut-off plate. When encapsulated within a particular ICF panel, the shut-off plate is positioned adjacent the inner wall of each respective panel member and the fastening plate is positioned either adjacent the outer wall of each respective ICF panel, or spaced therefrom depending upon the thickness of the ICF panel.

The fastening plate overlapping extension members may have engaging means associated therewith designed to cooperatively engage the fastening plate overlapping extension members associated with a similarly constructed side wall bracket associated with a similarly constructed ICF panel. The overlapping extension members extend into the teeth area of each respective opposed horizontal longitudinal edge of each panel and will allow mated ICF blocks to further lock in place when stacked on top of each other. This feature also allows a plurality of side wall brackets to be encapsulated within a particular ICF panel in interlocking relationship to each other so as to form a plurality of different heights of ICF blocks as will be hereinafter discussed.

In another embodiment, each side wall bracket of the present tie member may further include interlocking mechanisms in the form of a pair of offset members associated with each opposite end portion thereof, the interlocking mechanisms associated with one tie member likewise extending into the teeth area of each respective opposed horizontal longitudinal edge of each ICF panel for cooperatively engaging corresponding interlocking mechanisms associated with a similarly constructed tie member associated with a similarly constructed ICF panel so as to allow mated ICF blocks to further lock in place when stacked on top of each other.

Each shut-off plate likewise includes a side wall bracket hinge configuration adapted to receive corresponding hinge members associated with the connection link members. This connection is made through a pin member which pivotally attaches one end portion of each respective connection link member to a corresponding side wall bracket. The opposite end portion of each pair of connection link members likewise includes cooperatively engageable hinge members which are likewise connected together through the use of a similar pin member. When the pair of connection link members are pivotally attached to each other and to the respective side wall brackets, a complete folding tie member is formed. Depending upon the length of each respective preassembled ICF block, a plurality of the present tie members will be spaced longitudinally along its length thereby enabling each respective ICF block to fold flat for packaging, shipping and storage. Once the forms are ready to be stacked for use at a particular construction site, they are simply opened, stabilized and stacked to build the walls of a particular structure.

The modularity of the present tie members enables the present ICF blocks to be manufactured in a wide variety of different heights and widths. In this regard, the width of a particular ICF block can be easily changed by merely changing the overall length of the respective pair of connection link members. The corresponding side wall brackets will remain the same and the pivotally attaching connection means associated with both the shut-off plate of each respective side wall bracket and the opposite end portions of each connection link member will likewise remain the same. As a result, only the length of the connection link members need be changed in order to change the width of a particular ICF block. This saves both tooling costs and manufacturing costs since only the connection link members need to be retooled for a different width.

Changing the overall height of a particular ICF panel is likewise easily achieved due to the modularity of the present ICF tie member. Depending upon the overall height selected for the present stackable folding tie member, various ICF block heights based upon multiples of the pre-selected height of the tie member can be easily fabricated by simply stacking any plurality of the present stackable folding tie members within a particular ICF block molding tool and forming the same. For example, if the present ICF stackable folding tie member is 6 inches in height, ICF blocks having heights of any multiple of 6 inches such as 12 inches, 18 inches and 24 inches, can be easily fabricated without changing the design or tooling requirements associated with fabricating the tie members associated therewith. A 12-inch tall ICF block will utilize a pair of the present 6-inch tie members stacked on top of each other at spaced locations along the longitudinal length of the particular ICF block. An 18-inch tall ICF block will require the stacking of 3 of the present 6-inch tie members and a 24-inch tall ICF block will require the stacking of 4 of the present 6-inch tie members. This stackability in conjunction with the locking feature associated with each of the respective side wall bracket members enables an ICF manufacturer to produce ICF block heights in multiples of the selected tie member height. This ability saves time and cost since the same basic ICF tie member is used in multiples of each other to produce ICF blocks of varying heights. It is also recognized that all ICF blocks can be made of a single height such as 6 inches tall and the blocks can be stacked in multiples to achieve a desired height based upon multiples of the pre-selected height of the ICF block. It is also recognized that the ICF blocks can be made of several different heights such as 6-inch tall and 8-inch tall blocks and these blocks can then be stacked using any combination of such blocks to achieve a desired height based upon the pre-selected heights of the ICF blocks. This ability also gives a designer more design flexibility and will allow a designer to hit different wall heights more easily and efficiently thereby reducing labor time and costs as will be hereinafter further explained.

Each of the connection link members likewise includes a plurality of rebar-retaining seats formed thereon so that a rebar rod can be gravitationally placed within a given seat regardless of vertical orientation of the ICF block with respect to its horizontal longitudinal axis. The rebar-retaining seats of each tie member are of sufficient dimension to allow at least one or two rebar rods to be retained therein without imparting undesirable torque forces to the tie member.

In another aspect of the present invention, a field assembled ICF block is disclosed utilizing an improved field assembled connecting tie member. The field assembled connecting tie member is likewise modular in form and includes a pair of side wall brackets which are embedded or encapsulated in opposed relationship to each other in the opposed ICF panel members forming one of the present ICF blocks, and a single web member which is slidably engageable with the respective side wall brackets. The side wall brackets associated with the field assembled tie member are substantially similar to the side wall brackets associated with the present folding tie member except that the bracket hinge members associated with the shut-off plate have been eliminated and a slot has been formed in the shut-off plate for cooperatively receiving one end portion of the web member. In some embodiments, the slot associated with the respective shut-off plates may be tapered and/or enlarged at each opposite end portion to enable the web member to be easily inserted at any intermediate location along the height of a particular ICF panel or block. In all other respects, the side wall brackets associated with the field assembled tie member are substantially identical to the side wall brackets associated with the present folding tie member including having overlapping engagement means associated with the fastening plate and/or attachment mechanisms in the form of a pair of offset members associated with each opposite end portion thereof for stackably engaging any plurality of the field assembled tie members as previously explained with respect to the present stackable/folding tie member.

The web member associated with the field assembled tie member is likewise designed to provide centralized structural support to the ICF block when cooperatively engaged with its corresponding side wall brackets. In this regard, the opposite end portions of the field assembled web member may include cooperatively engageable means for slidably engaging the respective slots associated with the shut-off plate of the respective side wall bracket members. The opposite end portions of the web member likewise may include a plurality of teeth or other engaging means for cooperatively engaging a corresponding set of teeth or other engaging means associated with the side wall bracket slots for holding the web member in proper position when engaged with the respective side wall brackets. In another embodiment, the web member may also include a resilient hook type or snap locked member at one or both opposite ends of each opposed end portion for engaging the respective side wall brackets for holding the web member in proper position when engaged with the side wall brackets. Similarly, the web member likewise includes a plurality of rebar-retaining seats formed thereon for receiving a rebar rod placed therein prior to pouring the fluid concrete between the respective ICF panels. Because the present field assembled web member is slidably engageable with its corresponding side wall brackets, the ICF panel members can be individually formed and shipped to a particular construction site in its unassembled state thereby saving space for packaging, storage and shipping of the respective ICF panel members to a particular location. This likewise reduces the on-site storage room needed and reduces the staging costs associated with larger multi-story ICF structures. The present field assembled ICF blocks can be easily assembled on site by merely engaging the corresponding web members with a pair of corresponding side wall brackets to complete the assembly process.

Like the present stackable/foldable spacing tie members, the modular nature of the present field assembled tie members likewise promotes economy of scales with respect to manufacturing ICF blocks of different widths and heights. As with the present stackable/foldable tie member, the web member associated with the present field assembled tie member can likewise be made in different widths while utilizing the same side wall brackets. Here again, this reduces tooling costs and enables a manufacturer to produce a variety of different web member lengths to achieve the desired ICF block widths required by the industry. In similar fashion, field assembled ICF blocks of varying heights can likewise be easily produced in heights corresponding to the multiple heights of the field assembled tie member or corresponding to the multiple heights of the pre-selected ICF blocks as previously explained with respect to the present stackable/foldable tie member. The present field assembled tie member can likewise be made in the same widths and heights as the present stackable/foldable tie member thereby yielding field assembled ICF blocks having the same widths and heights as the present pre-assembled folding ICF blocks.

As a result, the various embodiments of the present tie member facilitate producing a wide variety of different ICF block widths and heights while saving tooling costs and manufacturing costs. Currently, a separate ICF tool must be made to produce each type of block in each width and in each height. In addition, the use of a triple hinged folding tie member likewise provides a manufacturer the ability to redesign its ICF molding tools in a way that will allow more than one size of ICF block to be made in each respective tool. This advancement includes an ICF tool or mold having a plurality of open internal apertures or openings associated with each male tool adapted to receive the connection link members of the present stackable/foldable tie members regardless of their length, and a tie engaging feature associated with each internal opening for holding the opposed side wall brackets secure within the male tool during the molding process. The open internal apertures enable foldable tie members of different widths to be used in the same male tool for producing ICF blocks in different widths in each individual separate male tool. In addition, ICF blocks of varying heights can likewise be produced using the same female tool and a plurality of substantially similar male tools, the difference being only in the height of each respective male tool. Still further, only one male tool and one female tool can be used to make a plurality of ICF blocks in different widths and the same blocks can be stacked in multiples to achieve a desired height based upon multiples of the pre-selected height of the male and female tools.

The interchangeability of the present stackable/folding and field assembled side wall brackets and the associated ICF tooling enable the present ICF blocks to be made in a wide variety of different widths and different heights and also opens the door for more creative block designs and configurations due to its modular capability. The different embodiments of the present tie members can be incorporated into any ICF block structure in accordance with the teachings of the present invention.

These and other advantages of the present invention will become more apparent to those skilled in the art after consideration of the following specification taken in conjunction with the accompanying drawings wherein similar characters or reference numbers refer to similar structures in each of the separate views.

BRIEF DESCRIPTION OF DRAWINGS

For a better understanding of the present invention, reference may be made to the accompanying drawings.

FIG. 2 is an exploded side elevational view of the tie member of FIG. 1.

FIG. 3 is a top plan form view of the tie member of FIG. 1.

FIG. 4 is a top plan form view of a pre-constructed straight ICF form block of the present invention incorporating the stackable/foldable tie members of FIG. 1.

FIG. 5 is an end elevational view of the ICF block illustrated in FIG. 4.

FIG. 9 is a top plan form view of the ICF block of FIG. 4 shown in its folded, collapsed position.

FIG. 10 is an end elevational view of an ICF block formed by using two of the tie members of FIG. 1 vertically stacked one on top of the other for producing a block having twice the height of the ICF block illustrated in FIG. 5.

FIG. 11A is an end elevational view of an ICF block formed by using three of the tie members of FIG. 1 vertically stacked one on top of the other for producing a block three times the height of the ICF block of FIG. 5.

FIG. 13 is a side elevational view of the tie member of FIG. 12.

FIG. 14 is a top plan form view of the tie member of FIG. 12.

FIG. 31 is a partially enlarged front elevational view of one of the internal openings associated with the male tool of FIGS. 28 and 30.

FIG. 32 is a view similar to FIG. 31 showing one of the present stackable/foldable tie members positioned within the internal opening of the male tool.

DETAILED DESCRIPTION

Figure 1:
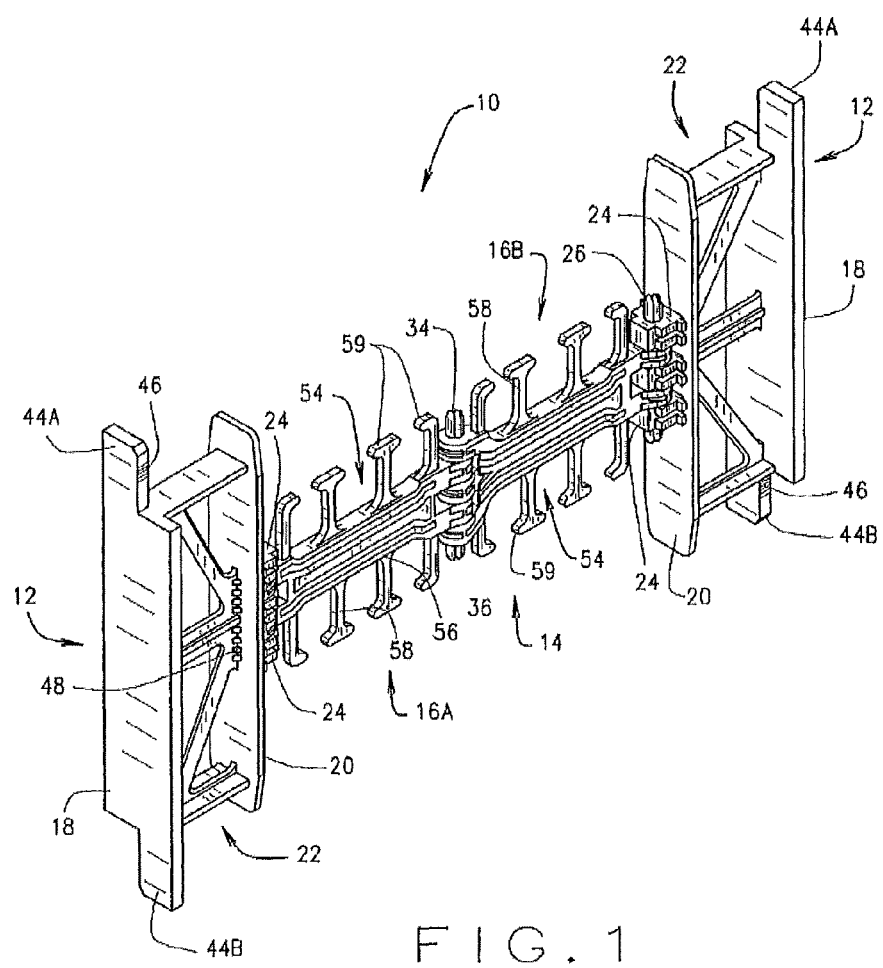
FIG. 1 is a perspective view of one embodiment of a stackable/foldable tie member constructed according to the teachings of the present invention.

Referring to the drawings more particularly by reference numbers wherein like numbers refer to like parts, the numeral 10 in FIGS. 1-3 identify one embodiment of a stackable/foldable spacing tie member constructed according to the teachings of the present invention. Although use of the present tie member 10 will be discussed herein in relationship to a substantially planar or straight ICF block, it is recognized and anticipated that the present tie member 10 can be utilized with a wide variety of different types of ICF blocks including a 90° corner block, a 45° corner block, taper top blocks, ledge form blocks, and so forth. As will likewise be discussed herein, it is also recognized that the present tie member assembly 10 constructed according to the teachings of the present invention can likewise be fashioned into a variety of different sizes and shapes other than those illustrated herein without departing from the spirit and scope of the present invention and that the other components associated with the present tie member assembly 10 may likewise be correspondingly shaped to conform to the shape of the overall assembly without departing from the teachings and the practice of the present invention.

The present stackable/foldable tie member 10 is modular in form as best illustrated in FIG. 2 and includes a pair of opposed side wall brackets 12 separated by, and connected to, a web portion 14. The web portion 14 includes a pair of cooperatively engageable connection link members 16A and 16B as best illustrated in FIG. 2. Importantly, the side wall bracket members 12 are identical in structure to each other and the connection link members 16A and 16B are likewise substantially identical in structure to each other except for the number of hinge projection members associated in the center of the overall tie member 10 as will be hereinafter explained. Although the tie member 10 is typically constructed from a suitable plastic material, in other embodiments, the tie member 10 can be constructed of metal or other suitable materials.

Each side wall bracket member 12 includes a fastening plate 18, a spaced apart shut-off plate 20, and a plurality of bridging members connected therebetween forming a truss structure 22 therebetween. The truss structure 22 provides support and stability to the respective plate members 18 and 20 and to the overall side wall bracket 12.

The shut-off plate 20 includes a plurality of spaced apart projections 24 as best illustrated in FIG. 2, each projection 24 having an opening 26 extending therethrough. One end portion of each of the respective connection link members 16A and 16B includes a complimentary plurality of spaced projections 28 likewise having an opening 30 extending respectively therethrough, the projections 28 being positioned and located so as to be slidably received within the spaces 32 located between the side wall bracket projections 24 as best illustrated in FIGS. 1 and 2. When the projections 28 associated with one end portion of each respective connection link members 16A and 16B are cooperatively engaged with the corresponding side wall bracket projections 24, the respective openings 26 and 30 are aligned and are adapted to receive a pin member 34 therethrough as will be hereinafter further explained. Once pin member 34 is engaged with the respective projection members 24 and 28, each respective connection link members 16A and 16B is pivotally attached to the side wall bracket member 12 adjacent the shut-off plate 20. The projections 24 and 28 function as cooperatively engaged hinge members.

The opposite end portion of one of the respective connection link members 16A and 16B, such as link member 16A likewise includes at least a pair of spaced apart projections or hinge members 36 each including a respective opening 38 extending therethrough. The other connection link member, such as link member 16B, includes three (3) complimentary spaced apart projections or hinge members 36 each likewise including a respective opening 38 extending therethrough. The hinge projection members 36 associated with one end portion of the connection link member 16A are likewise positioned and located as best illustrated in FIG. 2 so as to be slidably engaged with the three (3) hinge projection members 36 associated with connection link member 16B at the center of the tie member 10 such that the members 16A and 16B and their respective transverse bridge members 56 are in alignment with each other as best shown in FIG. 1. This enables the link members 16A and 16B to be cooperatively engaged by sliding one of the respective hinge projection members 36 associated with one link member 16A into the spaces 40 provided between the hinge projections members 36 associated with the other link member 16B as illustrated in FIG. 2. Once engaged, the corresponding openings 38 associated with the engaged hinge projection members 36 are aligned with each other and are adapted to receive another pin member 34 therethrough. Insertion of the pin member 34 within the aligned openings 38 completes the pivotal attachment between the opposed end portions of the respective connection link members 16A and 16B at the center of the overall tie member 10. When so connected, the tie member 10 is hinged at three separate locations as best illustrated in FIG. 3 and is pivotable about each of the respective pin members 34 for reasons which will be hereinafter further explained.

Use of five (5) cooperatively engageable hinge projection members 36 at the center of the overall tie member 10 improves the strength and durability of the center hinge. Nevertheless, it is recognized that any number of hinge projection members 36 may be used at the center of the overall tie member 10 including the use of the same number of hinge projection members 36, such as a pair of projection members 36, if so desired without departing from the spirit and scope of the present invention. In this event, the projection members 36 associated with one of the link members would be slightly offset from the projection members 36 associated with the other link member so that such projection members can be cooperatively engaged with the other. It is also recognized that any plurality of hinge projection members can be utilized on either end of each link member 16A and 16B as well as with each shut-off plate 20 so long as they are compatible with each other and with the hinge projection members associated with the shut-off plates 20.

In similar fashion, each pin member 34 is substantially identical in construction and includes a slotted end portion 35 associated with each opposite end portion thereof. The respective slotted end portions 35 are formed by flange portions 37 which are arrowhead in shape. The slots 35 enable the pin member flange portions 37 to flex inwardly during insertion into any one of the openings 26, 30 and 38 associated with the respective hinge members 24, 28 and 36. The arrowhead shape associated with the tip or end portion of each respective pin flange portion 37 likewise facilitates insertion of the respective pin members 34 within the respective openings. The arrowhead shaped end portion associated with each pin flange portion 37 likewise includes a tip or edge portion 39 which functions as a stop member and serves to stop the pin member 34 during the assembly process and prevents the pin from being pulled out since the top and bottom pin edge portions 39 will engage the top and bottom hinge projection members 24 and 36 once properly position therethrough. The center pin member 34 in FIG. 3 is rotated 90° as compared to the pin members located adjacent the side wall bracket members 12 to more clearly show the edge portions 39. Since both opposite end portions of the pin member are identically shaped and structured, either end portion of the respective pin members 34 can be initially inserted into the appropriate aligned hinge openings. Also, since the same pin member 34 is used to make all of the hinge connections associated with the present tie member 10, only one tool is necessary for manufacturing any number of pin members 34 for use with any ICF block height or width.

The top and bottom hinge projection members 36 associated with the pivotally joined connection link member 16B may include a thicker outer flange 42 to provide additional strength and stability to the pivotal connection. As illustrated in FIGS. 1 and 2, the hinge projection members 28 and 36 can be fabricated as cog type hinge members which are thicker towards their opposed top and bottom edges and thinner therebetween. This hinge member configuration produces a strong hinge member which minimizes the use of material thereby reducing cost. This configuration also reduces the cycle time required to make the connection link members 16 because the thickness of material is less and more uniform. These reduced cycle times also reduce costs.

Figure 7:
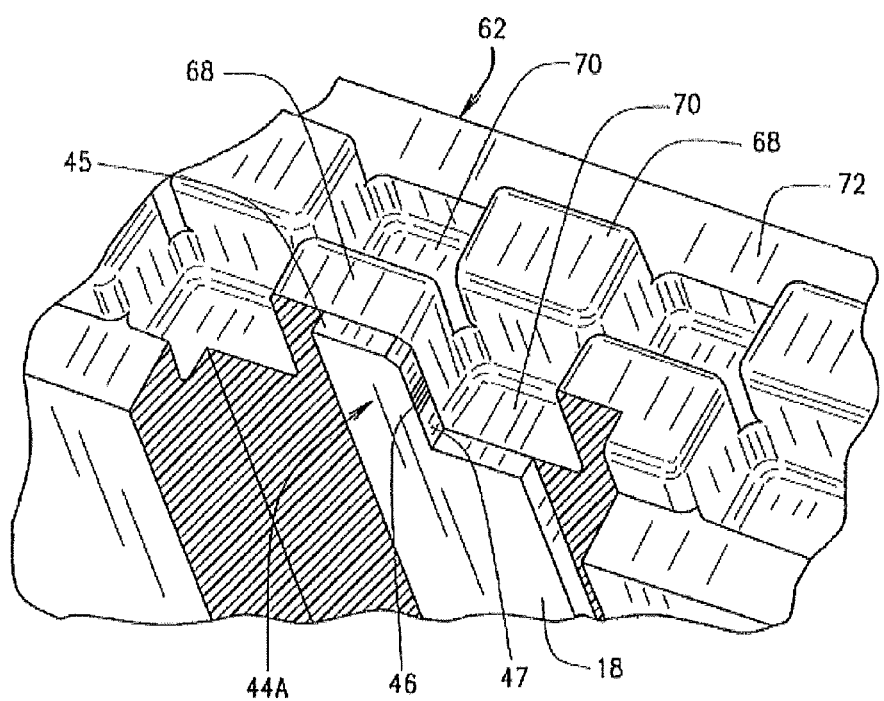
FIG. 7 is a partial cut-away perspective view showing the fastening plate extension members projecting into the interlocking teeth area associated with each ICF panel.
Figure 8:
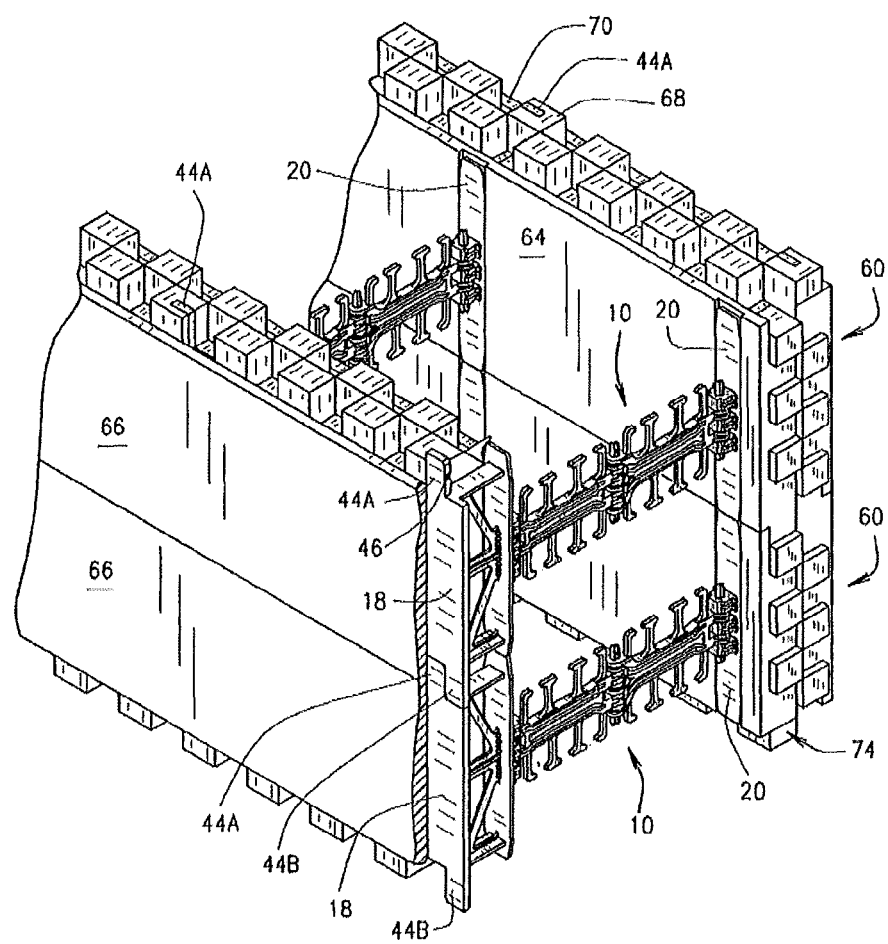
FIG. 8 is a partial perspective view of two of the ICF blocks of FIG. 4 positioned in vertical arrangement one on top of the other.

The fastening plate 18 associated with each opposed side wall bracket 12 likewise includes an overlapping extension end portion 44 positioned at each respective end portion thereof for allowing the respective ends of the tie fastening plate 18 to overlap each other and align themselves when the tie members 10 are stackably arranged one on top of the other as will be hereinafter further explained with reference to FIGS. 7 and 8. The fastening plate overlapping extension portion 44A illustrated in FIG. 1 is a mirror image of and is offset from its corresponding opposed extension portion 44B associated with the opposite end portion of the fastening plate 18. This offset arrangement enables the bottom portion of one side wall bracket member 12 to be overlapped and engaged with the top portion of another side wall bracket member 12 to achieve the stacking arrangement of the present invention. As best illustrated in FIG. 7, when the respective side wall brackets 12 are encapsulated within a particular ICF panel member 62, the extension portions 44A and 44B extend into the respective tooth area of the ICF panel as will be hereinafter further explained. In addition, each extension portion 44A and 44B includes an engaging or fastening member such as a plurality of teeth or gripper members 46 that will mate with and lock or grip with the corresponding teeth or gripper members 46 associated with an opposing tie member 10 which is stacked thereon. Since the fastening plate overlapping extension portions 44A and 44B extend into a tooth associated with the teeth and socket array on each respective ICF panel, when a similarly constructed ICF block is vertically positioned on top of another ICF block, not only will the respective arrays of alternating teeth and sockets engage each other, but the gripping means 46 associated with the respective extension members 44A and 44B will likewise engage each other in the interlocking teeth and socket area as illustrated in FIG. 8. This overlapping arrangement of the fastening plate extension portions 44A and 44B and their corresponding gripping means 46 further aids in interlocking two vertically stacked ICF blocks to one another. In addition, it is not uncommon for ICF blocks to lift and rise up as the fluid concrete fills the block cavity and rises to the top of the wall. Since the grippers or teeth 46 associated with the respective tie members 10 of vertically stacked ICF blocks 60 will engage each other and further lock and stabilize the interconnecting ICF blocks, the lifting and rising up of the respective blocks as the fluid concrete flows and fills the block cavity is substantially eliminated. This interaction of stacked ICF blocks 60 and stacked tie members 10 are best illustrated in FIG. 8.

Still further, each side wall bracket 12 further may include a reinforcing pad or an area of extra material 48 located on one side portion of the shut-off plate directly behind and opposite the side wall bracket hinge members 24 to increase the tensile strength of the shut-off plate 20 in the area of pivotable rotation of the connection link members 16A and 16B. The reinforcing pad 48 also increases the tensile strength of the folding capability of the overall tie structure.

In addition, as best illustrated in FIGS. 1-3, each of the side wall bracket hinge members 24 includes at least one set of opposed projections or fingers 50 which extend in a direction parallel to the plane of the shut-off plate 20, each of the projections 50 being in substantial alignment with each other and each set forming a corresponding slot 52 (FIG. 3) between the shut-off plate and the respective projections 50. The slots 52 formed by the aligned projection members 50 enable the respective side wall bracket members 12 to be grabbed by and secured within the ICF block forming tool as will be hereinafter further explained. The projections 50 therefore function as tool engaging members for securing the present foldable tie member 10 within a particular tool cavity without the need for having a fixed width tie member positioned within the tool cavity. This improvement is discussed with respect to FIGS. 28-45. It is also recognized and anticipated that the opposed projections 50 could be a single member extending across the side wall bracket hinge members 24 in a direction parallel to the plane of the shut-off plate 20, or they could take on other shapes and configurations and they could extend in other directions as long as a slot such as slot 52 is formed to engage the ICF block forming tool. Other variations and modifications are likewise envisioned.

As best illustrated in FIGS. 1 and 2, each of the connection link members 16 includes at least one rebar seat 54. The rebar seats 54 are substantially identical to each other in configuration, and are arranged in a pair of opposing rows along opposite sides of the transverse bridge members 56. Each rebar seat 54 includes a substantially U-shaped well formed by a pair of adjacent fingers 58 and inwardly spanning lateral knuckles or projections 59 are formed on the distal end of each pair of adjacent fingers 58 thereby creating a distance between opposing projections 59 that is substantially less than the lateral distance between the adjacent fingers 58. The length of the fingers 58 can be chosen in conjunction with the lateral distance between such fingers to create a substantially U-shaped well or rebar seat 54 capable of retaining any number of rebar rods therein. Typically, the rebar seats 54 are dimensioned so as to retain either a pair of rebar rods or a single unstraight length of rebar rod without imparting undesirable torque to portions of the web structure 14. The knuckles or projections 59 associated with a given rebar seat 54 serve to help retain the rebar rod therein. The fingers 58 forming each rebar seat 54 may likewise be tapered inwardly towards each other to further facilitate the holding of the rebar rods within each respective seat 54.

A substantially straight or planar ICF block 60 having a pair of parallel opposing panel members 62 retained in spaced apart relationship to each other by a plurality of the present tie members 10 is illustrated in FIGS. 4 and 5. The plurality of tie members 10 extend transversely between opposing inner surfaces 64 of the opposing panel members 62 and the opposing side wall brackets 12 and truss structure 22 associated respectively therewith are substantially retainably encapsulated within the respective opposing panel members 62 such that each fastening plate 18 is seated inwardly from the outer surface 66 of the respective panel member 62 within which it is encapsulated.

Figure 6:
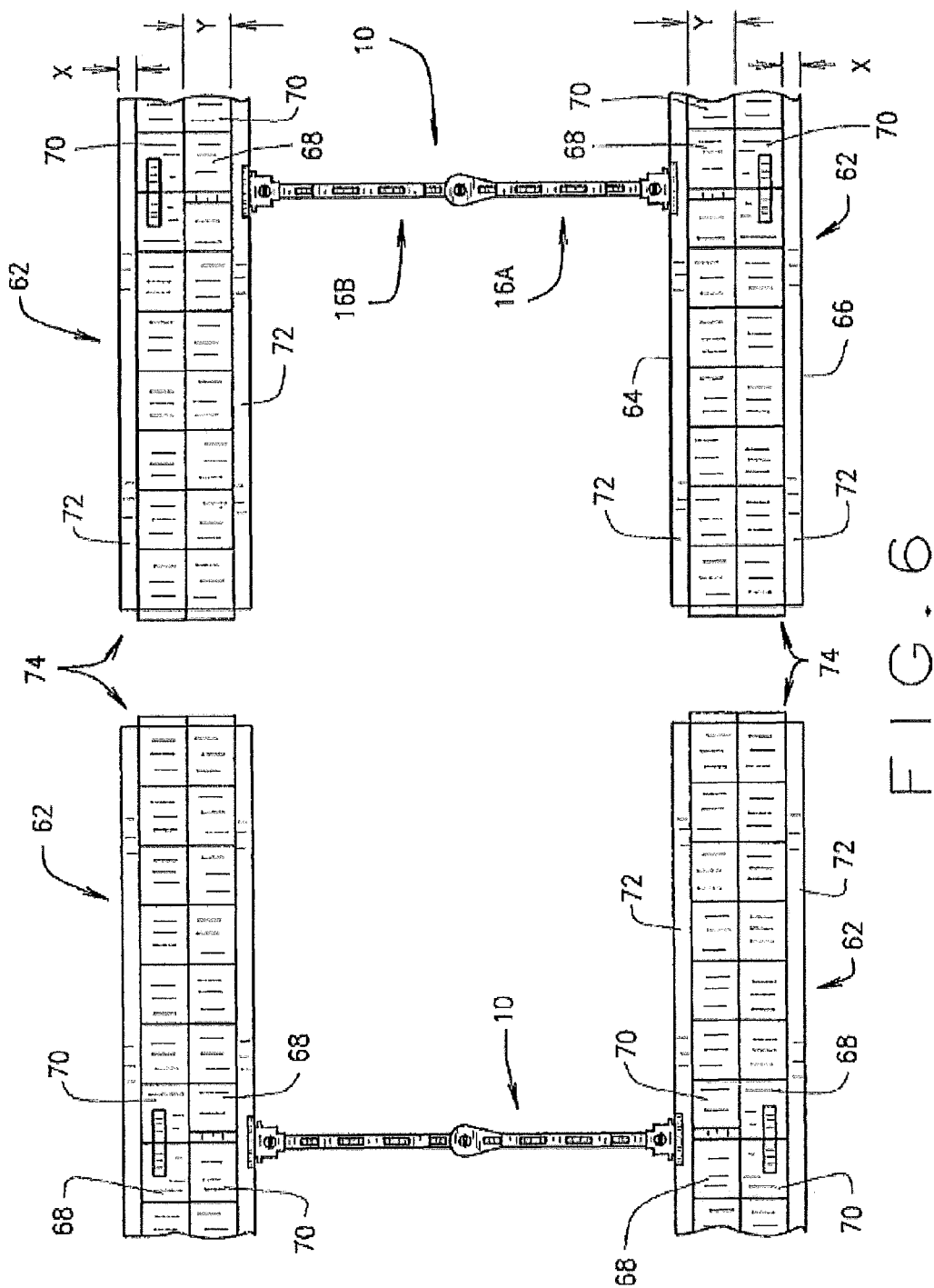
FIG. 6 is a partial top plan form view of two adjacent ICF blocks of FIG. 4.

An array of alternating teeth 68 and sockets 70 are formed in opposing horizontal longitudinal edges of the ICF panel members 62 as is best illustrated in FIGS. 4 and 6. In a preferred embodiment, the array includes a double median row of alternating teeth 68 and sockets 70, the rows being offset from each other by the distance of one side of one tooth 68. Since the array of alternating teeth and sockets are centrally located on the respective opposed horizontal longitudinal edges of the panel members 62, a substantially flat coplanar edge or surface 72 is established on each opposite side of the array of teeth and sockets, the substantially flat planar surfaces 72 extending substantially the full length of the opposing horizontal top and bottom longitudinal edges of each panel 62 on each opposite side of the array of teeth and sockets as best illustrated in FIGS. 4 and 6. These substantially flat surfaces 72 include no trap spaces and make for a stronger and tighter seal between interlocking surfaces thereby substantially improving the overall strength and stability of a wall structure constructed using the present blocks 60. The width of each of the planar surfaces 72 can be equal to or greater than the width of any one of the alternating teeth 68 or sockets 70, although a shorter width can likewise by used. In a preferred embodiment, the width "X" of each of the planar surfaces 72 is equal to or greater than one half (½) the width "Y" of one tooth 68 as best illustrated in FIG. 6. The substantially flat planar surfaces 72 likewise facilitate a cleaner outside exterior wall surface and reduce the amount of wall preparation work that is typically needed with certain exterior finish applications.

In addition, as best seen in FIGS. 4 and 6, the teeth 68 associated with one of the opposed horizontal longitudinal edges of the panels 62 are vertically aligned with the sockets 70 associated with the other of the opposed horizontal longitudinal edges of the panels 62, and the sockets 70 associated with one of the opposed horizontal longitudinal edges of the panels 62 are vertically aligned with the teeth 68 associated with the other of the opposed horizontal longitudinal edges of the panels 62. It is also important to recognize that the pair of panels 62 are positioned relative to each other such that the teeth 68 associated with the row of alternating teeth 68 and sockets 70 located closest to the outer surface 66 of one of the pair of panels 62 forming the block 60 are horizontally aligned with the sockets 70 associated with the row of alternating teeth and sockets located closest to the outer surface 66 of the other of the pair of panels 62 forming the block 60, and the teeth 68 associated with the row of alternating teeth 68 and sockets 70 located closest to the inner surface 64 of one of the pair of panels 62 forming a block 60 are horizontally aligned with the sockets 70 associated with the row of alternating teeth and sockets located adjacent the inner surface 64 of the other of the pair of panels 62 forming the block 60. Employing such a tooth and socket configuration along opposing longitudinal edges of a given ICF panel 62 yields a panel having opposing longitudinal edges capable of engageably receiving either opposing longitudinal edge of an adjacent, similarly configured, panel 62 of a straight block 60 or other block configuration in a stacked fashion. As a result, a block 60 employing a pair of panel members 62 each having opposed longitudinal edges of this configuration can be engageably stacked upon and below adjacent blocks 60 of substantially the same configuration, regardless of the vertical and/or horizontal orientation of the panels 62 around their respective longitudinal axes.

The space or socket 70 formed between adjacent teeth 68 is of such dimensions as to enable the socket 70 to snuggly and engageably receive a tooth 68 therewithin. Advantageously, the teeth 68 associated with one block 60 will overlap with the teeth of a stacked block 60 when the teeth 68 are positioned within corresponding sockets 70 a total of at least one inch. This overlapping arrangement is greater than the overlapping teeth configuration presently utilized in the marketplace and will further improve the strength of the interlocking teeth friction fit of the stacked blocks. In addition, a bevel (not shown) can be formed along at least a portion of the perimeter of the distal end of each tooth 68 to serve as a guide to direct the tooth 68 within a corresponding socket 70. In one embodiment (not shown), the bevel can be formed along and throughout the entire perimeter of the distal end. In another embodiment (not shown), the bevel can be formed along only a portion of the perimeter of the distal end such as along the two opposing sides of the teeth 68 that will engage the teeth 68 on either side of the corresponding socket 70. In this regard, it is recognized and anticipated that the length, width, height and configuration of the respective teeth 68 and sockets 70 can vary depending upon the particular application. The greater the lateral cross-sectional area of a tooth 68, the greater the strength of the tooth and the interlocking connection between respective blocks 60.

The opposing vertical ends 74 of the panels 62 may likewise include an array of alternating teeth 76 and sockets 78 formed therein as best illustrated in FIGS. 5, 8, 11A, 11B and 17 for engageably receiving corresponding teeth 76 and sockets 78 associated with either opposing vertical end of a similarly configured panel 62 when two such panels are positioned in a horizontally adjacent configuration. This configuration again yields ICF blocks that can be horizontally locked together regardless of the horizontal orientation of the vertical ends of such blocks. In one embodiment, the array includes at least one row of alternating teeth 76 and sockets 78. Here again, the location of the teeth 76 associated with one of the vertical longitudinal edges of the panels 62 corresponds with the location of the sockets 78 associated with the other of the vertical longitudinal edges of the panels 62, and the location of the sockets 78 associated with one of the vertical longitudinal edges of the panels 62 corresponds with the location of the teeth 76 associated with the other of the vertical longitudinal edges of the panels 62. In another embodiment, the array can include a double median row of alternating teeth 76 and sockets 78 positioned and arranged as specifically shown in FIG. 17 similar to the arrangement of teeth 68 and sockets 70 discussed above with respect to the opposed horizontal longitudinal edges of the panel members 62. Also, the vertical ends 74 of each panel 62 may likewise include substantially flat co-planar edges 79 similar to edges 72 discussed above. Interlocking of adjacent horizontally positioned blocks 60 are likewise further achieved by staggering the vertical placement of each row of blocks 60 such that one block 60 spans the interconnection of two horizontally adjacent blocks 60 located in the row therebelow.

As best illustrated in FIGS. 1 and 4, the fastening plate offset overlapping extension members 44A and 44B extend into the teeth area associated with the opposed horizontal longitudinal edges of each respective ICF panel 62 to provide an additional locking feature when ICF blocks are stacked on top of each other. As more clearly illustrated in the cutaway view of FIG. 7, the extension member 44A extends into and is at least partially encapsulated by the corresponding tooth 68 and its upper surface 45 lies in a plane substantially flush with or slightly below the upper top surface of the tooth 68. In similar respect, the side surface 47 of extension member 44A lies substantially flush with the side surface of the tooth 68 and is exposed into the adjacent socket 70. As a result, the teeth or gripping means 46 associated with the surface 47 of the fastening plate overlapping extension member 44A is likewise exposed to the adjacent open socket 70. The encapsulation of fastening plate overlapping extension member 44B into a corresponding tooth 68 associated with the opposite horizontal longitudinal edge of a particular ICF panel 62 is similarly configured such that the gripping means 46 associated therewith is similarly exposed to the adjacent socket 70. As a result, since the tie members 10 associated with similarly constructed ICF blocks 60 are positioned and located at the same longitudinal locations along the length of each respective block 60, the plurality of tie members 10 associated with one block 60 will align vertically with the plurality of tie members 10 associated with another block 60 vertically stacked thereabove. Since extension member 44A is a mirror image of and is offset to one side of the fastening plate 18 as compared to overlapping extension member 44B, when two similarly constructed blocks 60 are vertically engaged, the tooth 68 associated with one block panel 62 at least partially encapsulating the fastening plate overlapping extension member 44B will be inserted into the socket 70 positioned adjacent to the tooth 68 at least partially encapsulating the fastening plate overlapping extension member 44A associated with the other block panel. This will happen at each tie member location along the length of the respective blocks 60. As such, the teeth or gripping means 46 associated with the respective overlapping fastening plate extension members 44A and 44B will overlap with each other and align themselves for engagement with the respective sockets 70 when two ICF blocks 60 are joined. This integrated locking feature 46 associated with each respective extension member 44A and 44B will therefore create a positive connection between the stackable tie members 10 at each tie location. This functions as still a further locking feature when similarly constructed blocks 60 are stacked on top of each other. Even in a staggered arrangement from one row of blocks 60 to another row of blocks 60, the position and location of the respective tie members 10 are easily identified as well as the overlapping extension members 44A and 44B such that a worker can easily align the respective tie members 10 associated with vertically stacked but offset blocks 60. FIG. 8 shows the interconnection between the fastening plate overlapping extension members 44A and 44B when two similarly constructed blocks 60 are vertically stacked one on top of the other.

FIG. 9 shows a block 60 positioned in its folded position for packaging, storage, shipping, inventory, site storage and/or site staging. Since the tie members 10 are pivotally attached to the respective ICF panels 62 at their respective shut-off plates 20 and since the respective connection link members 16 are likewise pivotally connected to each other, this three hinged configuration allows each respective tie member 10 associated with each respective block 60 to be folded as illustrated in FIG. 9. Because the hinge pin members 34 are in alignment with each other as best illustrated in FIG. 3, the ICF panels 62 associated with each respective block 60 will not fold in perfect alignment with each other. Instead, as illustrated in FIG. 9, the opposed vertical ends 74 of the panels 62 comprising each respective block 60 are offset from each other. Nevertheless, even with this offset arrangement, this folding capability saves storage space, packing space, shipping space, and inventory space as well as costs associated therewith. It also reduces the amount of on-site storage room needed for storing blocks for a particular project and it likewise reduces the staging costs on larger multi-story structures.

It is also recognized and anticipated that the same offset folding capability can be achieved with a double hinge arrangement by merely hinging a substantially straight, one-piece web member between the respective side wall bracket hinge members 24. In this regard, the pair of connection link members 16 can be formed into a single, one-piece member having only hinge members 28 associated with the opposite end portions thereof for cooperative engagement with the hinge members 24 associated with the respective shut-off plates 20. Other double hinge configurations are likewise possible and will achieve the same offset folding configuration as illustrated in FIG. 9.

Use of the third hinge means located between the respective connection link members 16 in a straight line configuration as illustrated in FIG. 3 likewise serves a manufacturing function. The ability of tie member 10 to fold in three places, namely, in the middle and adjacent the inner surface 64 of each respective panel 62 serves as a prerequisite to being able to efficiently and economically offer a modular ICF system, and this triple hinged folding feature likewise provides the ability to redesign the ICF tools in a way that allows more than one size of ICF block to be made in each tool as is more fully discussed with respect to FIGS. 28-45.

Due to the high capital costs required to make ICF plastic injection tie tools as well as the ICF block tools in multiple heights and multiple widths, companies have not been able to offer a more modular system that offers a standard line of ICF blocks in multiple heights. The basic structure of the present tie member 10 in conjunction with a new set of innovative tooling designs and manufacturing processes as discussed hereinafter with respect to FIGS. 28-45, will allow a company to efficiently and more cost-effectively offer an improved ICF product line in multiple heights and widths. As best illustrated in FIG. 5, the present tie member 10 illustrated therein can be made in a predetermined height such as, for example, a 6-inch height. As a result, a block 60 incorporating a 6-inch high plurality of tie members 10 will yield a 6-inch tall ICF block such as the block 60 illustrated in FIG. 5. Based upon the predetermined height of a single tie member 10, a plurality of ICF blocks 60 having different block heights can be easily fabricated using the same tie member 10 in a stacked arrangement. In other words, each ICF block height will be a multiple of the shortest block height, or a multiple of the predetermined height of the tie member 10. It is also recognized that a single pre-selected block height can be stacked one on top of the other to achieve a desired block height based upon multiples of the pre-selected block height.

As best illustrated in FIG. 10, a pair of tie members 10 are vertically stacked on top of each other at each spaced tie location along the length of the block thereby producing a block 80 twice the height of a block 60 which utilizes just a single plurality of tie members 10. If, for example, the height of a single tie member 10 is six inches, the block 80 in FIG. 10 will be 12 inches high. In similar fashion, if three tie members 10 are vertically stacked one on top of the other at each tie location along the length of the block 82 illustrated in FIGS. 11A and 11B, an ICF block having an 18-inch height will be produced. Still further, a 24-inch ICF block height will require the stacking of 4 of the present 6-inch tie members 10 at each tie location along the length of the block. As a result, without changing the size and shape of tie member 10, and without requiring additional ICF tie tools, a plurality of ICF blocks can be made using the same tie member. In this regard, the integrated locking feature 46 associated with fastening plate extension members 44A and 44B facilitate the stacking of the present tie members 10 in the ICF block tool cavity as will be hereinafter further explained. This stacking capability is also illustrated in the partial cut-away view of FIG. 11B where the engagement of fastening plate overlapping extension members 44A and 44B is more clearly seen. ICF block tooling designed to accept the stacking of the individual tie members 10 is disclosed in FIGS. 28-45. As a result, using just the tie member 10, any plurality of ICF block heights based upon a multiple of the height of tie member 10 can be easily, quickly, and cost effectively produced.

In similar fashion, the same plurality of ICF block heights based upon any multiple of the height of the tie member 10 can likewise be made in a plurality of different widths. The modularity of the present tie member 10 enables the width of a particular ICF block to be easily changed by merely changing the overall length of the respective pair of connection link members 16 forming the web portion 14. The shape, construction and fabrication of the respective side wall brackets 12 will remain the same and the pivotal connection arrangement between the shut-off plate 20 and a corresponding connection link member 16 will likewise remain the same. In fact, the design and shape of the respective connection link members 16 will remain the same, the only difference being its overall length. As a result, only ICF plastic injection tie tools forming the respective connection link members 16 need be changed in order to produce multiple width tie members. The ICF plastic injection tie tools for forming the respective side wall brackets 12 will remain the same. Only the length of the connection link members 16 need be changed in order to change the width of a particular ICF block such as any one of the blocks 60, 80 or 82. As a result, all of the present ICF blocks can be made in multiple heights and multiple widths by using the same ICF plastic injection tie tools for the side wall brackets 12, the pin members 34, and the various ICF panel heights using a minimum number of ICF block tools as will be hereafter explained with respect to FIGS. 28-45.

Figure 11B:
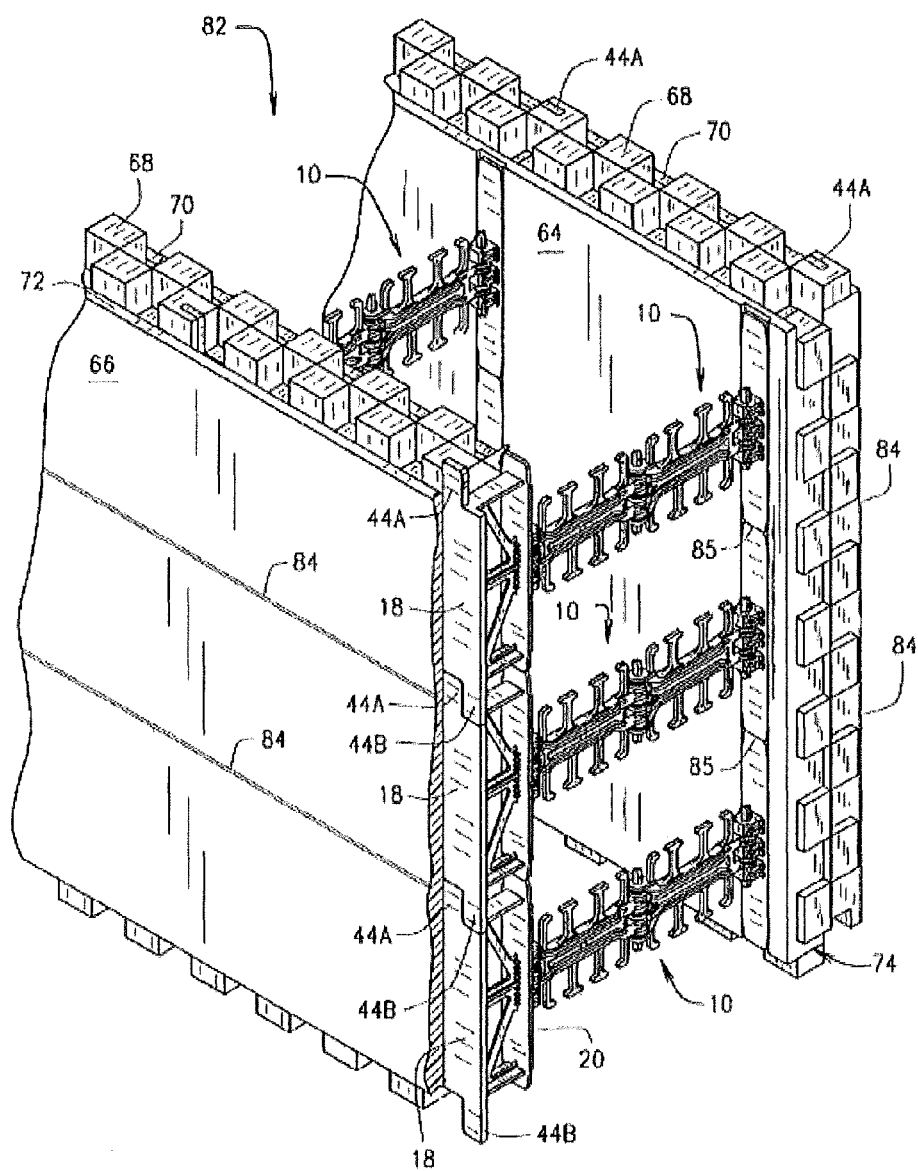
FIG. 11B is a partial perspective view of the ICF block of FIG. 11A showing a partial cut-away view of the vertically stacked engagement of the tie members of FIG. 1.

Still further, the modularity of the present tie members 10 also facilitates the creation of a new modular ICF block system which is now based on a common pre-determined interval of height based upon the height of the tie member 10. This modular capability will likewise enable heights based upon any multiple of the present tie member height to be severed or cut laterally at a plurality of different locations between the respective rows of stacked tie members 10 depending upon the height of the particular ICF block. For example, an 18-inch tall ICF block comprised by stacking three 6-inch tie members 10 vertically during the formation of the block as illustrated in FIGS. 11A and 11B will now be able to be cut on-site at both the ⅓ and ⅔ block positions reducing the amount of waste created. An ICF modular block system utilizing 6-inch, 12-inch, 18 and 24-inch block heights will now allow a designer to design a wall in any one foot or half foot increments because the present ICF system will be able to hit any such height. Utilizing the 6-inch height as the standard or basic tie member 10 height also facilitates some of the tooling and manufacturing processes discussed in Applicant's co-pending application. In similar fashion, a 24-inch ICF block height can be cut on-site at the ¼, ½, and ¾ block positions. In this regard, the exterior surface 66 of each panel forming ICF blocks 80 and 82, or any other panel height, can include a mark or other indicator 84 along its longitudinal axis at the appropriate locations for severing as best illustrated in FIG. 11B. These marks or indicators aid in accurately severing a block laterally at the appropriate location between a pair of stacked tie members 10. Cutting the ICF block along any one of the indicators 84 will sever the block between the two joined shut-off plates 20 associated with adjacent tie members 10 such as at the location 85 illustrated in FIG. 11B. Importantly, each of the resulting severed block portions will possess at least one substantially intact tie member 10 subsequently centered in the middle of each respective severed block portion.

Still further, as best illustrated in FIG. 11B, when more than two of the present tie members are vertically stacked at a plurality of spaced locations along the length of the ICF block to establish the overall height of the ICF block, each intermediate tie member 10 such as intermediate tie member 10I in the plurality of vertically stacked tie members has its opposed fastening plate extension portions 44A and 44B positioned in overlapping relationship with the fastening plate extension portion associated with an adjacent tie member, even though such extension portions 44A and 44B are embedded within the respective opposed panel members 62. In addition, the engaging members 46 associated with overlapping extension members 44A and 44B of the intermediate tie member 10I are likewise mated and engaged while embedded within the respective opposed panel members 62. This additional joinder promotes strength and stability regardless of the number of tie members 10 vertically stacked along the length of the panel members 62 to achieve a particular ICF block height.

Still further, in another aspect of the present invention, a wide plurality of ICF block heights can be achieved by making at least two different predetermined block heights each utilizing a single row of spaced apart tie members 10 extending along the length of each respective block. For example, referring again to FIG. 5, a plurality of blocks 60 could be made incorporating a 6-inch high plurality of tie members 10 which will yield a 6-inch tall ICF block, and a plurality of blocks 60 could also be made incorporating an 8-inch high plurality of tie members 10 which will yield an 8-inch tall ICF block. Using a combination of 6-inch and 8-inch tall ICF blocks, all usable heights except for a 10-inch tall ICF block can be achieved by simply stacking one or more of the 6-inch tall and/or 8-inch tall ICF blocks one upon the other to achieve the overall desired block height. For example, interconnecting two 6-inch tall ICF blocks will yield a 12-inch tall ICF block; interconnecting a 6-inch tall ICF block with an 8-inch tall ICF block will yield a 14-inch tall ICF block; interconnecting two 8-inch tall ICF blocks will yield a 16-inch tall ICF block; interconnecting three 6-inch tall ICF blocks will yield an 18-inch tall ICF block; interconnecting two 6-inch tall ICF blocks and an 8-inch tall ICF block will yield a 20-inch tall ICF block; interconnecting two 8-inch tall ICF blocks and a 6-inch tall ICF block will yield a 22-inch tall ICF block; interconnecting four 6-inch tall ICF blocks will yield a 24-inch tall ICF block; interconnecting three 6-inch tall ICF blocks and an 8-inch tall ICF block will yield a 26-inch tall ICF block; interconnecting two 8-inch tall ICF blocks and two 6-inch tall ICF blocks will yield a 28-inch tall ICF block, and so forth. Due to the plurality of locking mechanisms associated with the present panel members 62 and blocks such as the blocks 60 including the array of alternating teeth 68 and sockets 70 formed thereon, the overlapping fastening plate extension portions 44A and 44B associated with the present panel members and blocks, and the additional interlocking mechanisms 120 associated with the top portion of each respective tie member 108 as will be hereinafter further explained with reference to FIGS. 12-16, stacking of the present ICF blocks as well as the stacking of the present tie members 10 and 108 yields a strong, stable block regardless of how many 6-inch tall and/or 8-inch tall ICF blocks are vertically stacked one upon the other. As a result, the plurality of ICF block heights can likewise be easily achieved based upon combining any one or more of a 6-inch tall ICF block and/or an 8-inch tall ICF block. This substantially reduces tooling requirements and eliminates the need to stack a plurality of the present tie members 10 in an ICF block tool cavity as will be hereinafter explained. Instead of stacking the present tie members 10 and/or 108 in a cavity mold to form a desired block height, a plurality of 6-inch tall ICF blocks and/or 8-inch tall ICF blocks can be stacked in order to achieve all usable and desirable heights except for a 10-inch tall ICF block. This stacking can occur on site or can be accomplished prior to transportation of the ICF blocks to a building site in order to expedite construction. In similar fashion, the same plurality of ICF block heights based upon combining any plurality of 6-inch tall ICF blocks and/or 8-inch tall ICF blocks can likewise be made in a plurality of different widths as previously explained by merely changing the overall length of the respective pair of connection link members 16A and 16B forming the web portion 14.

Figure 12:
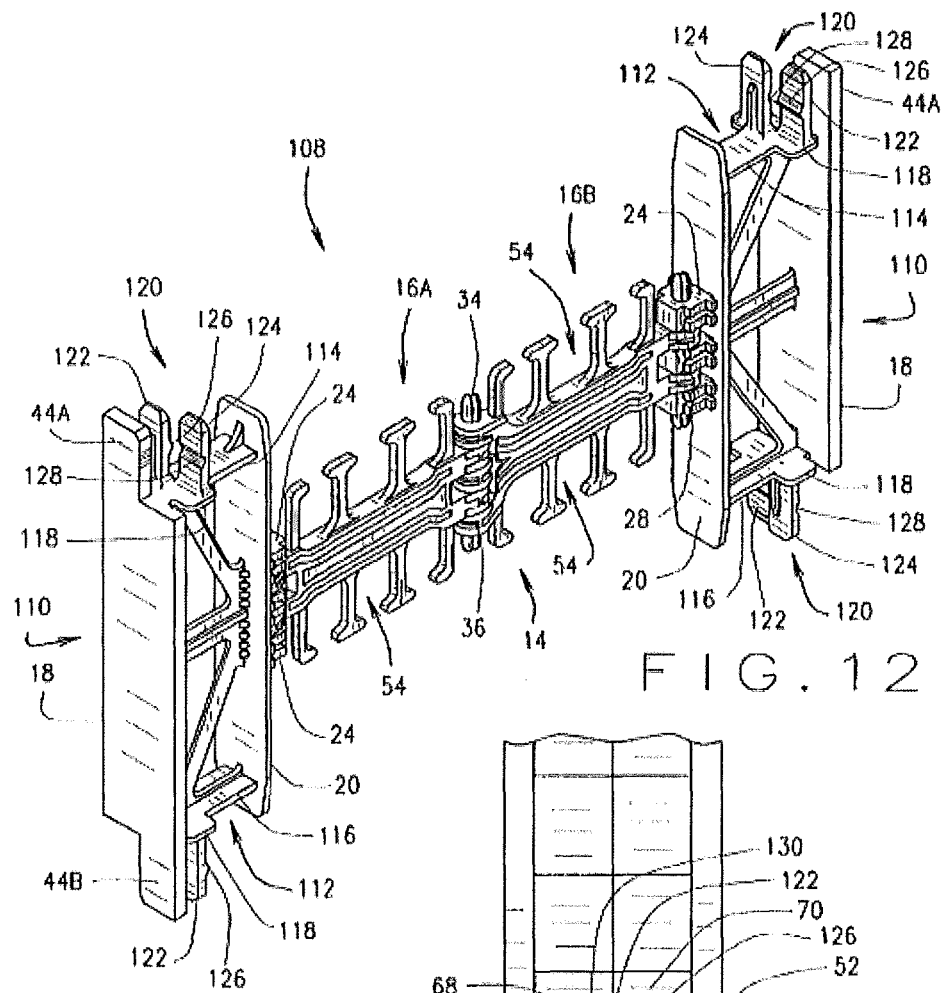
FIG. 12 is a perspective view of another embodiment of a stackable/foldable tie member constructed according to the teachings of the present invention.

In still another aspect of the present invention, FIGS. 12-16 illustrate still another embodiment of the present tie member, namely, tie member 108, constructed in accordance with the teachings of the present invention. The tie member 108 is substantially identical to tie member 10 except that tie member 108 includes an additional interlocking mechanism associated with the top and bottom portions of each respective side wall bracket member as will be hereinafter further explained. More particularly, tie member 108 includes a pair of opposed side wall bracket members 110 which are substantially identical to side wall bracket members 12 in that they each include a fastening plate 18, a spaced apart shut-off plate 20, and a plurality of bridging members connected therebetween forming a substantially similar truss structure 112 therebetween. The truss structure 112 is substantially identical to truss structure 22 except that the top and bottom bridging members 114 and 116 each include a platform member 118 which is sized and shaped to hold the interlocking mechanism 120 as best illustrated in FIGS. 12 and 14.

Interlocking mechanism 120 includes a pair of first and second interlocking members or finger extensions 122 and 124 positioned and located between fastening plate 18 and shut-off plate 20, first interlocking member 122 having a projection 126 associated therewith and second interlocking member 124 having a groove 128 associated therewith as best illustrated in FIGS. 12 and 14. The pair of first and second interlocking members 122 and 124 are laterally offset and staggered from each other as best illustrated in FIG. 14, the interlocking mechanisms 120 associated with the top bridging member 114 associated with a respective pair of side wall bracket members 110 being cooperatively engageable with the interlocking mechanisms 120 associated with the lower bridging member 116 associated with a corresponding pair of side wall bracket members 110 when a pair of similar tie members 108 are vertically stacked one on top of the other as previously explained with respect to tie member 10. In this regard, the interlocking mechanism 120 associated with the top portion of each respective side wall bracket member 110 is a mirror image of the interlocking mechanism 120 associated with the lower opposite end portion of each respective side wall bracket member 110 as best illustrated in FIGS. 12 and 13, and interlocking member or finger extension 122 is always positioned closest to and in longitudinal alignment with the fastening plate overlapping extension portions 44A and 44B associated with the fastening plate 18, whereas the second interlocking member or finger extension 124 is always positioned in a laterally offset arrangement relative to interlocking member 122 and further away from fastening plate member 18 as again best illustrated in FIGS. 12 and 14. This offset arrangement enables the projection 126 associated with the first interlocking member 122 associated with one end portion of each respective side wall bracket member 110 to cooperatively engage the groove 128 associated with the second interlocking member 124 associated with the opposite end portion of each respective side wall bracket 110 when two side wall brackets 110 are stacked one on top of the other. The interlocking mechanism 120 thereby provides a double snap lock feature associated with each respective side wall bracket member in addition to the overlapping engagement of the fastening plate extension portions 44A and 44B as previously explained. This additional interlocking mechanism 120 associated with the opposite end portions of each respective side wall bracket 110 allows any plurality of tie members 108 to be vertically stacked and interconnected one on top of the other to build any plurality of vertically stacked tie members 108 to achieve different ICF block heights such as ICF blocks 80 (FIG. 10) and 82 (FIG. 11A) discussed above. Just like tie member 10, tie member 108 can be used to form any plurality of ICF block heights based upon any multiple of the height of tie member 108.

Figure 15:
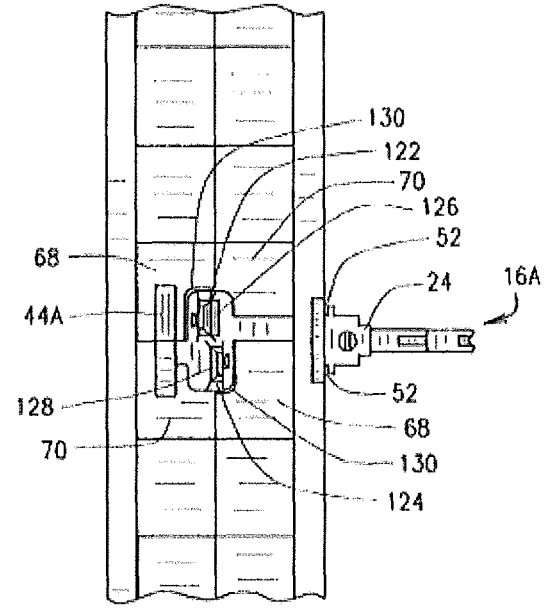
FIG. 15 is a partial top plan form view of a pre-constructed straight ICF form block of the present invention showing one of the side wall bracket members of the tie member of FIG. 12 encapsulated therewithin and showing the additional attachment mechanism projecting into the interlocking teeth area associated with the ICF panel.
Figure 16:
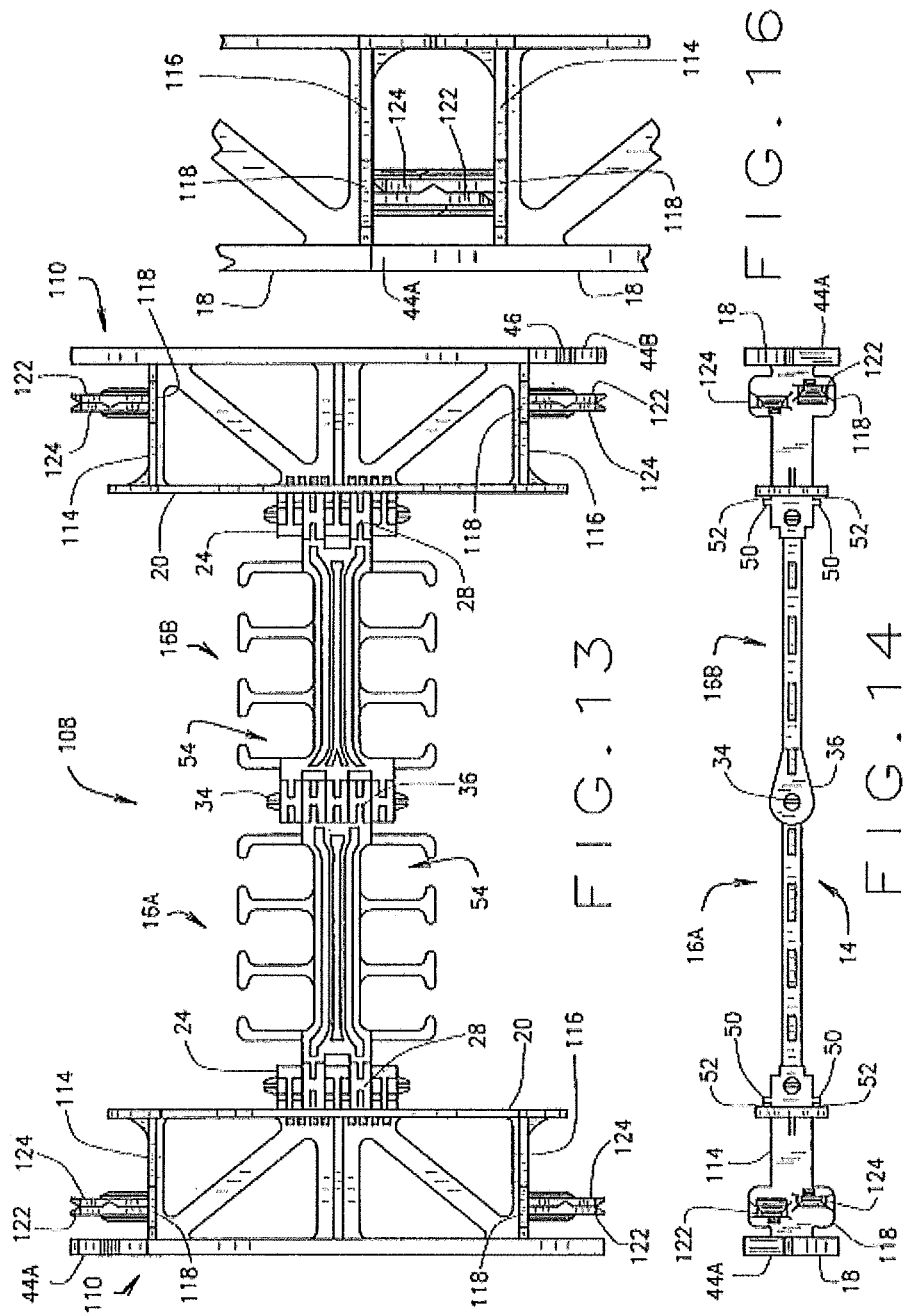
FIG. 16 is a partial side elevational view of two of the tie members of FIG. 12 positioned in interlocking relationship with each other.
Figure 17:
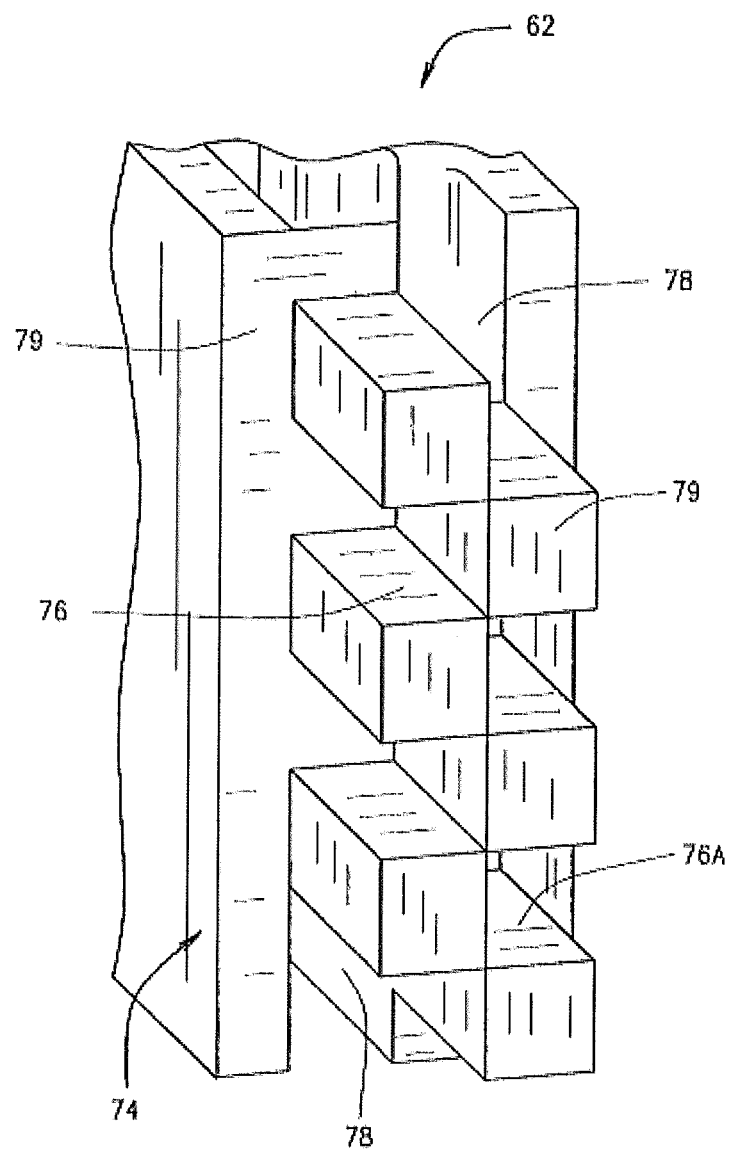
FIG. 17 is a partially enlarged perspective view of one embodiment of a tooth and socket arrangement associated with each opposed vertical end of the panels forming an ICF block.

Similar to the fastening plate offset overlapping extension members 44A and 44B, the interlocking mechanism 120 associated with the top and bottom portions of the pair of side wall bracket members 110 associated with the tie member 108 positioned adjacent the opposed horizontal longitudinal edges of each ICF panel forming a particular ICF block likewise extend into the teeth area associated with the opposed horizontal longitudinal edges of each respective ICF panel to provide an additional locking feature when ICF blocks are stacked on top of each other. As more clearly illustrated in FIG. 15, the offset interlocking members 122 and 124 extend into corresponding teeth 68 at the approximate center of the panel member. In this regard, the corresponding teeth 68 adapted to receive the first and second interlocking members 122 and 124 are offset from each other as shown in FIG. 15 and each respective tooth 68 has a corner portion removed therefrom forming a space or cavity 130 sufficient to receive the respective interlocking members 122 and 124. Also, since the respective teeth 68 adapted to receive the interlocking members 122 and 124 are positioned adjacent respective corresponding sockets 70, the projection 126 and the groove 128 associated with the interlocking members 122 and 124 are exposed to the adjacent sockets 70 and this likewise provides sufficient space for engaging a corresponding interlocking mechanism 120 associated with another vertically stacked side wall bracket member 110. As a result, when one ICF block is vertically arranged on top of a similarly constructed ICF block, the interlocking mechanisms 120 associated with the top portion of each respective tie member 108 associated with one of the ICF blocks will cooperatively engage and interconnect with the interlocking mechanisms 120 associated with the bottom portion of each respective side wall bracket member 110 associated with the plurality of tie members 108 in the other ICF block. Since the tie members 108 associated with similarly constructed ICF blocks are positioned and located at the same longitudinal locations along the length of each respective ICF block, the plurality of tie members 108 associated with one ICF block are aligned vertically with the plurality of tie members 108 associated with another ICF block vertically stacked thereabove.

Figure 19:
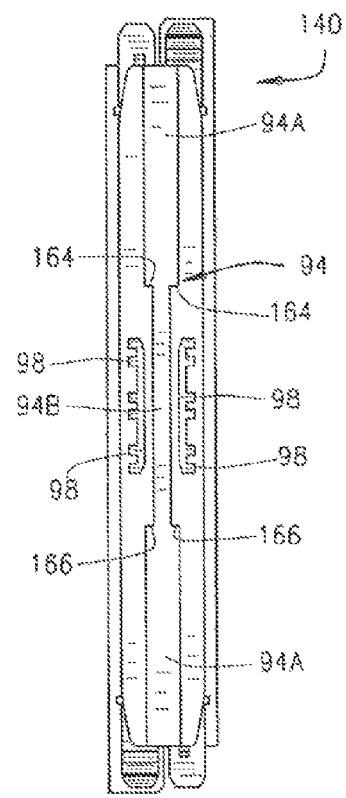
FIG. 19 is an end elevational view of one of the side wall bracket members illustrated in FIG. 18.

When two similarly constructed ICF blocks are vertically engaged, the interlocking members 122 and 124 associated with the horizontal longitudinal edge of each panel member forming one ICF block will have its corresponding projection 126 and groove 128 extending into an adjacent socket 70 and such interlocking members 122 and 124 will be inserted into the corresponding sockets 70 associated with the horizontal longitudinal edge of each panel member forming the other ICF block to which it is being attached. This engagement will happen at each tie member location along the length of the respective ICF blocks so joined. As such, the snap lock feature 120 associated with each respective tie member 108 at each opposed side wall bracket 110 will cooperatively engage when two ICF blocks are joined. This additional locking feature associated with each side wall bracket member 110 will therefore create a still further positive connection between the stackable tie members 108 at each tie location. This functions as still a further locking feature when similarly constructed ICF blocks are stacked on top of each other. This interlocking connection between two side wall bracket members 110 associated with similarly constructed and stacked ICF blocks is illustrated in FIG. 19. In this regard, it is recognized that the engagement of the projection 126 and groove 128 associated with corresponding first and second interlocking members 122 and 124 do not have to be flush with each other when engaged so long as the engagement achieves a connection. It is also further recognized and anticipated that any plurality of projections 126 and grooves 128 can be associated with interlocking members 122 and 124 as will be hereinafter further explained.

In all other respects, the tie member 108 is substantially identical to the tie member 10 in that it likewise includes similarly constructed shut-off plates 20 each including a plurality of spaced-apart projections 24 as previously explained for attaching to the web portion 14 which includes a pair of cooperatively engageable connection link members 16A and 16B as previously described with respect to FIG. 2. The connection link members 16A and 16B likewise include hinged projection members 28 and 36 for cooperatively engaging each other and the projections 24 associated with the shut-off plates 20 via pin members 34 as previously explained with respect to tie member 10. Importantly, each tie member 108 likewise includes a pair of corresponding tool engaging slots 52, each slot 52 being formed adjacent the respective shut-off plates 20 as previously explained. This enables the side wall bracket members 110 associated with each tie member 108 to be cooperatively held and secured within the ICF block forming tool as will be hereinafter explained. As a result, side wall bracket members 110 can be used in all of the same applications as side wall bracket member 12 associated with tie member 10.

Still further, it is also recognized and anticipated that the interlocking mechanism 120 associated with tie member 108 can be used in combination with the fastening plate overlapping extension portions 44A and 44B including in combination with the gripping means 46 associated with each respective extension member 44A and 44B. It is also recognized and anticipated that the interlocking mechanism 120 can likewise be utilized in combination with the fastening plate overlapping extension portions 44A and 44B without use of the gripping means 46 associated respectively therewith since the interlocking members 122 and 124 form a positive double-snap locking arrangement between vertically stacked tie members 108 and between vertically stacked similarly constructed ICF blocks. Still further, it is recognized and anticipated that the interlocking mechanisms 120 can be used by themselves without utilizing the fastening plate overlapping extension portions 44A and 44B discussed above. In this regard, the side wall bracket members could be fashioned substantially identically to the side wall bracket members 110 except that the fastening plate extension members 44A and 44B can be removed and a substantially flat continuous fastening plate could be utilized in its stead. In such an embodiment, the interlocking mechanism 120 would provide the only positive interlocking connection between vertically stacked tie members and between similarly constructed ICF blocks. In all other respects, the tie member 108 functions substantially similarly to the tie member 10 including being pivotally foldable and collapsible as illustrated in FIG. 9 with respect to tie member 10, and the connection link members 16A and 16B associated with tie member 108 can likewise include any number of rebar seats 54 as previously explained.

Figure 18:
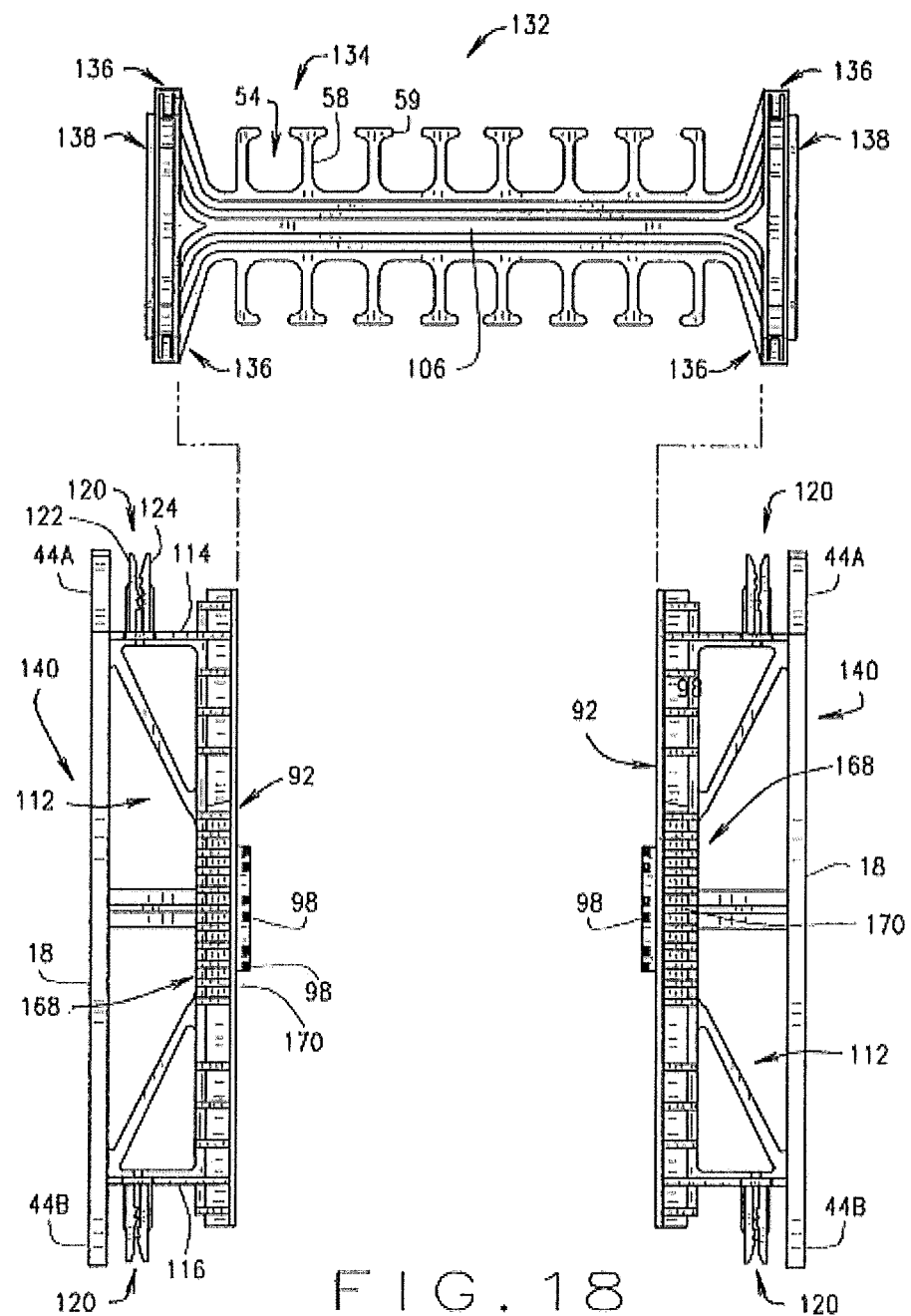
FIG. 18 is a perspective view of another embodiment of a field assembled tie member constructed according to the teachings of the present invention.
Figure 21:
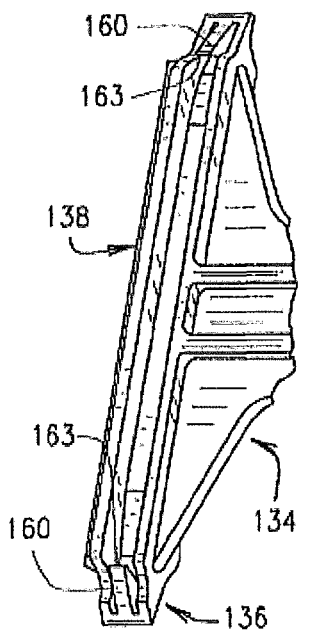
FIG. 21 is a partially enlarged perspective view of one of the opposed end portions of the web member illustrated in FIG. 18 showing the locking mechanism associated with each opposite end portion thereof.
Figure 22:
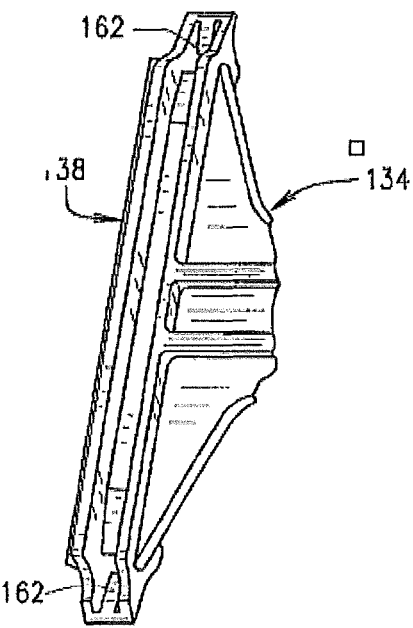
FIG. 22 is a partially enlarged perspective view similar to FIG. 21 showing the opposite side portion of the respective locking mechanisms associated with each opposite end portion of the field assembled web member.
Figure 23:
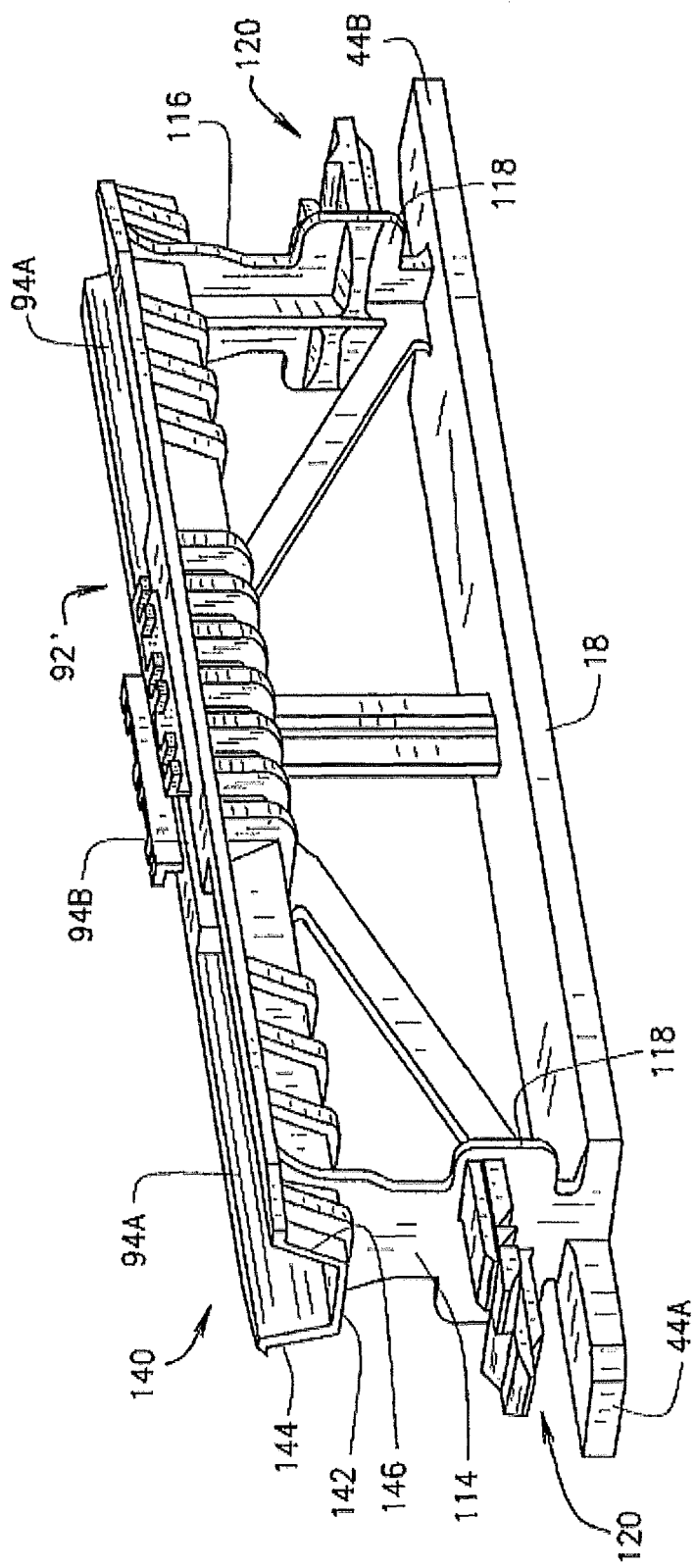
FIG. 23 is a perspective view of one of the side wall bracket members illustrated in FIGS. 18-20.

In still another aspect of the present invention, FIGS. 18-24 illustrate one embodiment of a field assembled modular tie member 132 constructed in accordance with the teachings of the present invention. The tie member 132 includes at least one snap-locked stop member 136 associated with at least the top portion of each respective end portion 138 associated with the web member 134 as well as an additional interlocking mechanism 120 as previously explained with respect to tie member 108. More particularly, tie member 132 includes a pair of opposed side wall brackets 140 separated by, and connected to, a center web member 134. Unlike web member 14; web member 134 is a single, one-piece member as best illustrated in FIG. 18 which is cooperatively engageable with the respective side wall bracket member 140, one of which is best illustrated in FIGS. 19 and 23, as will be hereinafter further explained. Side wall brackets 140 are substantially identical in structure to each other and are adapted to receive the web member 134 regardless of its width. Web member 134 includes at least one snap-locked stop member 136 associated with at least the top portion of each respective end portion 138. Tie member 132 likewise includes an additional interlocking mechanism 120 as previously explained with respect to tie member 108.

Each side wall bracket member 140 is substantially similar to the side wall bracket members 12 in that they likewise include the same fastening plate 18, a spaced apart shut-off plate 92 which is slightly different from shut-off plate 20, and the same identical plurality of bridging members connected therebetween forming substantially the same identical truss structure 112 therebetween. The fastening plate 18 likewise includes substantially identical overlapping extension end portions 44A and 44B positioned in offset relationship to each other at the respective opposite end portions thereof for allowing the respective tie members 132 to likewise cooperatively engage other similarly constructed tie members 132 which are stackably arranged one on top of the other as previously explained with respect to tie member 10. The extension members 44A and 44B may or may not include engaging members 46 as previously explained with respect to tie member 10. In all other respects, the side wall bracket member 140 components 18, 22, 44A, 44B are constructed, function and operate as previously explained with respect to the identical components associated with tie members 10 and 108.

The shut-off plate 92 associated with side wall bracket member 140 differs from shut-off plate 20 in that it does not include any hinge means such as the projections 24 associated with shut-off plate 20. Instead, shut-off plate 92 includes a slot 94 adapted to receive the correspondingly shaped opposed end portions 138 of the web member 134 when a respective end portion 138 is insertably positioned within the slot 94. In this regard, the web member 134 is slidably engageable with a pair of opposed side wall bracket members 140 when the bracket members 140 are each respectively encapsulated within an ICF panel member such as panel member 62. Each slot 94 includes an intermediate narrower slot portion 94B which is flanked on each opposite end thereof by a wider slot portion 94A as best shown in FIG. 22. Slot portion 94A is slightly larger than slot portion 94B so that the opposed end portions 136 of the web member 134 can be inserted into a particular pair of opposed side wall bracket members 140 regardless of their location in a particular ICF block structure including at any intermediate location when a particular ICF block includes two or more field assembled tie members 132. The wide slot portion 94A allows the opposed end portions 136 of each web member 134 to be easily inserted therein and then moved into engagement with slot portion 94B.

In this regard, the respective slot portions 94A are formed by side wall portions 142, 144 and 146 as best illustrated in FIG. 23. To further facilitate the insertion of the opposed end portions 138 of the web member 134 into the slot 94 at any intermediate location in a particular ICF block structure, the opposed side walls 144 and 146 forming the slot portion 94A are flared, tapered or angled outwardly away from each other as illustrated in FIG. 23. This tapering or angling of slot side walls 144 and 146 creates sloping or angularly related opposed side walls 144 and 146 forming the slot portion 94A which, in effect, provides for a truncated V-shaped slot portion which is wider in width at its outer terminal edge portions as compared to the slot width at a location which is opposite its outer terminal edge portions or adjacent wall portion 142 (FIG. 23). This truncated V-shaped slot portion further facilitates the easy insertion of the opposed end portions 138 of each web member 134 at any intermediate location when a particular ICF block includes two or more field assembled tie members 132 positioned in a vertically stacked arrangement.

Figure 20:
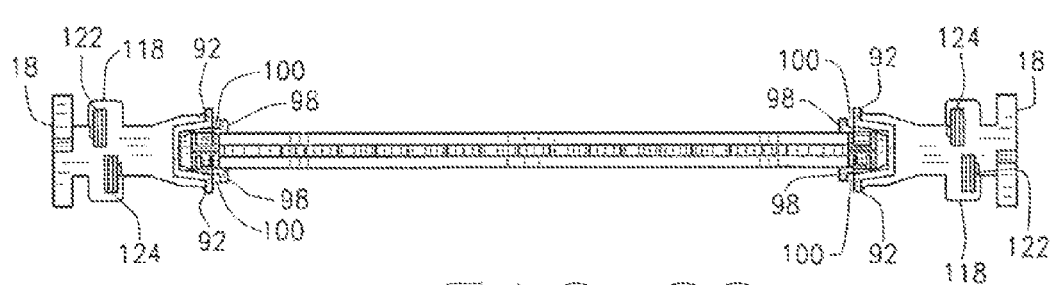
FIG. 20 is a top plan form view of the tie member illustrated in FIG. 21 in its assembled form.
Figure 25:
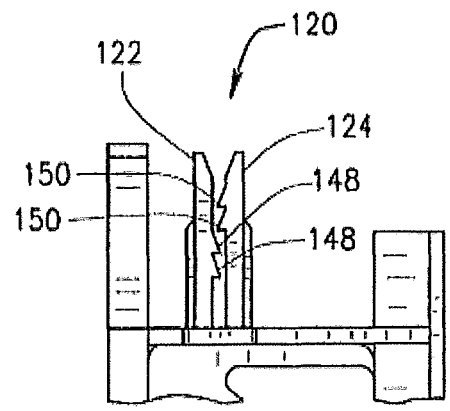
FIG. 25 is a partially enlarged side elevational view of one embodiment of the attachment members associated with one end portion of the side wall bracket members illustrated in FIG. 18.

Each side wall bracket member 140 likewise includes a pair of interlocking mechanisms 120 as previously explained with respect to tie member 108. In this regard, the truss structure 112 of field assembled tie member 132 is substantially identical to truss structure 112 associated with foldable tie member 108 and includes top and bottom bridging members 114 and 116 which each include a platform member 118 which is sized and shaped to hold the interlocking mechanism 120 as best illustrated in FIGS. 20 and 23. Interlocking mechanism 120 includes a pair of first and second interlocking members or finger extensions 122 and 124 which are positioned and located in a laterally offset and staggered arrangement between fastening plate 18 and shut-off plate 92 as previously explained with respect to tie member 108. In the particular embodiment illustrated in FIGS. 18-20 and 25, the first interlocking member 122 includes a pair of projection members 148 and the second interlocking member 124 likewise includes a pair of projection members 150 as best illustrated in FIG. 25. This arrangement is slightly different from the interlocking mechanism 120 illustrated with respect to tie member 108 wherein the first interlocking member 122 includes a single projection member 126 and the second interlocking member 124 includes a corresponding groove 128 as best illustrated in FIGS. 12 and 15. As previously explained, it is recognized and anticipated that any plurality of projections and/or grooves can be associated with the interlocking members 122 and 124 in order to achieve an overlapping snap locked engagement between the respective members 122 and 124. In all other respects, the interlocking mechanism 120 associated with field assembled tie member 132 is substantially identical in function and operation to the interlocking mechanism 120 associated with tie member 108.

In this regard, the interlocking mechanisms 120 associated with the top bridging member 114 associated with a respective pair of side wall bracket members 140 are cooperatively engageable with the interlocking mechanisms 120 associated with the lower bridging member 116 associated with a corresponding pair of side wall bracket members 140 when a pair of similar tie members 132 are vertically stacked one on top of the other as previously explained with respect to tie member 108. The interlocking mechanism 120 associated with the top portion of each respective side wall bracket member 140 is a mirror image of the interlocking mechanism 120 associated with the lower opposite end portion of each respective side wall bracket member 140 as best illustrated in FIGS. 18 and 20. The laterally offset arrangement of the interlocking members 122 and 124 enables the projections 148 associated with the first interlocking member 122 to overlap and cooperatively engage with the projection members 150 associated with the second interlocking member 124 when two side wall bracket members 140 are stacked one on top of the other. In this regard, the engagement of the respective projections or teeth 148 and 150 associated with the corresponding first and second interlocking members 122 and 124 do not have to be flush with each other when engaged so long as the engagement achieves a connection therebetween.

Figure 26:
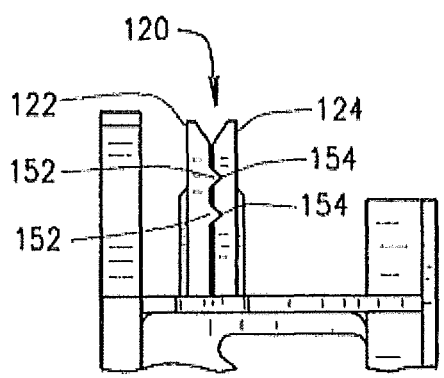
FIG. 26 is a partially enlarged side elevational view of another embodiment of the attachment members illustrated in FIG. 25.
Figure 27:
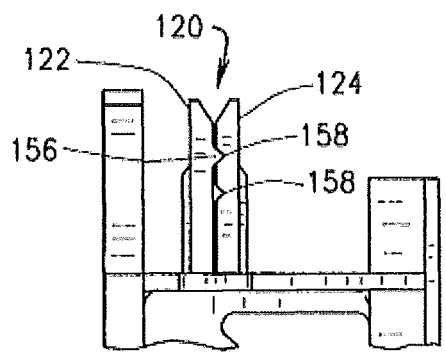
FIG. 27 is a partially enlarged side elevational view of still another embodiment of the attachment members illustrated in FIGS. 25 and 26.
Figure 28:
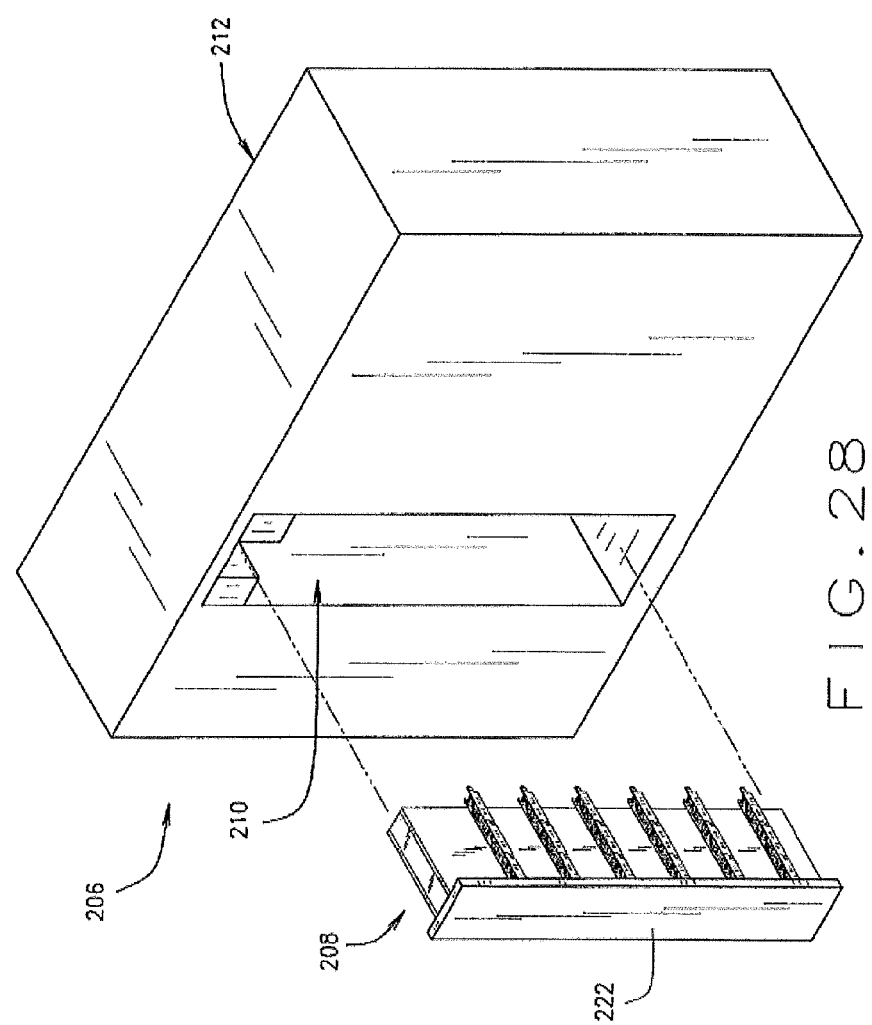
FIG. 28 is a perspective view of one embodiment of an ICF tool for making ICF blocks using the present tie members constructed according to the teachings of the present invention.

It is recognized that any plurality of teeth or projections 148 and 150 can be associated with the interlocking members 122 and 124 including a greater number of teeth associated with one interlocking member as compared to the other interlocking member. Still further, it is recognized and anticipated that interlocking member 122 can include a pair of teeth or projection members 152 for engaging a corresponding pair of grooves 154 associated with interlocking member 124 as best illustrated in FIG. 26. Still further, it is recognized and anticipated that interlocking member 122 may include a single tooth or projection member 156 and interlocking member 124 may include a pair of grooves 158 as best illustrated in FIG. 27. In this regard, it is recognized and anticipated that any number and any combination of teeth and grooves can be associated with the respective interlocking members 122 and 124 in order to achieve an overlapping snap lock between adjacent side wall bracket members 140. This includes teeth members engaging teeth members or teeth members engaging grooves as illustrated in FIGS. 25-27.

It is also recognized and anticipated that other cooperatively engagement means can be associated with interlocking members 122 and 124 in order to achieve a snap lock engagement therebetween. Still further, it is recognized that the position and location of the interlocking mechanism 120 between the fastening plate 18 and the shut-off plate 92' can be varied and that the interlocking mechanism 120 can be located at any position therebetween so long as the interlocking mechanism 120 associated with the tie members 108 and 132 positioned adjacent the opposed horizontal longitudinal edges of each ICF panel forming a particular ICF block likewise extends into the teeth area associated with the opposed horizontal longitudinal edges of each respective ICF panel such as illustrated in FIG. 15. The interlocking mechanism 120 functions and operates as previously described with respect to tie member 108 in order to provide either a primary or a secondary locking feature when ICF blocks are stacked on top of each other as previously explained.

Still further, as best illustrated in FIGS. 19 and 20, each of the side wall brackets 140, similar to sidewall brackets 12, likewise includes at least one set of opposed projections or fingers 98 associated with shut-off plate 92 on opposite sides of the slot 94 which extend in the direction parallel to the shut-off plate 92. Each of the projections or fingers 98 are likewise in substantial alignment with each other as best illustrated in FIG. 19 so as to form a corresponding slot 100 between the shut-off plate 92 and the respective projections 98 as previously explained and as again illustrated in FIGS. 20 and 23. The slots 100 formed by the aligned projection members 98 function in a similar capacity to the slots 52 associated with tie member 10 thereby enabling the respective side wall bracket members 140 to be grabbed by and secured within the ICF block forming tool in a single form and in a stacking arrangement. The projections 98 again function as tool engaging members for securing the field assembled side wall bracket members 140 within a particular tool cavity.

Figure 24:
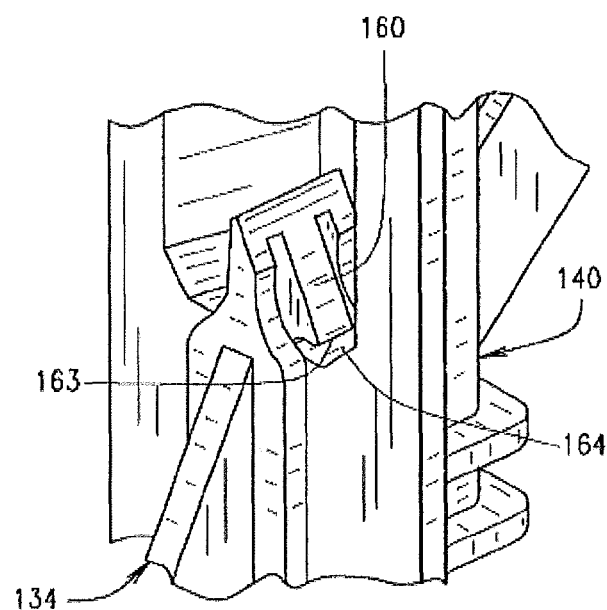
FIG. 24 is a partial perspective view showing the engagement of one of the locking mechanisms associated with the field assembled web member with a corresponding side wall bracket member.

As best illustrated in FIGS. 18, 21, 22 and 24, the web member 134 includes at least one snap locked stop member 136 associated with at least the top end portion of each respective end portion 138, the stop member 136 functioning to position and locate the web member 134 in proper position within the slot 94 associated with each opposed side wall bracket member 140. As best illustrated in FIGS. 18, 21 and 22, each opposite end portion of each end portion 138 of web member 134 includes a stop member 136. The stop member 136 is best illustrated in FIG. 24 and includes a resilient projection or locking member 160 which is positioned and located on one side portion of each respective end portion 138, such as the front portion of web member 134 as illustrated in FIG. 21. The opposite side of each respective end portion 138 incorporating the snap locked stop member 136 is best illustrated in FIG. 22 and includes an open space or cavity 162 for allowing the projection member 160 to be moved or flexed into the space 162 as a respective end portion 138 of web member 134 is slidably engaged with and moved through the corresponding slots 94 associated with the opposed side wall bracket members 140. In this regard, the resilient locking member 160 is sized and shaped so that the resilient member 160 associated with the respective bottom portions of the end portions 138 of web member 134 is automatically moved or flexed into space 162 as the web member 134 is slidably moved into slot portion 94A and the resilient member 160 is further moved or flexed into space 162 as the web member 134 is moved from slot portion 94A into slot portion 94B. This automatic flexing of the member 160 as it is inserted into slot 94 occurs due to the tapered or angular slope or shape of the member 160 as best illustrated in FIGS. 21 and 24. Because the resilient locking members 160 associated with the top and bottom end portions of web end portions 138 are mirror images of each other, the bottom resilient member 160 will always be properly oriented for slidably engaging slot 94 and flexing into space 162 regardless of which opposite end portion of web end portions 138 is inserted into slot 94.

As the bottom end portion of each web end portion 138 continues its movement through slot portion 94B and back into the lower slot portion 94A, the resilient projection stop member 160 is allowed to move back at least partially towards its original non-flexed position. As projection member 160 associated with the top portion of each respective web end portion 138 approaches slot portion 94B, because of the orientation of the upper stop member 160, the surface 163 associated with resilient member 160 will engage the ledge portion 164 positioned and located between slot portion 94A and slot portion 94B. This engagement of stop member 160 with ledge portion 164 prevents the web member 134 from passing completely through corresponding slots 94 and functions to hold the web member 134 in proper position and engagement with the side wall bracket members 140 as best illustrated in FIG. 24. As the top stop member 160 associated with web member 134 approaches the ledge portion 164, and just prior to engagement therewith, the lower stop member 160 exits slot portion 94B and enters the lower slot portion 94A thereby allowing stop member or projection 160 to at least partially return to its original non-flexed position so as to engage a corresponding lower ledge portion 166 as best illustrated in FIG. 19. As a result, the top stop member 160 engages ledge portion 164 and prevents the web member 134 from being moved further in a downward direction, and the lower stop member 160 engages ledge portion 166 and prevents the web member 134 from being moved in an upward direction.

If stop members 160 are utilized at each opposite end portion of each of the opposed web end portions 138, the web member 134 is locked into position within the respective side wall brackets 140 and cannot be removed therefrom once engaged therewith. On the other hand, if only the top stop members 160 are utilized in association with the top end portion of each respective web end portion 138, such stop members function to stop the travel of the web member 134 when positioned within the opposed slots 94 and likewise function to properly position and hold the web member in place within a particular ICF block. In this arrangement, the web member can be removed from the corresponding side wall bracket members 140 by moving the web member 134 upwardly and out of the corresponding slots 94. It is also recognized that one stop mechanism 136 can be utilized at the top portion of one of the web end portions 138 so as to stop the travel of the web member 134 when positioned within the corresponding slots 94 associated with a pair of side wall bracket members 140, and it is also recognized and anticipated that a single stop mechanism 136 can be associated with the top portion of one of the web end portions 138 and another stop mechanism 136 can be associated with the bottom portion of the other web end portion 138 so as to both stop and physically hold the web member 134 in proper position within the corresponding slots 94 associated with a pair of side wall bracket members 140 thereby likewise preventing the web member 134 from being removed from engagement with the bracket members 140. Any of these various configurations and arrangements can be utilized including a different type of lock mechanism 136 to hold and/or secure the web member 134 in proper engaged position with a pair of side wall bracket members 140.

As best illustrated in FIG. 18, the web member 134 likewise includes at least one rebar seat 54 as previously explained with respect to tie members 10 and 108, each rebar seat 54 likewise forming a substantially U-shaped well formed by a pair of adjacent fingers 58 and the inwardly spanning lateral knuckles or projections 59 as previously explained. The web member 134 likewise includes transverse bridging member 106 as previously explained.

As with side wall brackets 12, the side wall brackets 140 are likewise similarly encapsulated within a corresponding ICF panel member similar to the encapsulation and placement of the side wall brackets 12 and 110 associated with tie members 10 and 108. As such, since the web member 134 is likewise slidably engageable with a pair of side wall bracket members 140 embedded in opposed ICF panel members, the respective ICF panel members can be individually formed and shipped to a particular construction site in their unassembled state in a substantially flat form thereby again saving space for packaging, storing and shipping to a particular location. The present field assembled ICF blocks can then be easily assembled on-site by merely engaging the corresponding web members 134 with a pair of corresponding side wall brackets 140 associated with two opposed ICF panel members to complete the assembly process. Once engaged with a pair of opposed side wall bracket members 140, the field assembled web member 134 provides centralized support to the ICF block when cooperatively engaged with the corresponding side wall brackets 140.

It is also recognized and anticipated that the interlocking mechanism 120 associated with tie members 108 and 132 can take on a wide variety of different types of locking mechanisms so long as the locking mechanism is associated with both the top and bottom portions of the respective side wall bracket members. In this regard, it is also recognized that interlocking mechanism 120 can also be associated with fastening plate 18, with shut-off plates 20 and 92, or with any other side wall bracket member structure associated with the top and bottom portions of the side wall bracket members. This allows for variation in the structure of the side wall bracket members depending upon the size and shape of the particular ICF panel and/or block being used.

It is also recognized and anticipated that the present interlocking mechanism 120 can be utilized in conjunction with a wide variety of different types of panel members regardless of the interconnection means between the respective panel members. The present interlocking mechanism 120 can be utilized with panel members having interconnecting means other than a plurality of teeth and sockets for both vertically and/or horizontally joining such panel members together.

Still further, each side wall bracket member 140 may further include a reinforcing support member such as the member 168 illustrated in FIG. 18 located on one side of the shut-off plate 92 directly behind and opposite slot portion 94B to increase the tensile strength of the shut-off plate in the area where the web member 134 will be engaged. The reinforcing support member 168 may take the form of alternating or spaced ribs 170 which reduces the amount of material used as compared to a solid support member. The reinforcing member 168 also increases the tensile strength of the overall tie structure 132 when the web member 134 is engaged with the opposed side wall bracket members 140.

Like tie members 10 and 108, the modular nature of the present field assembled tie member 132 likewise promotes economy of scales with respect to manufacturing ICF blocks of different widths and different heights. As with tie members 10 and 108, the web member 134 associated with the present field assembled tie member 132 can likewise be made in different widths while utilizing the same side wall bracket members 140. Here again, this reduces tooling costs and enables a manufacturer to produce a wide variety of different web member lengths to achieve the desired the ICF block widths. In similar fashion, field assembled ICF blocks of varying heights can likewise be easily produced in heights corresponding to the multiple heights of the field assembled tie member 140 as previously explained with respect to the tie member 10, or any number of a single pre-selected block height and corresponding field assembled tie member height can be used to stack multiple blocks one on top of the other to achieve a desired height based upon multiples of the pre-selected block heights.

It should also be recognized that field assembled blocks constructed in accordance with the teachings of the present invention will stack on pre-assembled folding blocks constructed according to the teachings of the present invention such as the blocks 60 illustrated in FIGS. 4 and 9, and that the field assembled tie member 132 will likewise cooperatively engage and stack on top of folding tie members 10 and 108. This is true for several reasons. First of all, the array of alternating teeth 68 and sockets 70 formed on the opposing horizontal longitudinal edges of each of the ICF panel members such as panel members 62 illustrated in FIGS. 4-7 and 9, as well as the array of teeth 76 and sockets 78 formed on the opposing vertical ends of each panel member are substantially identical regardless of which of the present tie members are utilized to form the overall block. As a result, the individual panel members and blocks formed therefrom will cooperatively engage each other both horizontally and vertically as previously explained. Secondly, the overlapping arrangement of the fastening plate extension portions 44A and 44B and their corresponding gripping means 46 as well as the interlocking mechanism 120 associated with the side wall bracket members 12, 110 and 140 are all substantially identical and each of these mechanisms will cooperatively engage each other when one ICF block is vertically stacked on top of another ICF block constructed in accordance with the teachings of the present invention, This is also true even if the ICF blocks constructed in accordance with the teachings of the present invention are vertically stacked in an offset arrangement relative to each other since the first and second interlocking members or finger extensions 122 and 124 associated with the interlocking mechanism 122 on one ICF panel will engage or extend into a socket 70 associated with a corresponding ICF panel when the two panels are cooperatively engaged in an offset arrangement.

It is likewise recognized and anticipated that any combination of the overlapping extension members 44A and 44B, the gripping means 46, and the interlocking mechanisms 120 can be used with any of the various folding and field assembled tie members discussed above.

As a result, the various embodiments of the present tie members 10, 108 and 132 facilitate producing a wide variety of different ICF block widths and heights while saving tooling costs and manufacturing costs as previously explained.

Although ICF blocks 60, 80 and 82 represent a substantially planar ICF form construction, it is recognized and anticipated that any angularly oriented block form construction can be constructed in accordance with the teachings of the present invention wherein each opposing panel forming a particular block construction can include two substantially planar sections positioned and located at any angular orientation relative to each other depending upon the particular application. This angular orientation can vary between 0° and 90° depending upon the particular application. In addition, any plurality of the present tie members 10, 108 and 132 can be used to form any pre-selected ICF block height and width. Also, importantly, the present side wall bracket members 12, 110 and 140 with the extension portions 44A and 44B and/or interlocking mechanisms 120 can be utilized with any tie member construction including an integrally formed one-piece tie member, any type of foldable tie member, and any type of slidably engageable tie member.

Figure 29:
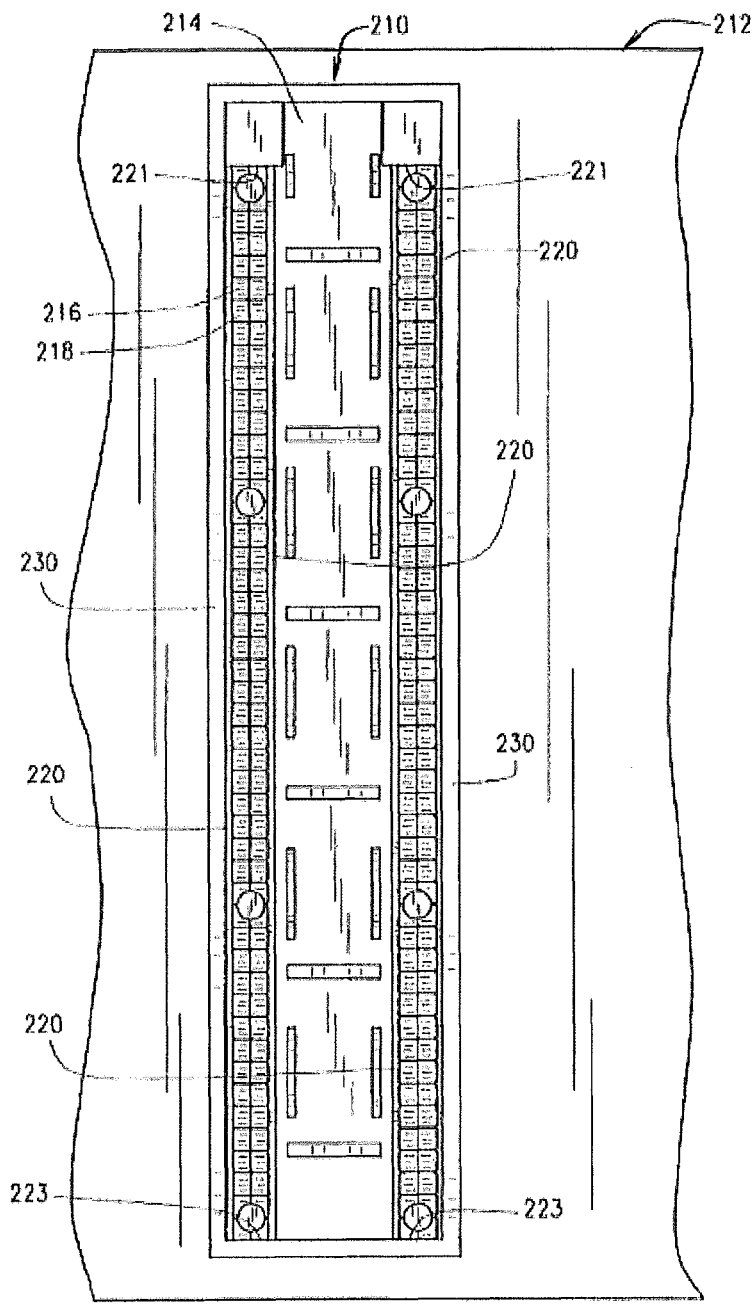
FIG. 29 is a front elevational view looking into the female tool cavity of FIG. 28 constructed according to the teachings of the present invention.
Figure 30:
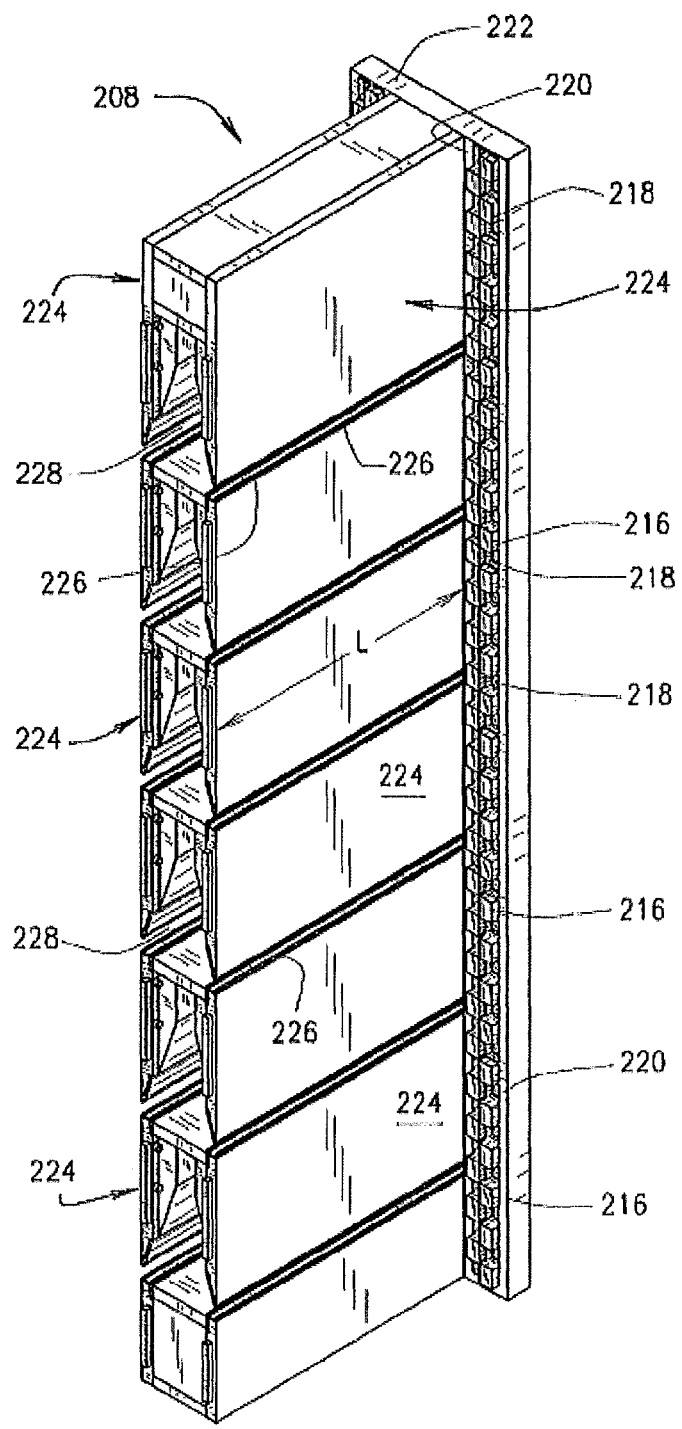
FIG. 30 is a perspective view of the male tool of FIG. 28 constructed according to the teachings of the present invention.

In another aspect of the present invention, FIGS. 28-43 illustrate several embodiments of an ICF tool 206 for making an ICF block such as ICF blocks 60, 80 and 82 discussed above, the ICF tool 206 including any plurality of male tools 208 and any plurality of female tools 210 as well as a single male tool and a female tool. Although FIG. 26 illustrates just a single male tool 208 and a single female tool 210, it is recognized that tool device 212 may include any number of female tool cavities 210 positioned in side-by-side adjacent relationship and that a similar tool device may include a corresponding number of male tools 208, a male tool 208 being insertably received within a corresponding female tool cavity 210. In one embodiment, the inside of the female tool 210 is configured as illustrated in FIG. 29 and the male tool 208 is configured as illustrated in FIG. 30. Referring to FIG. 29, the back portion 214 of the female tool 210 includes an array of alternating teeth 216 and sockets 218 formed on each opposed side of the female tool back wall 214. The array of alternating teeth 216 and sockets 218 are positioned and arranged so as to yield the array of alternating teeth 68 and sockets 70 formed in the opposing horizontal longitudinal edges of an ICF panel member such as the panel members 62 illustrated in FIG. 4. In this regard, as previously discussed, any array of alternating teeth and sockets can be associated with any particular ICF block including at least one row of teeth 68 and sockets 70. The array of alternating teeth and sockets illustrated in FIG. 29 correspond to the double median row of alternating teeth 68 and sockets 70 discussed above and illustrated in FIGS. 4, 6-9 and 11B. During the molding process, each female cavity tooth 216 will produce a corresponding socket 70 and each female socket 218 will produce a corresponding tooth 68 when the ICF block is formed.

In similar fashion, the substantially flat co-planar edge surface 72 located on each opposite side of the array of teeth and sockets 68 and 70 associated with a finished ICF block such as ICF block 60 illustrated in FIG. 4 is produced via the surfaces 220 associated with the female cavity 210 positioned on each opposite side of the corresponding array of alternating teeth 216 and sockets 218. When an ICF block is molded, the array of alternating teeth and sockets illustrated in FIG. 29 associated with the back wall 214 of each separate female cavity 210 produces the array of alternating teeth and sockets associated with one of the opposed horizontal longitudinal edges of the respective ICF panel members when the ICF block is formed.

In similar fashion, each male tool 208 includes a back wall portion 222 which likewise includes a corresponding array of alternating teeth 216 and sockets 218 located adjacent the opposed side portions of the back wall 222 for producing the array of alternating teeth 68 and sockets 70 associated with the other of the opposed horizontal longitudinal edges of the ICF panel members associated with a formed ICF block such as the panel member 62 illustrated in FIGS. 4 and 5. Here again, any array of teeth and sockets can be associated with any particular ICF block including at least one row of teeth 68 and sockets 70, the array of teeth and sockets associated with the male tool generally conforming to the array of teeth and sockets associated with the female tool. When the male tool 208 is inserted within the corresponding female cavity 210 as will be hereinafter further explained, and the foam material is injected into the tool 206, the opposed ICF panel members such as the panel members 62 illustrated in FIG. 4 are formed with the array of alternating teeth and sockets formed on the opposed horizontal longitudinal edges of the respective panel members as previously explained and discussed above. In this regard, the array of alternating teeth 216 and sockets 218 associated with the male tool 208 and the female cavity 210 are positioned and arranged such that when the panel members 62 are formed, the teeth 68 associated with one of the opposed horizontal longitudinal edges of the panels 62 are vertically aligned with the sockets 70 associated with the other of the opposed horizontal longitudinal edges of the panels 62, and the sockets 70 associated with one of the opposed horizontal longitudinal edges of the panels 62 are vertically aligned with the teeth 68 associated with the other of the opposed horizontal longitudinal edges of the panels 62. Also, as previously explained and as best seen in FIG. 4, the pair of panels 62 are positioned relative to each other such that the teeth 68 associated with the row of alternating teeth 68 and sockets 70 located closest to the outer surface 66 of one of the pair of panels 62 forming the block 60 are horizontally aligned with the sockets 70 associated with the row of alternating teeth and sockets located closest to the outer surface 66 of the other of the pair of panels 62 forming the block 60, and the teeth 68 associated with the row of alternating teeth 68 and sockets 40 located closest to the inner surface 64 of one of the pair of panels 62 forming a block 60 are horizontally aligned with the sockets 70 associated with the row of alternating teeth and sockets located adjacent the inner surface 64 of the other of the pair of panels 62 forming the block 60.

Figure 44:
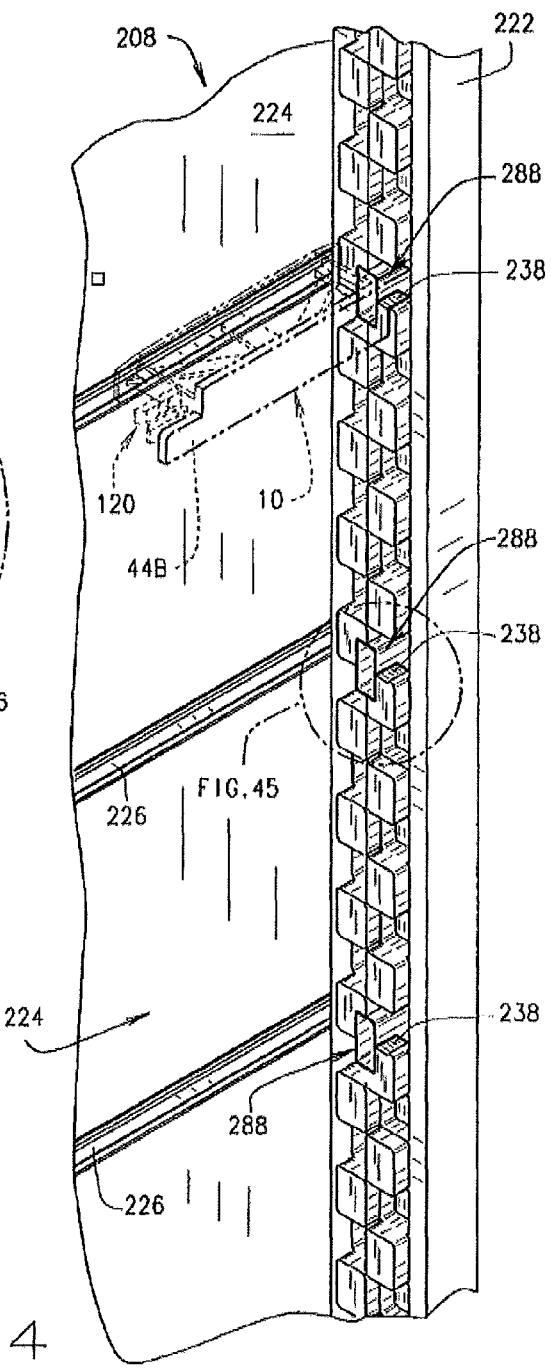
FIG. 44 is a partially enlarged perspective view of FIG. 34 showing the engagement of one of the present stackable/foldable tie members illustrated in FIGS. 12-16 and its additional attachment mechanism associated with the top and bottom portions of each respective side wall bracket member with the array of teeth and sockets associated with one side of the male tool.

Referring again to FIG. 29, it is also recognized that the female cavity 210 may likewise include spaced apart opposed top and bottom wall portions 221 and 223 which can be formed and shaped to yield the array of spaced apart projections 76 associated with the opposing vertical end portions 74 of each panel member 62 as best illustrated in FIG. 6. As with the array of alternating teeth and sockets associated with the female cavity 210, the female cavity wall portions 221 and 223 can likewise be designed and configured to yield the projection pattern 76 and 78 associated with each opposed vertical end of a molded panel member once the molding process has been completed. In similar fashion, the female cavity portions 221 and 223 can likewise be designed and configured to yield the alternating teeth 76A and sockets 77 associated with each opposed vertical end of the molded panel member embodiment illustrated in FIG. 44. These patterns are formed or molded directly into the female wall portions 221 and 223 as no corresponding male tool portion is required to form the array of spaced apart projections 76 and spaces 78, or the array of alternating teeth 76A and sockets 77, associated with each opposite vertical end portion of each panel member as illustrated in FIGS. 6 and 44.

Male tool 208 likewise includes a plurality of spaced apart pairs of plate members 224 positioned substantially along the entire length of the back wall 222 as best illustrated in FIG. 30, each respective pair of plate members 224 being separated by a slot, space or opening 226. The plate members 224 are formed with or fixedly attached to the back wall 222 and each respective pair of plate members 224 forms an open internal aperture or opening 228 as best illustrated in FIG. 31. The spaces or openings 226 are positioned and located along the length of the back plate 222 at each location where a tie member such as tie member 10 will be located in the formed ICF block. As a result, the length of the back plate 222 associated with male tool 208 as well as the corresponding length of the female cavity 210 will determine the overall length of each respective ICF block formed. In similar fashion, the overall length of each respective pair of plate members 224 in conjunction with the thickness of the respective back plates 222 (male tool) and 214 (female cavity) will determine the overall height of each respective ICF block formed. Also, the back plate 222 likewise includes a substantially flat planar surface 220 positioned on each opposite side of the array of alternating teeth 216 and sockets 218 so as to form the substantially flat surfaces 72 associated with each ICF block formed as previously explained with respect to the female cavity 210. The pairs of opposed plate members 224 are positioned and located such that when the male tool 208 is inserted within the female cavity 210, the pair of opposed panel members forming a particular ICF block such as the panel members 62 illustrated in FIG. 4 are formed between one surface of the respective plate members 224 and the corresponding outer walls 230 of the female cavity 210. The space formed between the respective pairs of plate members 224 associated with the male tool 208 including the respective internal openings 228 remain open and no injection molding material forming the ICF block enters such space.

As best illustrated in FIG. 31, each opened internal aperture or opening 228 associated with the male tool 208 is designed and configured to receive a stackable/foldable tie member such as the tie member 10 illustrated in FIGS. 1-3 regardless of the length of each pair of corresponding connection link members 16 as best illustrated in FIG. 32. The respective slots or openings 226 are located at the base of each respective aperture 228, each opening 226 being formed by spaced apart wall portions 232 and 234 associated with the plate members 224. Each wall portion 232 and 234 includes a tie engaging securing edge portion 236 as best illustrated in FIG. 31. The securing edge portions 236 can take on a wide variety of different shapes but must be configured so as to be insertably receivable within the slots 52 associated with each shut-off plate 20 associated with the foldable tie members 10 as will be hereinafter further explained. The corresponding slots 52 (FIG. 3) are formed between the shut-off plate 20 and the respective projections 50 associated with each side wall bracket 12. This engagement is best illustrated in FIG. 20 as will be likewise hereinafter further explained.

Figure 33:
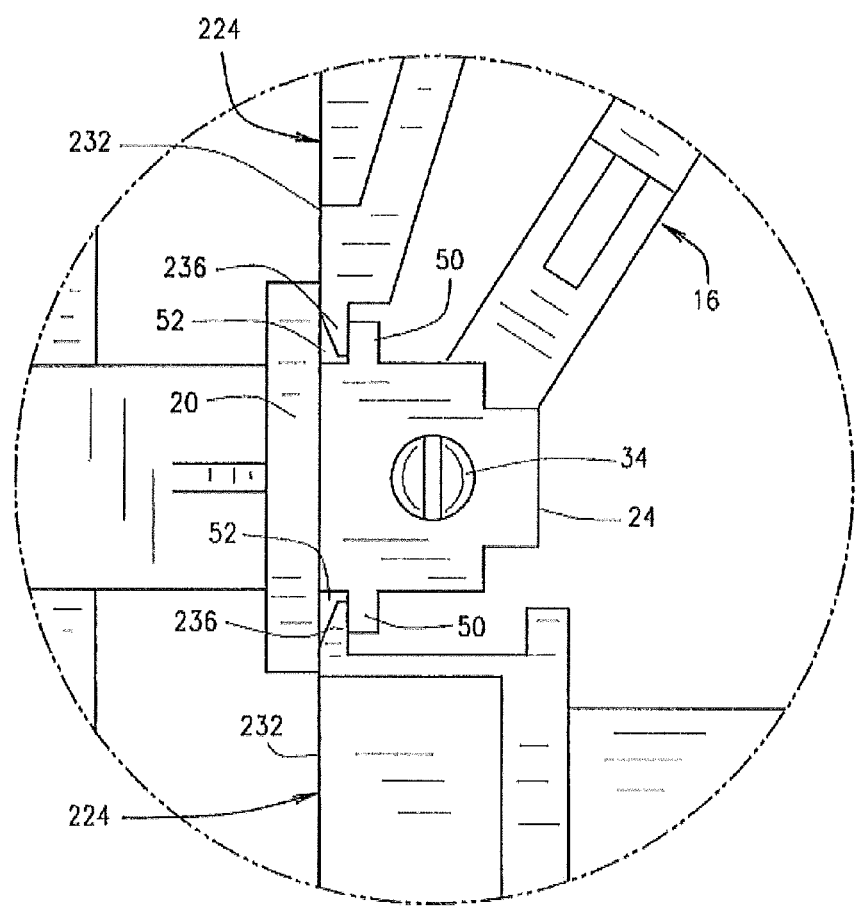
FIG. 33 is a partially enlarged view of a portion of FIG. 32 showing the tie engaging edge members of the male tool engaging the corresponding slots associated with the present stackable/foldable tie members.

As best illustrated in FIG. 32, the stackable/foldable tie members 10 are designed to be slidably insertable within the male tool spaces 226 such that the foldable connection link members 16 are positioned within the internal opening 228 and the opposed side wall brackets 12 are positioned such that the spaced projections 24 associated with each respective shut-off plate 20 extends within the internal opening 228 and the remaining portion of the side wall bracket members 12 overlay the array of alternating teeth and sockets 216 and 218 respectively so as to be encapsulated within the corresponding panel members forming the ICF block. In this regard, when the tie engaging securing edge members 236 are positioned within the corresponding slots 52 associated with each opposite side of the side wall bracket hinge members 24 as best illustrated in FIGS. 32 and 33, the shut-off plate 20 closes the space or opening 226 on the panel forming side thereby preventing any of the injection molding material from entering the aperture 228. This is true for each space 226 located on each opposite side of each respective opening or aperture 228 where the respective tie members 10 are positioned for forming with the respective ICF panel members. As best illustrated in FIG. 32, that portion of each respective side wall bracket member 12 from the shut-off plate 20 to the fastening plate 18 extend over the array of alternating teeth and sockets and are encapsulated within each respective panel member when the ICF block is formed.

Since each respective internal opening or aperture 228 is shaped as illustrated in FIGS. 31 and 19, any width of tie member 10 can be positioned within the opening 228 and within the same male tool 208 since the size and shape of each respective side wall bracket member 12 remains the same. In other words, as previously explained, since the same side wall bracket member 12 is used to form tie members of different widths, and since only the length of the connection link members 16 change to form tie members of different widths, the same ICF forming tool 206 including male tool 208 and female cavity 210 can be used to produce ICF blocks having one height and any plurality of different widths based upon the length of the respective connection link members 16 associated therewith. Because each respective tie member 10 is foldable as previously explained, the folding of the connection link members 16 as best illustrated in FIG. 32 within each respective internal opening 228 accommodates tie members 10 having different widths. It is the ability of the tie member 10 to fold in three places, namely, in the middle as well as adjacent each respective shut-off plate 20 which enables the present ICF tool design to produce ICF blocks having variable widths. The foldability of the tie member 10 as previously explained serves as a prerequisite to achieving this modular capability. The tie engaging securing edge portions 236 are designed to hold the respective tie members 10 in their folded position as illustrated in FIG. 32 during the molding process. Once the ICF blocks are formed and removed from the present tooling, the tie members 10 can be fully extended to achieve the full width of the respective tie members 10.

Figure 34:
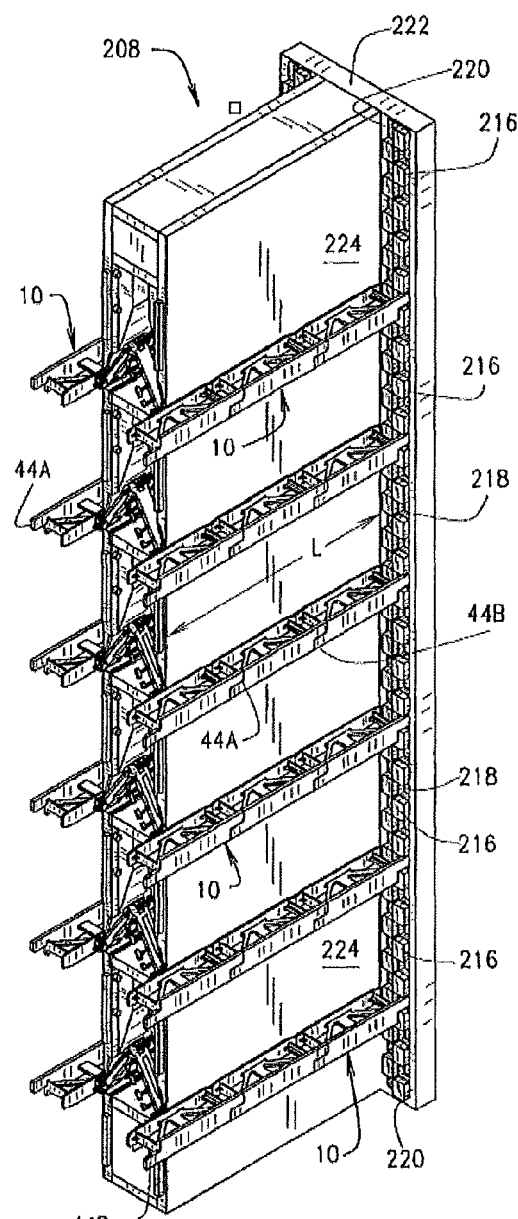
FIG. 34 is a perspective view of the male tool of FIGS. 28 and 30 showing a plurality of the present stackable/foldable tie members positioned therewithin.
Figures 35, 36:
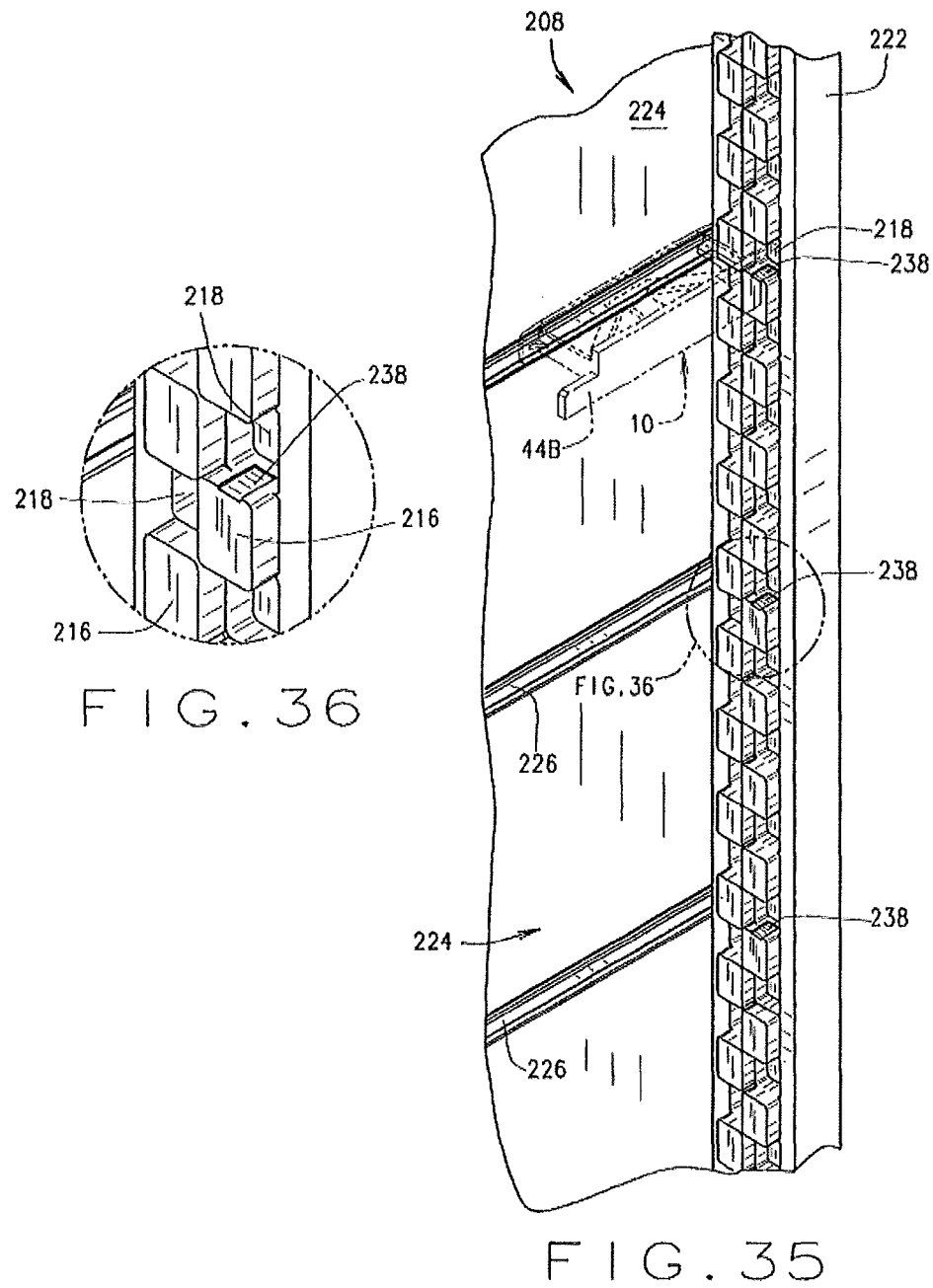
FIG. 35 is a partially enlarged perspective view of FIG. 34 showing the engagement of one of the present stackable/foldable tie members with the array of teeth and sockets associated with one side of the male tool.
FIG. 36 is a partially enlarged view of a portion of FIG. 35 showing the indentation associated with certain teeth of the male tool.

FIG. 34 illustrates the present male tool 208 fully loaded with a plurality of individual tie members 10 at each tie location along the length of back plate 222, the tie locations being determined by the position and location of each of the respective tool openings 226. In the embodiment illustrated in FIG. 34, the male tool 208 is designed to receive and accept three stacked tie members 10 as illustrated, the stacking of the tie members 10 determining the overall height of the ICF block to be formed by this particular male tool 208. As previously explained with respect to FIGS. 11A and 11B, three tie members 10 are slideably engaged with each pair of opposed tool openings 226 in a stacked arrangement such that the opposed fastening plate extension portions 44A and 44B associated with the middle or intermediate tie member 10 in each tool space 226 is positioned in overlapping relationship with the fastening plate extension portion associated with an adjacent tie member as illustrated, including overlapping the plurality of teeth or gripper members 46 associated with each overlapping extension portions 44A and 44B as previously explained. The tie member 10 positioned adjacent the array of alternating teeth and sockets 216 and 218 has its fastening plate extension portion 44A extending into a corresponding socket 218 associated with the male tool 208 such that the extension member 44A can extend into and at least be partially encapsulated by a corresponding tooth when the ICF block is formed. This engagement is best illustrated in FIG. 35 and was previously discussed with respect to FIG. 7. The fastening plate extension member 44A will mate with and reside within a corresponding tool socket 218 and the side surface 47 of extension member 44A as best illustrated in FIG. 7 lies adjacent to the corresponding side surface of the adjacent tool tooth 216.

In order to expose the teeth or gripping means 46 associated with the side surface 47 of the fastening plate extension member 44A when the ICF block is formed, if the gripping means 46 is utilized, a detent or indentation 238 can be formed in the adjacent tool tooth 216. Indentation 238 can be formed at each tool tooth location 216 where a tie fastening plate extension member 44A or 44B will engage the socket area 218 of the male tool 208 as best illustrated in FIG. 35. A close-up view of indentation 238 associated with a particular tool tooth 216 is illustrated in FIG. 36. In similar fashion, the array of alternating teeth and sockets 216 and 218 associated with the female cavity 210 will likewise include indentation means 238 associated with the fastening plate extension members 44A or 44B positioned adjacent the opposite end portion of the male tool 208 when the male tool 208 is inserted within the female cavity 210. The indentation means 238 allows the gripping means 46 associated with the respective extension members 44A and 44B to be exposed to the adjacent socket 70 formed within the finished ICF panel members 62 as best illustrated in FIG. 7.

Figure 45:
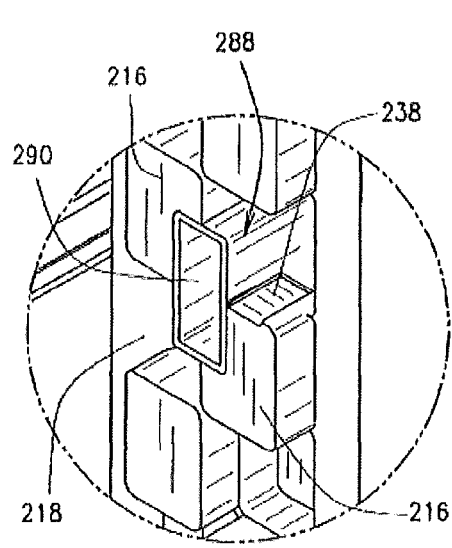
FIG. 45 is a partially enlarged view of a portion of FIG. 44 showing the pocket associated with certain teeth and sockets of the male tool for receiving the additional attachment mechanism associated with the tie members illustrated in FIG. 44.

Since the attachment mechanism 120 extends into the corresponding teeth area associated with the opposed horizontal longitudinal edges of each respective ICF panel, the male and female tools such as male tool 208 and female tool 210 needs to be configured so as to accept the attachment mechanism 120 associated with each opposite end portion of each respective side wall bracket member 110 when the side wall bracket members 110 are positioned within the male tool and subsequently positioned within the female cavity. To accommodate the offset attachment members 122 and 124 associated with attachment mechanism 120, the male tool will include a pocket 288 formed in the tooth area of the male tool 208 at each location where the attachment mechanism 120 will engage the tooth area of the male tool 208 as best illustrated in FIG. 44. The pocket 288 overlaps a portion of two adjacent teeth 216 and two adjacent sockets 218 associated with the male tool 208 as best illustrated in the close-up view of pocket 288 illustrated in FIG. 45. Pocket 288 is essentially a four sided metal structure having a floor and an open top portion 290 for receiving the first and second attachment members 122 and 124 associated with attachment mechanism 120. When attachment members 122 and 124 are positioned within the pocket 288, the platform member 118 associated with the top or bottom bridging members 114 and 116 will close off the open top portion 290 of pocket 288 thereby preventing any of the injection molding material from entering the pocket 288. This is true for each pocket 288 located on each opposite side of each respective aperture 228 where the attachment mechanisms 120 are positioned within a corresponding pocket 288 for forming with the respective ICF panel members. The pocket 288 allows the respective first and second attachment members 122 and 124 to be exposed in the teeth area of the respective ICF panel members. As best illustrated in FIG. 45, the pocket 288 is located in the vicinity of the detent or indentation 238 formed in the adjacent tooth 216 if the gripping means 46 is to be utilized in association with the fastening plate extension members 44A or 44B. In similar fashion, the array of alternating teeth and sockets 216 and 218 associated with the female cavity such as female cavity 210 will likewise include pocket means 288 for receiving the attachment mechanism 120 positioned adjacent the opposite end portion of the male tool and located on the opposite end portion of each respective side wall bracket member 110 when the male tool is inserted within the female cavity. Again, the pocket 288 allows the attachment mechanism 120 associated with the respective side wall bracket members 110 to be exposed in the teeth and socket area formed within the finished ICF panel member as best illustrated in FIG. 15.

Figure 37:
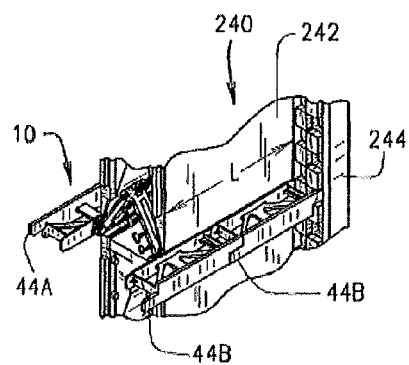
FIG. 37 is a partial perspective view of another embodiment of the male tool constructed according to the teachings of the present invention to hold a pair of the present stackable/foldable tie members within each tool slot.

The male tool 208 illustrated in FIGS. 30 and 34 is adapted to produce a single height ICF block wherein the height of the block is a multiple of three tie members 10 positioned in vertically stacked arrangement as previously described. Similarly, female cavity 210 is similarly sized so as to receive male tool 208 therewithin to produce a formed ICF block having a height based upon three tie members 10 vertically stacked at each tie location along the length of the formed block. Since a plurality of ICF blocks having different block heights can be fabricated using the same tie member 10 in a stacked arrangement as previously explained with respect to FIGS. 5, 10, 11A and 11B, FIG. 37 is a partial view of a male tool 240 which is constructed substantially identically to male tool 208 except that the overall length L of the respective pairs of plate members 242 are shorter as compared to plate members 224 and the corresponding tool openings 226 (not shown) are configured to receive and hold a pair of tie members 10 as illustrated in FIG. 37. In all other respects, the design and configuration of male tool 240 is substantially identical to the design and configuration of male tool 208 including the size and shape of the internal openings 228 and the tie engaging edge portions 236. Likewise, male tool 240 is adapted to be insertably received within the same female cavity 210, the only difference being that the male tool back plate 244 will be located further inside the female cavity 210 as compared to the back plate 222 associated with male tool 208. When male tool 240 is inserted within female cavity 210, a finished ICF block having a height corresponding to two tie members 10 stackably arranged as previously explained with respect to FIG. 34 will be produced. This finished ICF block will be similar to the block 80 illustrated in FIG. 10.

Figure 38:
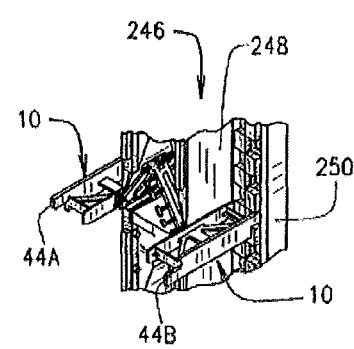
FIG. 38 is a partial perspective view of still another embodiment of the male tool constructed according to the teachings of the present invention to hold a single stackable/foldable tie member within each tool slot.

In similar fashion, FIG. 38 illustrates another embodiment 246 of a male tool constructed according to the teachings of the present invention to produce an ICF block height equal to the height of one tie member 10 as illustrated in FIG. 5. Here again, each pair of plate members 248 associated with male tool 246 and the corresponding openings or spaces 226 are sized and shaped to receive just a single tie member 10 within each pair of spaced openings 226. Again, male tool 246 is sized and shaped to be received within the same female cavity 210, the only difference being that the back plate 250 will be located at a different position within the female cavity 210 as compared to the back plate 244 associated with male tool 240 and the back plate 222 associated with male tool 208. In all other respects, male tool 246 is substantially identical to male tools 208 and 240 including the size and shape of the internal openings 228 and the size, shape, position and location of the tie engaging edge portions 236.

As a result, each of the male tools 208, 240 and 246 can be utilized with the same female cavity 210, and each male tool can produce an ICF block having a plurality of different widths. In similar fashion, ICF blocks of different heights can be easily produced by merely changing the height of the male tool. In this regard, the same female cavity is used and any plurality of half tools or male tools can be produced to accommodate the plurality of different block heights to be produced. FIGS. 34, 37 and 38 illustrate three half tools or three male tools having substantially the same design and configuration for producing three different ICF block heights and any plurality of different block widths, all using the same tie member 10 and different connecting link members 16 to establish the different tie widths. The triple hinge folding feature of the present tie members 10 allows for the efficiency and economy in producing ICF blocks of varying heights and varying widths. In addition, the size of the internal openings 228 associated with each respective tool member will determine how many different block widths can be made from the same tool.

Since the field assembled tie member 132 illustrated in FIGS. 18-20 uses a side wall bracket member 140 which is substantially similar to the side wall bracket member 12 in that they include the same fastening plate 18, substantially the same trust structure 112 formed between the fastening plate 18 and the shut-off plate 92, and a substantially similarly shut-off plate 92 which likewise includes projections or fingers 98 forming a corresponding slot 100 similar to slot 52 for receiving the tie engaging edge portions 236 of all of the respective male tools. The side wall bracket members 140 associated with the field assembled tie member 132 can likewise be inserted within the respective male tool openings 226 to form any plurality of ICF field assembled blocks of different heights. As previously explained, since the side wall bracket members 88 can likewise be vertically stackably arranged one on top of the other to produce different block heights, the same set of ICF tools 208, 210, 240 and 246 can be utilized to make ICF field assembled blocks of varying heights. Since the web member 90 associated with the field assembled tie member 86 can be separately fabricated in any plurality of widths, the same ICF forms used to produce the different ICF block heights will yield any field assembled ICF block width based upon the width of the web member 90. The slots 100 associated with each side wall bracket member 88 will be secured in any one of the male tools 208, 240 and 246 via engagement with the tool engaging edge portions 236 as previously explained with respect to FIGS. 31-33. As a result, the present ICF tool construction as explained above can be used to produce both field assembled panels using the present field assembled tie member construction 86 and fully assembled folding ICF blocks using the present stackable/foldable tie member construction 10 in each individual separate cavity of the present ICF tools.

It is also recognized that a single male tool and a single female tool such as male tool 208 and female tool 210 can be utilized to produce an ICF block having one height and a plurality of different widths and that blocks of different heights can be formed by merely stacking multiple blocks one on top of the other to achieve a particular desired height based upon multiples of the pre-selected block height associated with a single male tool 208 and a single female tool 210. For example, if a single male and female tool constructed in accordance with the teachings of the present invention produced an ICF block having a block height of six inches, ICF blocks having a height equal to any multiple of six inches can be easily formed by merely stacking multiples of the six inch ICF block one on top of the other to achieve a block height of twelve inches, eighteen inches, twenty-four inches and so forth. These multiple ICF block heights can be achieved without changing the tooling requirements and without making, using and storing half tools or male tools corresponding to these different block heights. This saves time and money since the same basic single male and female tools can be used to achieve the desired block height based upon the pre-selected height of the single male and female tool. If additional non-multiple ICF block heights are needed, different half tools or male tools can be produced to accommodate the plurality of different non-multiple block heights as previously explained with respect to male tools 208, 240 and 246 illustrated in FIGS. 34, 37 and 38. The same is likewise true with respect to ICF blocks utilizing the field assembled tie member 132 as illustrated in FIGS. 18-20. Any and all of the present male and female tools can be utilized with both the present folding tie member 10 as well as the present field assembled tie member 132 as previously explained.

Figure 39:
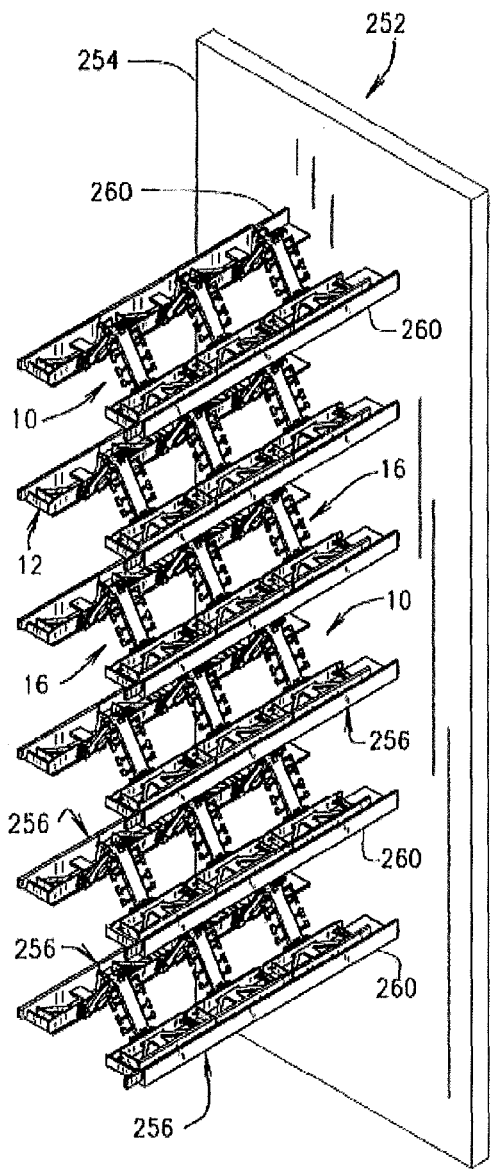
FIG. 39 is a perspective view of a loading platform which can be utilized in conjunction with the present male tools for loading the same.
Figure 43:
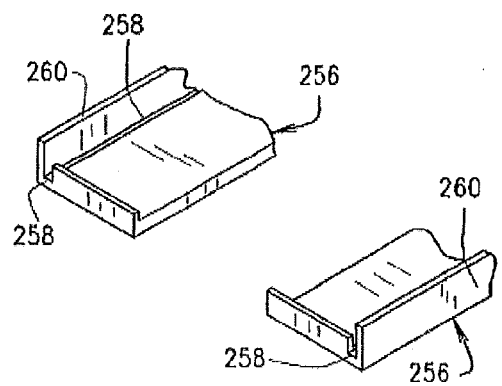
FIG. 43 is a partial perspective view of a pair of arm members associated with the loading platform of FIGS. 39-42 showing the slot associated with each arm member.

FIG. 39 illustrates another aspect of the present invention wherein a loading platform 252 can be utilized in conjunction with all of the present male tools such as male tools 208, 240 and 246 for loading the respective stackable/foldable tie members 10, or the side wall bracket members 140 associated with the field assembled tie member 132, within each respective male tool. Although the loading platform 252 will be described with respect to loading the present foldable tie members 10, the side wall bracket members 140 of the present field assembled tie members 132 are likewise easily loadable unto the platform 252 as will be hereinafter explained. The loading platform 252 includes a vertical plate member 254 and a plurality of pairs of arm members 256 which are positioned and located on the plate member 254 so as to register with the plurality of spaced tool channels or openings 226 associated with the corresponding male tool when the loading platform is positioned adjacent thereto. Each pair of arm members 256 is configured to hold a plurality of the present stackable/foldable tie members 10 in their folded position as illustrated in FIG. 39, or a plurality of the present side wall bracket members 140 (not shown). In this regard, each arm member 256 is sized and shaped so as to slidably receive one of the side wall bracket members 12 associated with the present tie member 10. The side wall bracket members 12 lie flat or flush with each respective arm member 256 and the corresponding foldable connection link members 16 extend in a foldable position thereabove for insertion into the respective internal opening 228 associated with the male tool. Each arm member 256 includes a slot 258 as best illustrated in FIG. 43 positioned and located so as to receive the fastening plate 18 associated with each respective side wall bracket member 12 when the bracket members 12 are positioned on the respective arm members 256 as illustrated in FIG. 39. The slots 258 function to hold the respective side wall bracket members 12 in a fixed stable position so that the folded connection link members 16 of tie member 10 can likewise remain in a fixed elevated position as illustrated in FIG. 39. The outer side wall 260 of each arm member 256 may likewise be raised as illustrated in FIG. 39 to provide further support and holding means for the respective tie members 10 when positioned within a respective pair of arm members 256.

Figure 40:
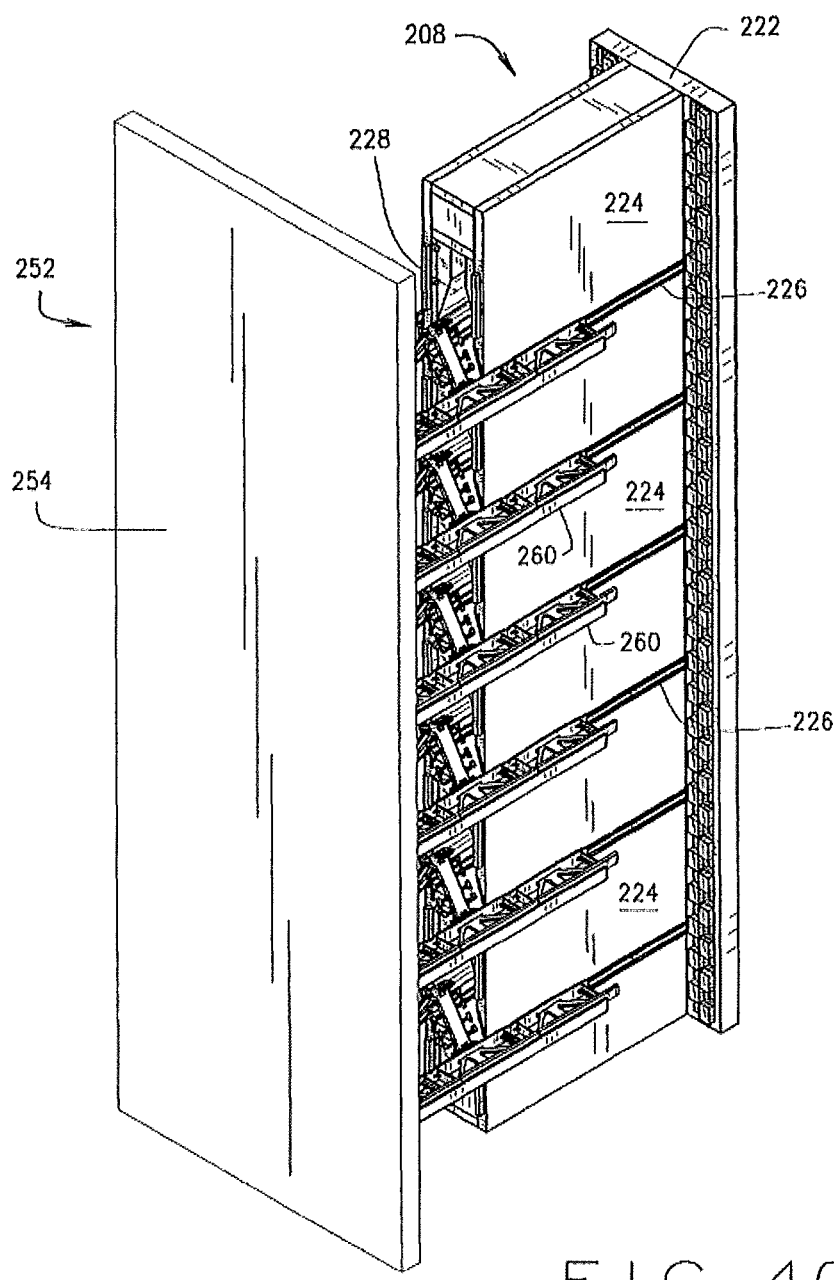
FIG. 40 is a perspective view showing the loading platform of FIG. 39 in partial engagement with the male tool of FIGS. 28 and 30 for loading the male tool with the present stackable/foldable tie members.

The loading platform 252 may be associated with a track system or any other system for insertably moving the respective pairs of arm members 256 into and out of the male tool as best illustrated in FIG. 40. The loading platform is designed for at least reciprocal movement into and out of the male tool and is positioned and aligned in the moveable system such that the pairs of arm members can be manually or automatically loaded such as through an automated system to achieve the configuration illustrated in FIG. 39. After loading, the loading platform 252 can then be moved into the male tool such as male tool 208 illustrated in FIG. 40. In this regard, the respective pairs of arm members 256 are positioned and located on the plate member 254 such that the respective foldable tie members 10 will be positioned within each internal opening 28 as illustrated in FIGS. 32 and 33. To this end, the shut-off plate 20 associated with each respective side wall bracket member 12 overhangs the inside edge portion of each respective arm member 256 such that the shut-off plate 20 and its associated tool engaging slot 52 is free for entry into the internal opening 228 and the slots 52 will engage the tie engaging edge portions 236 as previously explained. The same is likewise true of the shut-off plate 92 associated with side wall bracket member 88.

As the respective tie members 10 are inserted within each respective internal opening 228 associated with a particular male tool as the loading platform is being inserted therewithin, the tie engaging edge portions 236 associated with the male tool will be positioned within the corresponding tool engaging slots 52 as best illustrated in FIG. 33. Once the loading platform 52 is completely inserted into the particular male tool, the respective pairs of arm members 256 are withdrawn from the male tool leaving the stacked/foldable tie members 10 in their proper position within the respective male tool as illustrated in FIG. 34 and as previously explained with respect to FIGS. 31-34. Once the loading platform 252 is removed from a particular male tool, it can be reloaded for the next tool cycle.

Figure 41:
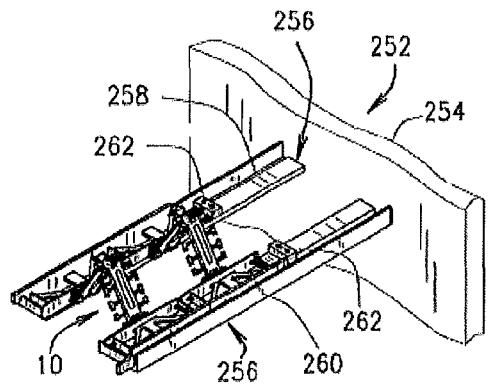
FIG. 41 is a partial perspective view of the loading platform of FIG. 39 loaded with only a pair of the present stackable/foldable tie members for loading the male tool of FIG. 37.

The embodiment of the loading platform 252 illustrated in FIG. 39 is designed for holding up to three vertically stacked tie members 10 within each pair of respective arm members 256 as illustrated. The same loading platform 252 can be utilized to load male tool 240 (FIG. 37) wherein only two stackable/foldable tie members are positioned within each respective pair of arm members 256 as illustrated in FIG. 41. To hold each respective pair of tie members 10 in proper loading position on the loading platform 252, each arm member 256 may include a moveable stop member such as a stop member 262 for holding the tie members 10 in proper loading position. Stop member 262 can be slideably moveable along each respective arm member 256 so as to be placed in abutment with an adjacent tie member 10.

Figure 42:
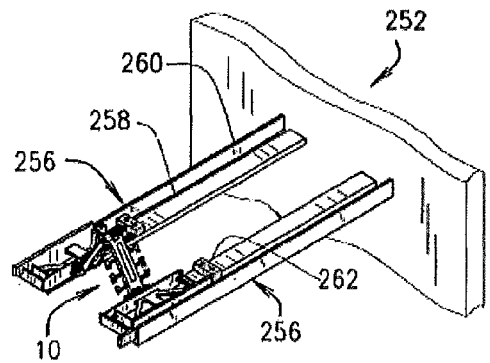
FIG. 42 is a partial perspective view of the loading platform of FIG. 39 loaded with a single stackable/foldable tie member for loading the male tool of FIG. 38.

FIG. 42 illustrates use of the present loading platform 252 for inserting a single tie member 10 associated with each respective pair of arm members 256 into the male tool 246 illustrated in FIG. 38. Again, the optional moveable stop member 262 can be utilized to properly hold the single tie member 10 in its proper loading position for insertion into the male tool 246.

Although loading platform 252 is illustrated in FIG. 39 as holding a maximum of three vertically stacked foldable tie members 10, it is recognized and anticipated that the overall length of each respective pair of arm members 256 can be varied to accommodate the maximum height associated with any series of ICF blocks. In other words, the respective pairs of arm members 256 can be configured to hold a maximum of four tie members 10, a maximum of five tie members 10, or any other plurality of tie members 10. Also, the loading platform 252 illustrated in FIGS. 39-43 is for use in conjunction with a single male tool. It is recognized and anticipated that if the tool 206 illustrated in FIG. 28 includes a plurality of male tools 208 for insertion within a plurality of corresponding female cavities 210, the present loading platform 252 can be fabricated to include a plurality of horizontally spaced sets of pairs of arm members 256, each set of pairs of arm members 256 being engageable with a corresponding male tool. In other words, the plate member 254 can be extended horizontally to include any set or grouping of vertically spaced pairs of arm members 256 such that each separate male tool associated with a single tool 106 can be loaded at the same time. Other embodiments of a loading platform are likewise anticipated and envisioned.

Because of the construction of the side wall bracket members 140 associated with the present field assembled tie member 132, the side wall bracket members 140 are likewise insertably receivable within the respective arm members 256 of the present loading platform 252 and the field assembled side wall bracket members 140 can likewise be loaded into each respective male tool in the same fashion as explained above with respect to FIG. 39. Obviously, since the web member 134 associated with the field assembled tie member 132 is inserted only after the individual panel members of the field assembled ICF block are molded, the web members 134 are not involved in the loading operation.

It is also recognized and anticipated that the ICF tool 206 will include a plurality of male tools 208 and female cavities 210 in a single ICF molding tool. In this regard, it is anticipated that a single tool 206 will include three, four or more male tools and female cavities. As a result, many more ICF blocks can be made in a single tool cycle which likewise improves efficiency and reduces cost. Still further, because of the interchangeability of the stackable/foldable tie member 10 with different widths within the same male tool, a manufacturer will be able to produce any width of ICF blocks in the same tool with no tool changes. For example, if a manufacturer wants to make an ICF block having one width for a certain period of time, it can load the appropriate foldable tie members 10 with the correct length of connection link members 16 yielding the desired tie width into any one or more of the male tools associated with a particular tool 206 to produce any number of ICF blocks with that one width.

On the other hand, if a manufacturer wants to make any other width of ICF block, it will be able to do so without switching out any particular male tool or without changing anything else on the overall tool 206. The manufacturer will simply load the proper width tie member 10 into the same male tool or tools associated with the overall tool 206 and will then be able to produce ICF blocks of a different width using the same tools. Also, importantly, a manufacturer will be able to make one width of ICF blocks in one of the male tools and corresponding female cavity associated with the overall tool 206 and will likewise be able to make a different width of ICF block in another male tool and corresponding female cavity associated with the same tool 206. This is because one male tool can be loaded with the present tie members 10 of one particular width and another male tool associated with the same tool 206 can be loaded with the present tie members 10 of a different width. If the present tool 206 includes four male tools and four female cavities, each male tool and female cavity can make an ICF block having a different width, or the four male tools and corresponding female cavities can make any combination of ICF blocks having different widths within a single tool cycle. Being able to make any width of ICF block in any female cavity associated with the overall tool 206 likewise improves manufacturing efficiency and reduces cost. As a result, each female cavity associated with the overall tool 206 will be able to make a different width of an ICF block at the same time in a single tool cycle if the manufacturer so desires.

On the other hand, if a different ICF block height is desired, only the male tool needs to be removed and a new male tool rehung on the overall tool 206 if a non-multiple block height is desired as previously explained. If, for example, the overall tool 206 includes four male tools and four corresponding female cavities, and each of the male tools are male tools 208 configured to produce an ICF block height having three stackable/foldable tie members 10 positioned at each tie location along the length of the ICF block, any one or more of the male tools 208 can be removed and replaced with male tool 240 and/or male tool 246 to produce an ICF block with that particular male tool having a height equal to one or two stackable/foldable tie members 10 as previously explained. Here again, if a single male tool 246 and a corresponding single female tool were used to produce a block height equal to one stackable/foldable tie member 10, ICF block heights equal to any multiple of the one foldable tie member 10 can be achieved by merely stacking any number of such blocks one on top of the other after molding. Also, the same overall tool 206 can produce a different ICF block height in each of its four female cavities, or any combination thereof. This likewise greatly improves the efficiency of the manufacturing process and greatly reduces cost in that the female cavities 210 associated with the tool 206 remain the same and do not need to be changed and only half tools, namely, the male tools, need to be removed and rehung to produce the desired ICF block height of a non-multiple height. The same is likewise true in producing different field assembled ICF block heights.

Still further, as previously explained, different ICF block heights can likewise be achieved by simply stacking ICF blocks having a pre-selected block height. For example, as best illustrated in FIG. 5, if the present tie member 10 illustrated therein represents a 6-inch height, a block 60 incorporating a 6-inch high plurality of tie members 10 will yield a 6-inch tall ICF block such as the block 60 illustrated in FIG. 5. This block can be easily formed using male tool 246. Based upon the predetermined height of a single tie member, or single male tool, a plurality of ICF blocks having different block heights can be easily fabricated using the same tie member 10 and the same male tool by simply stacking the same. In other words, each ICF block height will be a multiple of the shortest block height, or a multiple of the predetermined height of the tie member 10. As a result, any one or more of the male tools 246 can be utilized to produce an ICF block with that particular pre-selected block height equal to one tie member 10. As such, a single pre-selected block height can be stacked one on top of the other to achieve a desired block height based upon multiples of the pre-selected block height.

Still further, as likewise previously explained, it is also recognized that the ICF blocks can be made of several different heights such as 6-inch tall and 8-inch tall blocks, and these blocks can then be stacked using any combination of such blocks to achieve a desired height based upon the pre-selected heights of the ICF blocks. In this regard, two different male tools similar to male tool 246 can be utilized, one male tool 246 yielding a 6-inch tall ICF block and the other male tool 246 yielding an 8-inch tall block. Using a combination of 6-inch and 8-inch tall ICF blocks as previously explained, all usable block heights except for a 10-inch tall ICF block can be achieved by simply stacking one or more of the 6-inch tall and/or 8-inch tall ICF blocks one upon the other to achieve the overall desired block height. This option reduces tooling costs since the male tools only need to be able to receive a single tie member as illustrated in FIG. 38. Still other options are likewise available as explained with respect to FIGS. 34 and 37 wherein a plurality of tie members are utilized in conjunction with a particular male tool.

It is also recognized that a compatible loading platform such as loading platform 252 could be utilized in conjunction with male tool 246 such as illustrated in FIG. 42 wherein stop member 262 is utilized to hold a single tie member 10. It is also recognized and anticipated that the respective pairs of arm members 256 associated with loading platform 252 could be shortened in length to accommodate use of a single tie member with a male tool such as male tool 246. Other configurations are likewise recognized and anticipated.

It is likewise recognized and anticipated that any combination of the overlapping extension members 44A and 44B, the gripping means 46, and the attachment mechanisms 120 can be used with any, of the various folding and field assembled tie members discussed above.

As a result, the various embodiments of the present tie members 10, 108 and 132 facilitate producing a wide variety of different ICF block widths and heights while saving tooling costs and manufacturing costs as previously explained.

Like tie member 10, any plurality of the present tie members 108 and 132 can be used to form any pre-selected ICF block height and width. Also, importantly, the present side wall bracket members 110 and 140 with the extension portions 44A and 44B and/or attachment mechanisms 120 can be utilized with any tie member construction including an integrally formed one-piece tie member, any type of foldable tie member, and any type of slidably engageable tie member.

As a result, the interchangeability of the present tie members 10, 108 and 132 allow a manufacturer to produce both field assembled and fully pre-assembled foldable ICF blocks having varying heights and widths with a lesser number of ICF tools as previously achievable. Also, as previously explained, the universality of the side wall bracket members 12, 110 and 140 allow for the manufacture of a universal stackable field assembled ICF block using the same ICF tools used to manufacture the foldable pre-assembled ICF blocks. As a result, for no additional cost, a manufacturer will be able to manufacture both foldable pre-assembled ICF blocks and field assembled ICF blocks without purchasing additional tools. Use of the present ICF tools in conjunction with the construction of the present tie members 10, 108 and 132 will allow a manufacturer to offer a dramatically improved, broader, and more flexible ICF product line. Any width of each type of ICF block will be able to be made in any tool cavity in any combination in each and every cycle. As a result, all of the present ICF tools will be able to be run at maximum production efficiency while manufacturing only one height of a tie member.

As is evident from the foregoing description, certain aspects of the present invention are not limited by the particular details of the examples illustrated herein and it is therefore contemplated that other changes, modifications, variations and other uses and applications of the present invention, or equivalents thereof, will become apparent to those skilled in the art after considering this specification and the accompanying drawings. All such drawings, modifications, variations and other uses and applications which do not depart from the spirit and scope of the present invention are deemed to be covered by the present invention which is limited only by the claims which follow.

What is claimed is:

1. A tool for forming an ICF block having a pair of spaced apart panel members and a plurality of tie members positioned transversely therebetween at spaced apart locations along the length of the panel members, said same tool being capable of receiving tie members forming an ICF block having varying widths wherein each such tie member forming the ICF block includes a foldable web portion and at least one tool engaging member, said tool comprising:
   a male tool and a female tool, said female tool having outer walls and a cavity for cooperatively receiving said male tool;
   said male tool including a plurality of spaced apart pairs of plate members fixedly mounted to said male tool and positioned along the length of said male tool, each pair of plate members being separated by a male tool first opening and forming an internal male tool second opening therebetween configured to receive the foldable web portions of the tie members forming the ICF block in at least a partially folded condition, a male tool first opening being positioned and located along the length of said male tool at each location where a tie member forming the ICF block will be located in the ICF block, each male tool first opening being formed by wall portions associated with adjacent plate members;
   each of said adjacent plate member wall portions forming each male tool first opening including an edge portion, at least one of said edge portions forming each male tool first opening being positioned and located for engaging the at least one tool engaging member associated with each of the tie members forming the ICF block;
   each tie member forming the ICF block being slidably insertable within a respective male tool first opening and having its foldable web portion positionable in at least a partially foldable condition within a respective internal male tool second opening and at least one of the edge portions forming each male tool first opening engages the at least one tool engaging member of the tie member forming the ICF block for holding the tie member within a male tool first opening with the foldable web portion in its at least partially foldable condition within a respective internal male tool second opening;
   a space formed between one surface of each of said respective plate members and the corresponding outer walls of said female tool cavity when the male tool is inserted within said female cavity defining the panel members forming the ICF block.

2. The tool defined in claim 1 wherein each tie member forming the ICF block includes a pair of side wall bracket members, each side wall bracket member including a fastening plate and a shut-off plate, the foldable web portion extending between said pair of side wall bracket members, the opposite end portions of said web portion being pivotally connected to said shut-off plates, said side wall bracket members being engageable with a respective male tool first opening.

3. The tool defined in claim 2 wherein the foldable web portion of each of the tie members forming the ICF block includes a pair of cooperatively engageable connection link members, each connection link member having opposite end portions, one end portion of each of said connection link members being pivotally connected to said shut-off plates and the opposite end portion of each of said connection link members being pivotally connected to each other.

4. The tool defined in claim 2 wherein the at least one tool engaging member associated with each tie member forming the ICF block is spaced from each said shut-off plate.

5. The tool defined in claim 4 wherein said at least one tool engaging member includes a plurality of projections spaced from each respective shut-off plate, said plurality of projections extending in a direction parallel to the plane of each shut-off plate, said projections forming at least one corresponding slot between said shut-off plate and said projections.

6. The tool defined in claim 5 wherein each shut-off plate includes a plurality of spaced projections, the plurality of projections forming said at least one tool engaging member being associated with the plurality of spaced shut-off plate projections.

7. The tool defined in claim 2 wherein said at least one tool engaging member includes a plurality of opposed projections spaced from each respective shut-off plate extending in a direction parallel to the plane of each respective shut-off plate; said opposed projections foaming a pair of corresponding opposed slots between each respective shut-off plate and said opposed projections, said pair of corresponding opposed slots being positioned and located for engaging the adjacent plate member edge portions forming said male tool first opening.

8. The tool defined in claim 2 wherein each of said fastening plates includes an extension portion associated with each opposite end thereof, the extension portion of one end of the fastening plates associated with one of the tie members forming the ICF block being positionable in overlapping relationship with the extension portions of one end of the fastening plates associated with another one of the tie members forming the ICF block when the respective side wall bracket members associated with a pair of tie members forming the ICF block are slidably insertable within a corresponding male tool first opening.

9. The tool defined in claim 8 wherein the extension portions associated with said fastening plates each include an engaging member that will mate with a corresponding engaging member associated with another tie member forming the ICF block when a pair of tie members forming the ICF block are positioned in overlapping relationship to each other.

10. The tool defined in claim 1 wherein each of the panel members includes a pair of opposed horizontal longitudinal edges, and wherein each of said male and female tools includes at least one row of teeth and sockets positioned and located on said tools for producing teeth and sockets associated with each of the opposed horizontal longitudinal edges of the pair of panel members forming the ICF block.

11. The tool defined in claim 8 wherein each of the panel members includes a pair of opposed horizontal longitudinal edges, and wherein each of said male and female tools includes at least one row of teeth and sockets positioned and located on said tools for producing teeth and sockets associated with the opposed horizontal longitudinal edges of the panel members forming the ICF block, and wherein at least one of the extension portions associated with each opposite end of at least one of said fastening plates extend into a respective tooth associated with the opposed horizontal longitudinal edges of the panel members.

12. The tool defined in claim 1 including a loading platform having a plurality of pairs of arm members associated therewith, said respective pairs of arm members being positioned and located so as to register with the plurality of male tool first openings when the loading platform is positioned adjacent thereto, each respective pair of arm members being configured to hold at least one tie member forming the ICF block in a position, said loading platform being movable into and out of said male tool when loaded with a plurality of tie members forming the ICF block, the at least one tool engaging member associated with the respective tie members forming the ICF block will be engaged with at least a portion of a male tool first opening and the web portion associated with each tie member forming the ICF block will be positioned within a corresponding internal male tool second opening associated with said male tool when the loading platform is inserted within said male tool.

13. The tool defined in claim 12 wherein each of said arm members includes a slot positioned and located for receiving a portion of each respective tie member forming the ICF block for holding each tie member in a fixed stable position with the web portion in a fixed position when the tie members are loaded on said loading platform.

14. The tool defined in claim 2 wherein the web portion of each tie member forming the ICF block is pivotally movable at an intermediate location between said shut-off plates.

15. The tool defined in claim 2 wherein each tie member forming the ICF block further includes an interlocking mechanism associated with each opposite end of each of said side wall bracket members, said interlocking mechanism being positioned and located between said fastening plate and said shut-off plate, said interlocking mechanism including a pair of first and second interlocking members positioned adjacent to each other in a lateral offset arrangement, the first interlocking member of one end of each of said side wall bracket members being engageable with the second interlocking member of one end of each of said side wall bracket members associated with another one of said tie members forming the ICF block.

16. The tool defined in claim 15 wherein each of the panel members includes a pair of opposed horizontal longitudinal edges, wherein said male and female tools include at least one row of teeth and sockets positioned and located on said tools for producing teeth and sockets associated with the opposed horizontal longitudinal edges of the panel members forming the ICF block, and wherein each of said first and second interlocking members extend at least partially into a respective tooth associated with the opposed horizontal longitudinal edges of the panel members.

17. The tool defined in claim 15 wherein each of the panel members includes a pair of opposed horizontal longitudinal edges, wherein said male and female tools include at least one row of teeth and sockets positioned and located on said tools for producing teeth and sockets associated with the opposed horizontal longitudinal edges of the panel members forming the ICF block, and wherein said teeth and sockets positioned and located on said tools include a pocket for receiving said first and second interlocking members associated with one end portion of said side wall bracket members at each location where a tie member forming the ICF block will be located in the ICF block.

18. The tool defined in claim 1 wherein each male tool first opening is configured to receive a plurality of tie members forming the ICF block.

19. A tool for forming an ICF block having a pair of spaced apart panel members forming the ICF block and a plurality of tie members positioned transversely between said panel members at spaced apart locations along the length of the panel members, said same tool being capable of receiving tie members forming the ICF block having varying widths wherein each such tie member includes a foldable web member extending between a pair of side wall bracket members, each side wall bracket member including a fastening plate and a shut-off plate, each tie member forming the ICF block further including at least one tool engaging slot, said tool comprising:

at least one male tool and at least one female tool, said at least one female tool having outer walls and a cavity for cooperatively receiving said at least one male tool;

said at least one male tool including a plurality of spaced apart pairs of plate members positioned along the length of said male tool, each pair of plate members having respective end portions and each pair of plate members forming an internal male tool cavity therebetween configured to receive the foldable web members associated with at least some of the tie members forming the ICF block in a folded position, each pair of plate members being separated by a pair of openings positioned and located along the length of said at least one male tool at each location where a tie member forming the ICF block will be located in the ICF block, each pair of said openings being formed by the respective end portions of adjacent plate members;

each of the respective adjacent plate member end portions forming said pair of openings including an edge portion, at least one of said respective pairs of edge portions being positioned and located for engaging the at least one tool engaging slot associated with each of the tie members forming the ICF block;

each tie member forming the ICF block being slidably insertable within the respective pair of openings and having its respective shut-off plates positioned and located adjacent the inner surfaces of the pair of panel members when the ICF block is formed and having its foldable web member positioned within a respective internal male tool cavity in a foldable position, at least one of the respective edge portions forming said respective pair of openings being insertable into the at least one tool engaging slot of the tie member forming the ICF block for holding the tie member within the pair of openings with the web member foldable within a respective internal male tool cavity of said male tool;

a space formed between one surface of each of said respective plate members and the corresponding outer walls of said at least one female cavity when said at least one male tool is inserted therewithin defining the panel members forming the ICF block.

20. The tool defined in claim 19 wherein said web member includes a pair of cooperatively engageable connection link members, each connection link member having opposite end portions, one end portion of each of said connection link members being pivotally connected to a respective shut-off plate, the opposite end portion of each of said connection link members being pivotally connected to each other.

21. The tool defined in claim 19 wherein said at least one tool engaging slot is associated with each side wall bracket member and is formed between each respective shut-off plate and at least one tool engaging member spaced therefrom and extending in a direction parallel to the plane of each shut-off plate.

22. The tool defined in claim 19 wherein said at least one tool engaging slot includes a pair of tool engaging slots associated with each side wall bracket member, said pair of tool engaging slots being spaced from each respective shut-off plate and being positioned in opposed relationship to each other.

23. The tool defined in claim 22 wherein said pair of tool engaging slots are formed between each respective shut-off plate and a plurality of opposed projections positioned in spaced apart relationship to said shut-off plate and extending in a direction parallel to the plane of each respective shut-off plate.

24. The tool defined in claim 22 wherein said respective pairs of adjacent plate member edge portions forming said respective pair of openings engage said pair of tool engaging slots associated with each tie member forming the ICF block.

25. The tool defined in claim 19 wherein each of said fastening plates includes an extension portion associated with each opposite end thereof, the extension portion of one end of the fastening plates associated with one of the tie members forming the ICF block being positionable in overlapping relationship with the extension portions of one end of the fastening plates associated with another one of the tie members forming the ICF block when the respective side wall bracket members associated with a pair of tie members forming the ICF block are slidably insertable within a corresponding pair of openings.

26. The tool defined in claim 25 wherein each of the panel members includes a pair of opposed horizontal longitudinal edges, and wherein said at least one male tool and said at least one female tool include at least one row of teeth and sockets positioned and located on said tools for producing teeth and sockets associated with each of the opposed horizontal longitudinal edges of the pair of panel members forming the ICF block, some of the teeth associated with said at least one male and female tools including an indentation, at least one of the extension portions associated with each opposite end of at least one of said fastening plates mating with said indentations when the tie members are positioned within said at least one male tool and said at least one male tool is cooperatively received within said at least one female tool cavity.

27. The tool defined in claim 19 including a loading platform for holding a plurality of tie members forming the ICF block for insertion within said at least one male tool, said loading platform including a plurality of pairs of arm members positioned and located so as to register with said plurality of pair of openings associated with the male tool when the loading platform is positioned adjacent thereto, each pair of arm members being configured to hold at least one tie member forming the ICF block in a folded position, each arm member being sized and shaped to receive one of the side wall bracket members associated with a tie member forming the ICF block and holding the foldable web member in a fixed elevated position for insertion within a corresponding internal male tool cavity when the loading platform is inserted therewithin.

28. The tool defined in claim 27 wherein when said respective pairs of arm members are loaded with one or more tie members and said loading platform is slidably insertable within said at least one male tool, the shut-off plate associated with each respective side wall bracket member will overhang one edge portion of each respective arm member such that the shut-off plate and the at least one tool engaging slot is free for entry into a respective internal cavity associated with said at least one male tool and the at least one tool engaging slot will engage at least one of respective pairs of adjacent plate member edge portions for holding the tie members within the at least one male tool.

29. The tool defined in claim 19 wherein each tie member forming the ICF block further includes an interlocking mechanism associated with each opposite end of each of said side wall bracket members, said interlocking mechanism being positioned and located between said fastening plate and said shut-off plate, the interlocking mechanism of one end of each of the side wall bracket members being cooperatively engageable with the interlocking mechanism of one end of each of the side wall bracket members associated with another one of said tie members forming the ICF block.

30. The tool defined in claim 29 wherein each of the panel members includes a pair of opposed horizontal longitudinal edges, wherein said male and female tools include at least one row of teeth and sockets positioned and located on said tools for producing an array of alternating teeth and sockets associated with the opposed horizontal longitudinal edges of the panel members forming the ICF block, and wherein said teeth and sockets positioned and located on said tools include a pocket for receiving the interlocking mechanism associated with one end portion of said side wall bracket members at each location where a tie member forming the ICF block will be located in the ICF block.

31. The tool defined in claim 19 wherein each pair of said openings is configured to receive a plurality of tie members forming the ICF block.

32. A tool for forming an ICF block having a pair of spaced apart panel members each having inner and outer surfaces and a plurality of tie members positioned transversely between said panel members at spaced apart locations along the length of the panel members, said same tool being capable of receiving tie members forming the ICF block having varying widths wherein each such tie member includes a foldable web member extending between a pair of side wall bracket members, each side wall bracket member including a fastening plate and a shut-off plate, each tie member forming the ICF block further including a pair of tool engaging slots spaced from each of said shut-off plates, said tool comprising:

at least one male tool and at least one female tool, said at least one female tool having outer walls and a cavity for cooperatively receiving a corresponding male tool;

said at least one male tool including a plurality of spaced apart pairs of plate members positioned along the length of said male tool, each pair of plate members having respective end portions and each pair of plate members forming an internal male tool opening therebetween configured to receive the foldable web members associated with tie members forming the ICF block, each pair of plate members being separated by a pair of spaces positioned and located along the length of said at least one male tool at each location where a tie member forming the ICF block will be located in the ICF block, each pair of said spaces being formed by the respective end portions of adjacent plate members;

each of the respective adjacent plate member end portions forming pair of spaces including an edge portion, said respective pairs of edge portions being positioned and located for engaging the pair of tool engaging slots associated with each of said shut-off plates;

each tie member forming the ICF block being slidably insertable within said spaces and having its respective shut-off plates positioned and located adjacent the inner surfaces of the pair of panel members when the ICF block is formed and having its foldable web member positioned within a respective internal male tool opening, the respective plate member edge portions forming said spaces engaging the pair of tool engaging slots associated with each of said shut-off plates for holding a tie member forming the ICF block within the spaces with the web member foldable within a respective internal male tool opening;

a space formed between one surface of each of said respective plate members and the corresponding outer walls of said at least one female cavity when said at least one male tool is inserted therewithin defining the panel members forming the ICF block.

33. The tool defined in claim 32 wherein said pair of tool engaging slots are formed between each respective shut-off plate and a plurality of opposed projections positioned in spaced apart relationship to said shut-off plate and extending in a direction parallel to the plane of each respective shut-off plate.

34. The tool defined in claim 33 wherein each shut-off plate includes a plurality of spaced projections, the plurality of opposed projections forming said pair of tool engaging slots extending from said plurality of spaced projections, one of said pair of tool engaging slots being located on each side of said plurality of spaced projections between said opposed projections and said shut-off plate.

35. A tool for forming an ICF block having a pair of spaced apart panel members and a plurality of tie members positioned transversely therebetween at spaced locations along the length of the panel members, each tie member forming the ICF block including a pair of opposed side wall bracket members, said tool being capable of receiving a pair of opposed side wall bracket members associated respectively with each of the plurality of tie members forming the ICF block, each side wall bracket member including at least one tool engaging member, said tool comprising:

a male tool and a female tool, said female tool having outer walls and a cavity for receiving said male tool;

said male tool including a plurality of spaced apart plate members positioned along the length of said male tool, each plate member having a wall portion, each pair of plate members being separated by an opening, said opening being positioned and located along the length of said male tool at each location where a tie member forming the ICF block will be located in the ICF block, each said opening being formed by wall portions associated with adjacent plate members;

each of said adjacent plate member wall portions forming each said opening including an edge portion, at least one of said edge portions forming each said opening being positioned and located for engaging the at least one tool engaging member associated with each of said side wall bracket members;

each pair of opposed side wall bracket members being positionable within one of said openings and at least one of the edge portions forming said opening engages the at least one tool engaging member associated with one of said pair of opposed side wall bracket members and at least another one of the edge portions forming said opening engages the at least one tool engaging member associated with the other of said pair of opposed side wall bracket members for holding said pair of opposed side wall bracket members in spaced apart relationship within a respective opening; and a space formed between one surface of each of said respective plate members and the corresponding outer walls of said female tool cavity when the male tool is inserted within said female cavity defining the panel members forming the ICF block.

36. The tool defined in claim 35 wherein each side wall bracket member includes a fastening plate and a shut-off plate, and wherein each tie member forming the ICF block further includes a web member positionable between said pair of side wall bracket members.

37. The tool defined in claim 36 wherein said web member is attached to said pair of side wall bracket members.

38. The tool defined in claim 36 wherein said web member is slidably attachable to a pair of shut-off plates associated with said pair of side wall bracket members.

39. The tool defined in claim 36 wherein the at least one tool engaging member is spaced from each shut-off plate.

40. The tool defined in claim 39 wherein said at least one tool engaging member includes a plurality of projections spaced from each respective shut-off plate; said plurality of projections extending in a direction parallel to the plane of each shut-off plate, said projections forming at least one corresponding slot between said shut-off plate and said projections.

41. The tool defined in claim 40 wherein each shut-off plate includes a plurality of spaced projections, the plurality of projections forming said at least one tool engaging member being associated with the plurality of spaced shut-off plate projections.

42. The tool defined in claim 36 wherein said at least one tool engaging member includes a plurality of opposed projections spaced from each respective shut-off plate extending in a direction parallel to the plane of each respective shut-off plate, said opposed projections forming a pair of corresponding opposed slots between each respective shut-off plate and said opposed projections, said pair of corresponding opposed slots being positioned and located for engaging the adjacent plate member edge portions forming said male tool opening.

43. The tool defined in claim 36 wherein each of said fastening plates includes an extension portion associated with each opposite end thereof, the extension portion of one end of the fastening plates associated with one of the side wall bracket members being positionable in overlapping relationship with the extension portions of one end of the fastening plates associated with another one of the side wall bracket members when the respective side wall bracket members associated with a pair of tie members forming the ICF block are slidably insertable within a corresponding opening.

44. The tool defined in claim 43 wherein each of the panel members includes a pair of opposed horizontal longitudinal edges, wherein said male and female tools include at least one row of teeth and sockets positioned and located on said tools for producing teeth and sockets associated with the opposed horizontal longitudinal edges of the panel members forming the ICF block, and wherein at least one of the extension portions associated with each opposite end of at least one of said fastening plates extend into a respective tooth associated with the opposed horizontal longitudinal edges of the panel members.

45. The tool defined in claim 35 including a loading platform having a plurality of pairs of arm members associated therewith, said respective pairs of arm members being positioned and located so as to register with the plurality of openings associated with the male tool when the loading platform is positioned adjacent thereto, each respective pair of arm members being configured to hold at least one pair of opposed sidewall bracket members, said loading platform being movable into and out of said male tool, when loaded with a plurality of side wall bracket members, the at least one tool engaging member associated with the respective side wall bracket members will be engaged with at least a portion of a an opening.

46. The tool defined in claim 36 wherein each side wall bracket member further includes an interlocking mechanism associated with each opposite end thereof, said interlocking mechanism being positioned and located between said fastening plate and said shut-off plate, the interlocking mechanism of one end of each of the side wall bracket members associated with one of said tie members being cooperatively engageable with the interlocking mechanism of one end of each of the side wall bracket members associated with another one of said tie members.

47. The tool defined in claim 46 wherein each of the panel members includes a pair of opposed horizontal longitudinal edges, wherein said male and female tools include at least one row of teeth and sockets positioned and located on said tools for producing teeth and sockets associated with the opposed horizontal longitudinal edges of the panel members forming the ICF block, and wherein said interlocking mechanism extends into the teeth and sockets associated with the opposed horizontal longitudinal edges of the panel members.

48. The tool defined in claim 47 wherein said teeth and sockets positioned and located on said male and female tools include a pocket for receiving the interlocking mechanism associated with one end portion of said side wall bracket members at each location where a tie member forming the ICF block will be located in the ICF block.

49. The tool defined in claim 48 wherein said interlocking mechanism includes a pair of first and second interlocking members, said first and second interlocking members being receivable within said pocket.

50. The tool defined in claim 36 wherein said web member includes a foldable web portion, said male tool further including an internal cavity formed between each respective pair of plate members, said internal cavity being configured to receive varying widths associated with the foldable web portions of said tie members forming the ICF block when each pair of opposed side wall bracket members are positioned within a corresponding opening.

51. The tool defined in claim 50 wherein the foldable web portion of each of the tie members forming the ICF block includes a pair of cooperatively engageable connection link members, each connection link member having opposite end portions, one end portion of each of said connection link members being pivotally connected to said shut-off plates and the opposite end portion of each of said connection link members being pivotally connected to each other.

52. The tool defined in claim 35 wherein each opening is configured to receive a plurality of tie members forming the ICF block.

53. The tool defined in claim 35 wherein said side wall bracket members are associated with a field assembled tie member.

54. The tool defined in claim 35 wherein said side wall bracket members are associated with a foldable tie member.

55. The tool defined in claim 35 including a plurality of male tools, each male tool having a plurality of plate members, each male tool being separately receivable within the same female tool cavity, and each male tool having plate members of a different length.

56. A tool for forming an ICF panel member having a pair of horizontally opposed longitudinal edges, a pair of vertically opposed longitudinal edges, and at least one side wall bracket member mountable therein, the side wall bracket member being associated with at least one tie member, said at least one side wall bracket member including at least one tool engaging member, said tool comprising:
a male tool and a female tool, said female tool having outer walls and a cavity for receiving said male tool;
said male tool including a plurality of spaced apart plate members positioned along the length of said male tool, each pair of plate members being separated by an opening, said opening being positioned and located along the length of said male tool at each location where the at least one tie member will be located in the ICF panel member, each said opening being formed by wall portions associated with adjacent plate members;
each of said adjacent plate member wall portions forming each said opening including an edge portion, at least one of said edge portions being positioned within the at least one tool engaging member associated with said at least one side wall bracket member;
said at least one side wall bracket member being positionable within one of said openings and at least one of the edge portions forming said opening being positioned within the at least one tool engaging member associated with said at least one side wall bracket member for holding said at least one side wall bracket member within a respective opening; and
a space formed between one surface of at least one of said respective plate members and the corresponding outer wall of said female tool cavity when the male tool is inserted within said female cavity defining the ICF panel member.

57. The tool defined in claim 56 wherein the at least one tie member includes a web member, the web member being attachable to said at least one side wall bracket member.

58. The tool defined in claim 57 wherein the web member is slidably attachable to said at least one side wall bracket member.

59. The tool defined in claim 56 wherein said at least one side wall bracket member includes a fastening plate and a shut-off plate, and wherein the at least one tie member further includes a web member attachable to said shut-off plate.

60. The tool defined in claim 59 wherein the web member is slidably attachable to said shut-off plate.

61. The tool defined in claim 60 wherein the at least one tool engaging member is spaced from said shut-off plate.

62. The tool defined in claim 61 wherein said at least one tool engaging member includes a plurality of projections spaced from said shut-off plate, said plurality of projections extending in a direction parallel to the plane of said shut-off plate, said projections forming at least one corresponding slot between said shut-off plate and said projections.

63. The tool defined in claim 62 wherein said at least one tool engaging member includes a plurality of opposed projections spaced from said shut-off plate extending in a direction parallel to the plane of said shut-off plate, said opposed projections forming a pair of corresponding opposed slots between said shut-off plate and said opposed projections, said pair of corresponding opposed slots being positioned and located for engaging the adjacent plate member edge portions forming said male tool opening.

64. The tool defined in claim 56 wherein each of said male and female tools include at least one row of teeth and sockets positioned and located on said tools for producing teeth and sockets associated with each of the opposed horizontal longitudinal edges of the ICF panel member.

65. The tool defined in claim 56 wherein said at least one side wall bracket member is attachable to a web member associated with a field assembled tie member.

66. The tool defined in claim 56 wherein said at least one side wall bracket member is attachable to a web member associated with a foldable tie member.

67. The tool defined in claim 57 wherein the web member includes a foldable web portion, said male tool further including an internal cavity formed between each respective pair of plate members, said internal cavity being configured to receive the foldable web portion of the at least one tie member when said at least one side wall bracket member is positioned within a corresponding opening.

68. The tool defined in claim 56 wherein each male tool opening is configured to receive the at least one tie member.

69. A tool for forming a pair of ICF panel members, each panel member having a pair of horizontally opposed longitudinal edges, a pair of vertically opposed longitudinal edges, at least one tie member positioned transversely between said pair of panel members, the at least one tie member having a pair of side wall bracket members, and at least one side wall bracket member mountable within each of said panel members, each side wall bracket member including at least one tool engaging slot, said tool comprising:
 a male tool and a female tool, said female tool having outer walls and a cavity for receiving said male tool;
 said male tool including a plurality of spaced apart plate members positioned along the length of said male tool, each plate member having a wall portion, each pair of plate members being separated by a male tool opening, a male tool opening being positioned and located along the length of said male tool at each location where a tie member will be located in the respective ICF panel members, each said male tool opening being formed by wall portions associated with adjacent plate members;
 each of said adjacent plate member wall portions forming each male tool opening including an edge portion, at least one of said edge portions being positioned and located for insertion into the at least one tool engaging slot associated with each of said side wall bracket members;
 a pair of side wall bracket members being positionable within one of said male tool openings and at least one of the edge portions forming one of said male tool openings is insertable into the at least one tool engaging slot associated with one of said pair of the side wall bracket members and at least another one of the edge portions forming said male tool openings is insertable into the at least one tool engaging slot associated with the other of said pair of side wall bracket members for holding said pair of side wall bracket members in spaced relationship within a respective male tool opening, one of said side wall bracket members being mountable in one of said pair of panel members and the other of said side wall bracket members being mountable in the other of said pair of panel members;
 a space formed between one surface of each of said respective plate members and the corresponding outer walls of said female tool cavity when the male tool is inserted within said female cavity defining the ICF panel members.

70. The tool defined in claim 69 wherein the tie member includes a web member, the web member being attachable to at least one of said side wall bracket members.

71. The tool defined in claim 70 wherein the web member is slidably attachable to at least one of said side wall bracket members.

72. The tool defined in claim 69 wherein each of said side wall bracket members includes a fastening plate and a shut-off plate, and wherein the at least one tie member further includes a web member attachable to said shut-off plate.

73. The tool defined in claim 72 wherein the web member is slidably attachable to said shut-off plate.

74. The tool defined in claim 72 wherein the at least one tool engaging slot is spaced from said shut-off plate.

75. The tool defined in claim 69 wherein each of said side wall bracket members is attachable to a web member associated with a field assembled tie member.

76. The tool defined in claim 69 wherein each of said side wall bracket members is attachable to a web member associated with a foldable tie member.

77. The tool defined in claim 69 wherein each male tool opening is configured to receive a plurality of tie members.

78. The tool defined in claim 69 including a plurality of male tools, each male tool having a plurality of plate members, each plate member having a length, each male tool being separately receivable within the same female tool cavity, and each of said plurality of male tools having plate members of a different length.

79. A tool for forming an ICF block having a pair of spaced apart panel members and a plurality of tie members positioned transversely therebetween at spaced apart locations along the length of the panel members, each panel member having a pair of horizontally opposed longitudinal edges, said tool being capable of receiving the tie members forming the ICF block, each tie member including a pair of side wall bracket members, each side wall bracket member including an interlocking mechanism, said tool comprising:
 a male tool and a female tool, said female tool having a cavity for cooperatively receiving said male tool;
 said male tool including a plurality of male tool openings positioned and located along the length of said male tool at each location where a tie member forming the ICF block will be located in the ICF block;
 each tie member forming the ICF block being slidably insertable within at least one male tool opening for holding the tie member within the male tool;
 said male and female tools including at least one row of teeth and sockets positioned and located on said tools for providing teeth and sockets associated with the opposed horizontal longitudinal edges of the panel members forming the ICF block, said teeth and sockets positioned on said tools including a pocket for receiving each interlocking mechanism associated with each side wall bracket member at each location where a tie member forming the ICF block will be located in the ICF block, said pocket overlapping a portion of at least one tooth and at least one socket;
 a space formed between said male tool and said female tool cavity when the male tool is inserted within said female cavity defining the panel members forming the ICF block.

80. A tool for forming an ICF block having a pair of spaced apart panel members and a plurality of tie members positioned transversely therebetween at spaced apart locations along the length of the panel members, each panel member having a pair of horizontally opposed longitudinal edges, said tool being capable of receiving tie members forming the ICF block, each tie member including a pair of side wall bracket members, each side wall bracket member including an interlocking mechanism, each tie member further including at least one tool engaging member, said tool comprising:

a male tool and a female tool, said female tool having outer walls and a cavity for cooperatively receiving said male tool;

said male tool including a plurality of spaced apart pairs of plate members positioned along the length of said male tool, each pair of plate members being separated by a male tool first opening, a male tool first opening being positioned and located along the length of said male tool at each location where a tie member forming the ICF block would be located in the ICF block, each male tool first opening being formed by wall portions associated with adjacent plate members;

each of said adjacent plate member wall portions forming each male tool first opening including an edge portion, at least one of said edge portions being positioned and located for engaging the at least one tool engaging member associated with each of the tie members forming the ICF block;

each tie member forming the ICF block being slidably insertable within a male tool first opening and at least one of the edge portions forming a male tool first opening engages the at least one tool engaging member of each of the tie members forming the ICF block for holding each tie member within a male tool first opening;

said male and female tools including at least one row of teeth and sockets positioned and located on said tools for providing teeth and sockets associated with the opposed horizontal longitudinal edges of the panel members forming the ICF block, and wherein said teeth and sockets positioned on said tools include a pocket for receiving each interlocking mechanism associated with each side wall bracket member at each location where a tie member forming the ICF block will be located in the ICF block;

a space formed between one surface of each of said respective plate members and the corresponding outer walls of said female tool cavity when the male tool is inserted within said female tool defining the panel members forming the ICF block.

81. A tool for forming an ICF block having a pair of spaced apart panel members and a plurality of tie members positioned transversely therebetween at spaced apart locations along the length of the panel members, said same tool being capable of receiving tie members forming the ICF block having varying widths wherein each such tie member includes a pair of side wall bracket members and a foldable web portion, each side wall bracket member including a fastening plate and a shut-off plate, the foldable web portion having opposite end portions and extending between said pair of side wall bracket members, the opposite end portions of said web portion being pivotally connected to said shut-off plates, each tie member forming the ICF block further including an interlocking mechanism associated with each opposite end of each of said side wall bracket members, said interlocking mechanism being positioned and located between said fastening plate and said shut-off plate, said interlocking mechanism including a pair of first and second interlocking members positioned adjacent to each other in a lateral offset arrangement, the first interlocking member of one end of each of said side wall bracket members being engageable with the second interlocking member of one end of each of said side wall bracket members associated with another one of said tie members forming the ICF block, each tie member further including at least one tool engaging member, said tool comprising:

a male tool and a female tool, said female tool having outer walls and a cavity for cooperatively receiving said male tool;

said male tool including a plurality of spaced apart pairs of plate members positioned along the length of said male tool, each pair of plate members being separated by a male tool first opening and foaming an internal male tool second opening therebetween configured to receive the foldable web portions of the tie members forming the ICF block, a male tool first opening being positioned and located along the length of said male tool at each location where a tie member forming the ICF block will be located in the ICF block, each male tool first opening being formed by wall portions associated with adjacent plate members;

each of said adjacent plate member wall portions forming each male tool first opening including an edge portion, at least one of said edge portions forming each male tool first opening being positioned and located for engaging the at least one tool engaging member associated with each of the tie members forming the ICF block;

each tie member forming the ICF block being slidably insertable within a respective male tool first opening and having its side wall bracket members engageable with a respective male tool first opening, the foldable web portion being positionable within a respective internal male tool second opening, and at least one of the edge portions forming a male tool first opening engages the at least one tool engaging member of each of the tie members forming the ICF block for holding each tie member within a male tool first opening with the foldable web portion within a respective internal male tool second opening;

a space formed between one surface of each of said respective plate members and the corresponding outer walls of said female tool cavity when the male tool is inserted within said female cavity defining the panel members forming the ICF block.

82. A tool for forming an ICF block having a pair of spaced apart panel members and a plurality of tie members positioned transversely therebetween at spaced apart locations along the length of the panel members, said same tool being capable of receiving tie members forming the ICF block having varying widths wherein each such tie member includes a foldable web portion and at least one tool engaging member, said tool comprising:

a male tool and a female tool, said female tool having outer walls and a cavity for cooperatively receiving said male tool;

said male tool including a plurality of spaced apart pairs of plate members positioned along the length of said male tool, each pair of plate members being separated by a male tool first opening and forming an internal male tool second opening therebetween configured to receive the foldable web portions of the tie members forming the ICF block, a male tool first opening being positioned and located along the length of said male tool at each location where a tie member forming the ICF block will be located in the ICF block, each male tool first opening being formed by wall portions associated with adjacent plate members;

each of said adjacent plate member wall portions forming each male tool first opening including an edge portion, at least one of said edge portions forming each male tool first opening being positioned and located for engaging the at least one tool engaging member associated with each of the tie members forming the ICF block;

each tie member forming the ICF block being slidably insertable within a respective male tool first opening and the foldable web portion being positionable within a respective internal male tool second opening and at least one of the edge portions forming a male tool first opening engages the at least one tool engaging member of each of the tie members forming the ICF block for holding tie member within a male tool first opening with the foldable web portion within a respective internal male tool second opening;

a space formed between one surface of each of said respective plate members and the corresponding outer walls of said female tool cavity when the male tool is inserted within said female cavity defining the panel members forming the ICF block, said tool further including a loading platform having a plurality of pairs of arm members associated therewith, said respective pairs of arm members being positioned and located so as to register with the plurality of male tool first openings when the loading platform is positioned adjacent thereto, each respective pair of arm members being configured to hold at least one tie member forming the ICF block in a position, said loading platform being movable into and out of said male tool, when loaded with a plurality of tie members forming the ICF block, the at least one tool engaging member associated with the respective tie members forming the ICF block will be engaged with at least a portion of a male tool first opening and the web portion associated with each tie member forming the ICF block will be positioned within a corresponding internal male tool second opening associated with said male tool when the loading platform is inserted within said male tool.

83. The tool defined in claim 19 including a plurality of male tools, each male tool having a plurality of plate members, each plate member having a length, each male tool being separately receivable within the same female tool cavity, and each of said plurality of male tools having plate members of a different length.

* * * * *